US012706859B1

(12) United States Patent
Bhat et al.

(10) Patent No.: US 12,706,859 B1
(45) Date of Patent: Aug. 11, 2026

(54) ENCRYPTED AUTONOMOUS AGENT EXECUTION USING CROSS-VERIFICATION METHODS IN DISTRIBUTED SYSTEMS

(71) Applicant: Citibank, N.A., New York, NY (US)

(72) Inventors: Ganesh Prasad Bhat, New Jersey, NJ (US); James Myers, Clearwater, FL (US)

(73) Assignee: CITIBANK, N.A., NY (US)

(*) Notice: Subject to any disclaimer, the term of this patent is extended or adjusted under 35 U.S.C. 154(b) by 0 days.

(21) Appl. No.: 19/334,759

(22) Filed: Sep. 19, 2025

Related U.S. Application Data

(63) Continuation-in-part of application No. 19/288,027, filed on Aug. 1, 2025, now Pat. No. 12,526,244, which is a continuation-in-part of application No. 19/217,943, filed on May 23, 2025, now Pat. No. 12,450,037, and a continuation-in-part of application No. 19/179,996, filed on Apr. 15, 2025, now Pat. No. 12,587,488, which is a continuation of application No. 18/434,687, filed on Feb. 6, 2024, now Pat. No. 12,126,546.

(51) Int. Cl.
*H04L 47/70* (2022.01)
*H04L 67/1097* (2022.01)

(52) U.S. Cl.
CPC ........ *H04L 47/822* (2013.01); *H04L 67/1097* (2013.01)

(58) Field of Classification Search
CPC .......................... H04L 47/822; H04L 67/1097
See application file for complete search history.

(56) References Cited

U.S. PATENT DOCUMENTS 11,880,836 B1 1/2024 Balazs
12,450,037 B1 * 10/2025 Bhat ......................... G06F 8/30
12,519,667 B1 * 1/2026 Choo ......................... H04L 9/50
2019/0156429 A1 5/2019 Beckmann et al.
(Continued)

FOREIGN PATENT DOCUMENTS

CN 110245517 A * 9/2019 ............. G06Q 40/04
CN 110931093 A * 3/2020 ......... G06Q 30/0185
(Continued)

*Primary Examiner* — Shean Tokuta
(74) *Attorney, Agent, or Firm* — Perkins Coie LLP

(57) ABSTRACT

Systems and methods are disclosed comprising techniques for agentic cross-verification in distributed systems, such as obtaining a request to validate a decision state for a first memory structure of the first multi-agent storage that is accessible to a first AI agent set, transmitting a verification artifact representing the decision state of the first multi-agent storage to a second multi-agent storage that stores the verification artifact, receiving a verification status of the verification artifact that is determined by the second AI agent set, generating a first programmatic workflow set configured to trigger a first sequence of computer-executable commands at the first memory structure, generating a second programmatic workflow set configured to trigger a second sequence of computer-executable commands at the second memory structure, and automatically executing the first programmatic workflow set using the first AI agent set and the second programmatic workflow set using the second AI agent set.

20 Claims, 32 Drawing Sheets

(56) References Cited

U.S. PATENT DOCUMENTS

| | | | |
|---|---|---|---|
| 2019/0228133 | A1 | 7/2019 | Ansari et al. |
| 2019/0334730 | A1* | 10/2019 | Endress .............. H04L 67/1042 |
| 2020/0142682 | A1 | 5/2020 | Marks et al. |
| 2020/0232194 | A1 | 7/2020 | Periaswamy et al. |
| 2020/0273026 | A1* | 8/2020 | Soni .................. G06Q 20/3827 |
| 2021/0144219 | A1* | 5/2021 | Yang ....................... H04L 67/51 |
| 2021/0297234 | A1 | 9/2021 | Le Callonnec |
| 2022/0164224 | A1 | 5/2022 | Mallavarapu |
| 2023/0036439 | A1* | 2/2023 | Olson .................. H04L 9/3236 |
| 2023/0153811 | A1* | 5/2023 | Li .......................... G06F 21/64 705/75 |
| 2023/0360031 | A1 | 11/2023 | Lisa |
| 2024/0007479 | A1 | 1/2024 | George |
| 2024/0015021 | A1 | 1/2024 | Uchida et al. |
| 2024/0089103 | A1 | 3/2024 | Chao-Ying et al. |
| 2024/0095220 | A1 | 3/2024 | Isaacs et al. |
| 2024/0177155 | A1* | 5/2024 | Chen .................... G06Q 20/065 |
| 2024/0420116 | A1 | 12/2024 | Ramde et al. |
| 2024/0420124 | A1 | 12/2024 | Ramde et al. |
| 2024/0422291 | A1 | 12/2024 | Ramde et al. |
| 2025/0123819 | A1 | 4/2025 | Khemka et al. |
| 2025/0124020 | A1* | 4/2025 | Surendran ........... G06F 16/2379 |
| 2025/0150291 | A1* | 5/2025 | Zheng ....................... H04L 9/50 |
| 2025/0173734 | A1 | 5/2025 | Aidan |
| 2025/0184316 | A1* | 6/2025 | Zhu ..................... H04L 63/0428 |
| 2025/0328903 | A1* | 10/2025 | Zhu ....................... H04L 9/3239 |
| 2025/0343768 | A1* | 11/2025 | McLaughlin ......... H04L 47/822 |
| 2025/0358240 | A1* | 11/2025 | Bhat ........................ G06F 8/35 |
| 2025/0371527 | A1* | 12/2025 | Teneja .................. G06F 21/108 |
| 2026/0019380 | A1* | 1/2026 | Bhat ................... G06F 9/44505 |
| 2026/0113285 | A1* | 4/2026 | McLaughlin ............. H04L 9/50 |

FOREIGN PATENT DOCUMENTS

| | | | | | |
|---|---|---|---|---|---|
| CN | 112270005 | A | * | 1/2021 | ........... G06F 21/602 |
| CN | 112653763 | A | * | 4/2021 | ............. H04L 67/10 |
| CN | 113255011 | A | * | 8/2021 | ............. G06F 16/27 |
| CN | 113302610 | A | * | 8/2021 | ............... H04L 9/50 |
| CN | 113302612 | A | * | 8/2021 | ............. H04L 63/20 |
| CN | 113408003 | A | * | 9/2021 | ......... G06Q 20/3829 |
| CN | 113491090 | A | * | 10/2021 | ............. H04L 63/10 |
| CN | 113592475 | A | * | 11/2021 | ........... G06Q 20/102 |
| CN | 113592476 | A | * | 11/2021 | ............. G06Q 40/04 |
| CN | 113592477 | A | * | 11/2021 | ........... G06Q 20/102 |
| CN | 113597608 | A | * | 11/2021 | ........... H04L 9/3271 |
| CN | 116846652 | A | * | 10/2023 | ........... H04L 63/123 |
| CN | 117349873 | A | * | 1/2024 | ......... G06F 21/6227 |
| CN | 115484065 | B | * | 8/2024 | ........... H04L 63/083 |
| CN | 118969216 | A | | 11/2024 | |
| CN | 119669364 | A | * | 3/2025 | |
| EP | 3779755 | A1 | * | 2/2021 | ............... H04L 9/50 |
| EP | 4191976 | A1 | | 6/2023 | |
| JP | 2022150778 | A | | 12/2024 | |
| KR | 20220083931 | A | | 7/2022 | |
| WO | 2020216078 | A1 | | 10/2020 | |
| WO | WO-2021136251 | A1 | * | 7/2021 | ......... H04L 63/0236 |
| WO | WO-2022109850 | A1 | * | 6/2022 | ............. H04L 63/20 |
| WO | WO-2023040554 | A1 | * | 3/2023 | ........... H04L 9/3239 |
| WO | 2024076387 | A1 | | 11/2024 | |

* cited by examiner

400

Smart Contract Layer 402

Parent Service Agreement Module 404
- Template Management
- Terms Negotiation
- SLE Definition
- Resource Allocation Terms
- Penalty Clauses Compliance Verification Module 406
- ZK Proof Validation
- Rule Enforcement
- Certification Checks
- Audit Trail
- Real-Time Monitoring Performance Tracking Module 408
- KPI Monitoring
- SLA Compliance
- Quality Metrics
- Delivery Tracking
- Reputation Updates Privacy-Preserving Engine 410

Selective Disclosure
- Need-To-Know Basis
- Role-Based Access
- Data Minimization ZK Computations
- Range Proofs
- Set Membership
- Threshold Checks Multi-Party Orchestration Engine 412

Workflow Engine
- Sequential Approvals
- Parallel Processing
- Conditional Logic Consensus Rules
- Voting Thresholds
- Quorum Requirements
- Veto Rights Smart Contract Lifecycle Management Engine 414

Negotiation
- Terms Proposal
- Counter-Offers
- Consensus

Execution
- Deployment
- Activation
- Monitoring

Performance
- KPI Tracking
- Compliance Check
- Adjustments

Settlement
- Resource Transmittal
- Dispute Resolution
- Closure

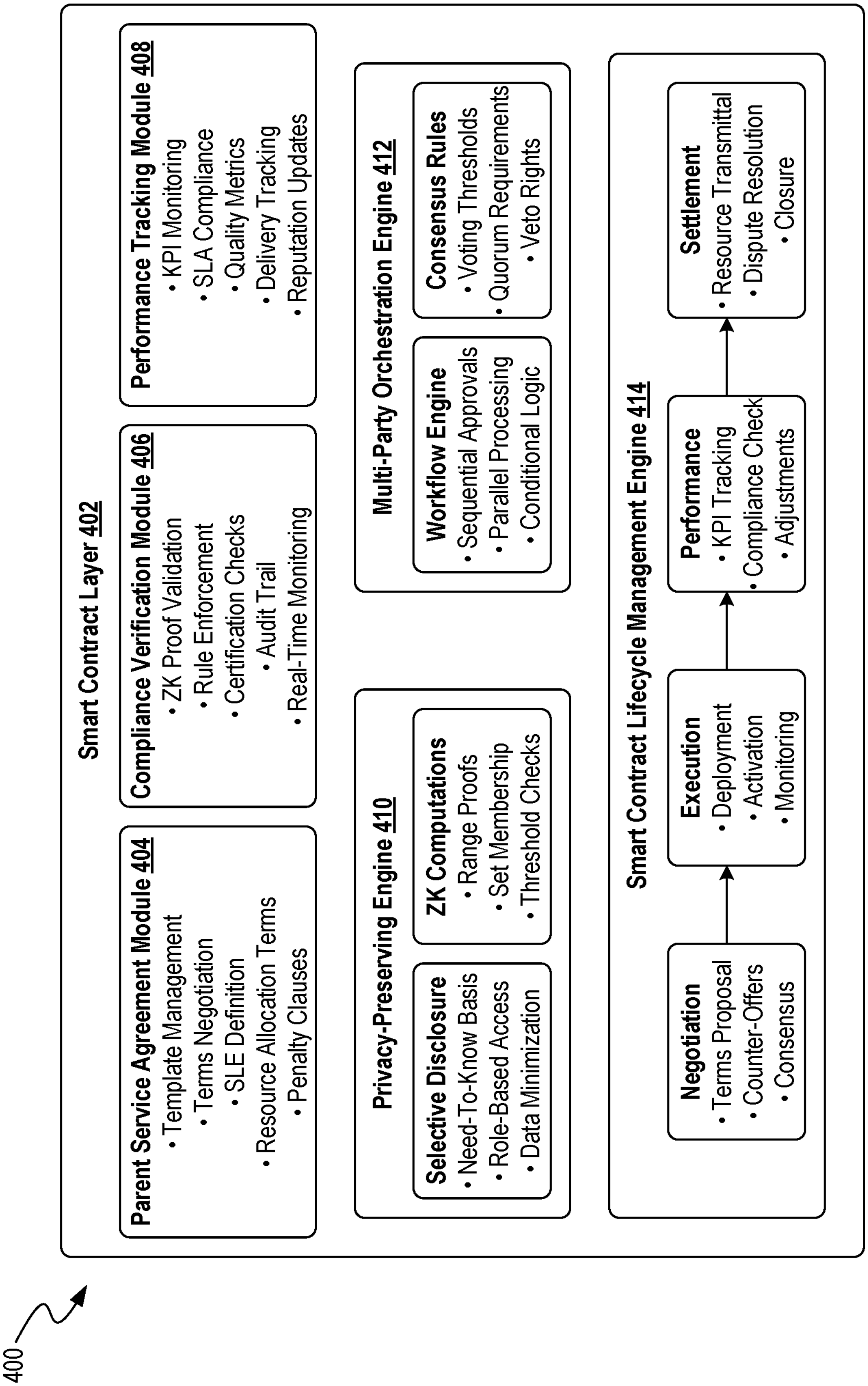

*FIG. 4*

Cryptographic Verification Module 1002

AI Agent Component 1010

Agent Reasoning 1012
• Private Algorithm Execution

Proof Generation 1014
• Create Zero-Knowledge Proofs

Evidence Packaging 1016
• Private Algorithm Execution

Zero-Knowledge Proofs

Encrypted Evidence

Data Structure Component 1020

Proof Verification 1022
• Validate Zero-Knowledge Proofs

Decision Registry 1024
• Secure Evidence Storage

Access Control 1026
• Permissions And Visibility

Advanced Cryptographic Features 1030

Homomorphic Encryption 1032

Secure Multi-Party Computation 1034

Key Components 1040
• PSNARKs / STARKs
• Bulletproofs
• Range Proofs
• Verifiable Credentials
• Threshold Signatures

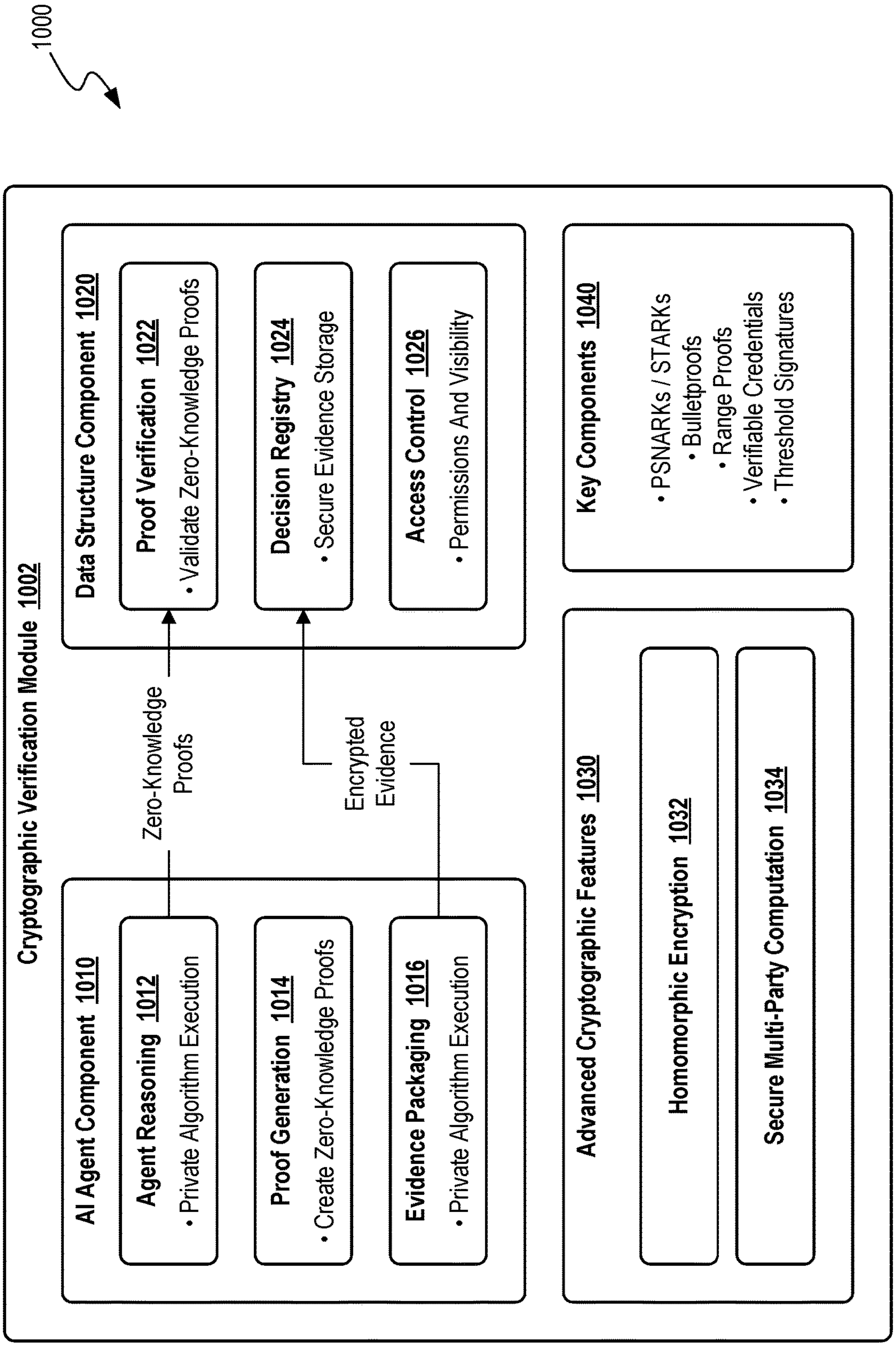

FIG. 10

ENCRYPTED AUTONOMOUS AGENT EXECUTION USING CROSS-VERIFICATION METHODS IN DISTRIBUTED SYSTEMS

CROSS-REFERENCE TO RELATED APPLICATION(S)

This application is a continuation-in-part of U.S. patent application Ser. No. 19/288,027 entitled "ENCRYPTED AUTONOMOUS AGENT VERIFICATION IN MULTI-TIERED DISTRIBUTED SYSTEMS ACROSS GLOBAL OR CLOUD NETWORKS" filed on Aug. 1, 2025, which is a continuation-in-part of U.S. patent application Ser. No. 19/217,943 entitled "AUTOMATIC GENERATION AND EXECUTION OF COMPUTER-EXECUTABLE COMMANDS USING ARTIFICIAL INTELLIGENCE MODELS" filed on May 23, 2025 and is further a continuation-in-part of U.S. patent application Ser. No. 19/179,996 entitled "SYSTEMS AND METHODS FOR DETERMINING RESOURCE AVAILABILITY ACROSS GLOBAL OR CLOUD NETWORKS" filed Apr. 15, 2025, which is a continuation of U.S. patent application Ser. No. 18/434,687 (now U.S. Pat. No. 12,126,546 issued Oct. 22, 2024) entitled "SYSTEMS AND METHODS FOR DETERMINING RESOURCE AVAILABILITY ACROSS GLOBAL OR CLOUD NETWORKS" and filed Feb. 6, 2024. The content of the foregoing applications is incorporated herein by reference in their entirety.

BACKGROUND

An AI agentic model ("agent"), whether autonomous or semiautonomous, refers to a persistent software and/or hardware entity characterized by a digitally encoded objective function. The objective function can instruct the agent to, for example, maximize task accuracy, minimize resource usage, comply with specified operational constraints, and the like. The degree of autonomy can range from semiautonomous, where human intervention is occasionally used, to fully autonomous, where the agent operates independently within defined parameters. Agents use received data (e.g., an input, a prompt, a query) to autonomously trigger and manage actions such as application programming interface (API) invocations, outbound network requests, updates to internal or external datastores, and other computational tasks. The actions autonomously executed by agents are responsive to their respective objective functions. For example, an agent's objective function may direct the agent to minimize task completion latency. During autonomous execution, the agent can determine a degree of expected utility of candidate actions by evaluating the actions against its objective function and select executable actions that align with its assigned objectives within the imposed operational constraints or boundaries set by the system the agent is interacting with.

In some examples, systems that interact with agents are other agents. For instance, a provider agent refers to an AI or autonomous software entity operating on behalf of a direct supplier or service provider in a distributed system. Sub-agents, also known as second-tier or higher-tier agents, are agents that operate further upstream in a supply chain hierarchy, such as subcontractors, indirect suppliers, or additional autonomous entities that fulfill obligations delegated by the provider agent. However, the layered structure and autonomous nature of agents mean there is often limited visibility into a compliance status of the autonomous actions taken by higher-tiered agents that contribute to outcomes or compliance but, for example, are several layers removed from the primary organization.

BRIEF DESCRIPTION OF THE DRAWINGS

Detailed descriptions of implementations of the present invention will be described and explained through the use of the accompanying drawings.

FIG. 4 illustrates an example environment of a smart contract layer within an agent management platform for verifying autonomous agents in multi-tiered distributed systems, in accordance with some implementations of the present technology.

FIG. 10 is a block diagram that illustrates a cryptographic verification environment for privacy-preserving validation of agent reasoning, in accordance with some implementations of the present technology.

Figure 1:
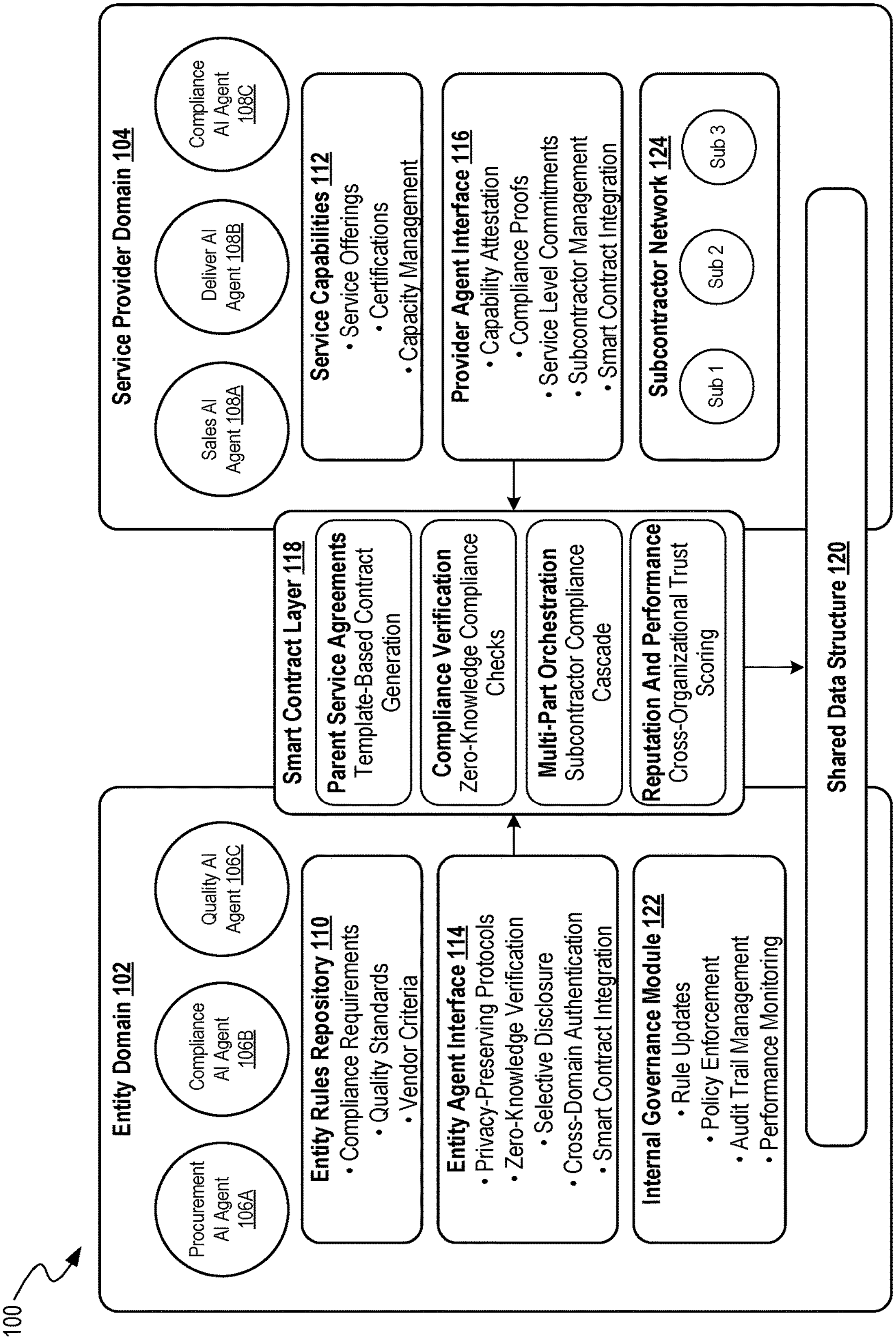
FIG. 1 illustrates an example environment of an agent management platform for verifying autonomous agents in multi-tiered distributed systems while maintaining operational data privacy of respective autonomous agents, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Autonomous artificial intelligence (AI) agents operating within distributed computing environments face significant challenges when attempting to verify the authenticity and compliance of decision-making processes across multiple organizational boundaries and computational tiers. In multi-tiered distributed systems, AI agents must frequently coordinate complex decision-making workflows that span different entities, service providers, and subcontractor networks, where each tier maintains its own operational data, compliance requirements, and verification protocols. The verification of agent decisions becomes particularly problematic when sensitive operational data cannot be disclosed due to privacy constraints, competitive considerations, or regulatory requirements (e.g., proprietary algorithms, customer information, financial data, trade secrets). Traditional verification approaches typically require direct access to internal datasets and decision-making processes, creating conflicts between the need for transparency in verification and the requirement to maintain operational data confidentiality across organizational boundaries.

The complexity of cross-verification increases exponentially when multiple AI agents coordinate decisions that affect resources, compliance status, and operational outcomes across different computational environments and blockchain networks. Each agent typically operates with its own internal datasets, decision-making algorithms, and/or operational constraints, making it difficult to establish trust and verify compliance without exposing sensitive information to external parties. Furthermore, the distributed nature of these computing environments means that verification processes must account for varying network conditions, different blockchain protocols, and asynchronous communication patterns that can introduce delays, inconsistencies, and potential security vulnerabilities in the verification workflow.

Existing verification systems in distributed computing environments are fundamentally inadequate for addressing the privacy-preserving verification requirements of autonomous AI agents operating across multiple organizational tiers. Contemporary blockchain-based verification approaches typically require full disclosure of transaction details, operational data, and decision-making parameters to achieve consensus and validation, which directly conflicts with the privacy and confidentiality requirements of enterprise AI systems. Traditional multi-party computation systems, while offering some privacy protection, lack the agent coordination capabilities and cross-chain interoperability needed for complex multi-tiered decision-making scenarios. Current smart contract platforms provide limited support for privacy-preserving verification of AI agent reasoning and decision-making processes, often requiring either complete transparency or complete opacity without offering granular control over information disclosure. Existing cross-chain communication protocols focus primarily on asset transfers and simple data exchange rather than complex verification workflows that involve multiple AI agents, cryptographic proofs, and coordinated execution across different blockchain networks. These systems also lack the dynamic rule adaptation and governance mechanisms used to manage evolving compliance requirements and operational policies across multiple organizational domains. Further, conventional agent verification systems typically require manual updates and reconfiguration when compliance requirements or operational policies change across multiple organizational domains, resulting in increased administrative overhead and potential delays in implementing updated verification protocols.

Attempting to create a system/process to enable privacy-preserving cross-verification of autonomous AI agents across multi-tiered distributed systems while maintaining operational data confidentiality in view of the available conventional approaches created significant technological uncertainty. Creating such platform/system/process required addressing several unknowns in conventional approaches in/of distributed agent verification and blockchain-based consensus mechanisms, such as the inability to verify agent compliance without exposing sensitive algorithmic details or proprietary datasets. Similarly, conventional approaches in/of multi-party computation and cross-chain interoperability did not provide adequate mechanisms for coordinating complex decision-making workflows across different organizational boundaries while preserving competitive confidentiality requirements.

Conventional approaches rely on centralized verification systems that require full disclosure of operational data and decision-making parameters, which do not address the fundamental conflict between transparency requirements and confidentiality constraints in enterprise AI systems. For example, a conventional system may require direct access to internal datasets and decision-making processes and fail to enable verification without compromising proprietary information or competitive advantages. Conventional approaches typically involve traditional blockchain verification methods that require complete transparency or complete opacity, which can/do not offer granular control over information disclosure or support sophisticated agent coordination capabilities across multiple organizational tiers. Conversely, the disclosed system implements cryptographic verification modules that generate zero-knowledge proofs and privacy-preserving attestations to demonstrate compliance with operational boundaries without revealing sensitive algorithmic details or proprietary datasets.

Additionally, the need to coordinate verification processes across multiple blockchain networks and distributed ledger systems created further technological uncertainty, since the legacy cross-chain communication protocols focused primarily on asset transfers and simple data exchange rather than complex verification workflows involving multiple AI agents and coordinated execution. Legacy smart contract platforms often lacked sophisticated agent coordination capabilities and cross-chain interoperability needed for complex multi-tiered decision-making scenarios. To successfully integrate legacy blockchain infrastructure with advanced AI agent verification requirements, cryptographic proof generation, homomorphic encryption techniques, and multi-agent storage architectures must be taken into consideration.

To overcome the technological uncertainties, the inventors systematically evaluated multiple design alternatives. For example, the inventors experimented with different cryptographic protocols including zk-SNARKs, zk-STARKs, and bulletproof systems to determine optimal privacy-preserving verification methods. The inventors evaluated various cross-chain connector architectures and atomic swap protocols for coordinating actions across multiple blockchain networks, which allowed the inventors to develop mechanisms for maintaining integrity and auditability of each participating network while enabling synchronized multi-agent operations.

The use of traditional multi-party computation systems without agent coordination capabilities, proved to be inadequate for complex verification scenarios as it failed to support the sophisticated decision-making workflows required for multi-tiered organizational environments, leading to incomplete verification processes and potential security vulnerabilities. Similarly, existing blockchain-based verification approaches that required full disclosure of transaction details did not address the privacy and confidentiality requirements of enterprise AI systems operating across competitive organizational boundaries. Further, conventional smart contract platforms with limited privacy-preserving capabilities ignored the potential benefits of granular information disclosure control and coordinated execution across different blockchain networks.

Thus, the inventors experimented with different methods for implementing privacy-preserving cross-verification mechanisms that enable autonomous AI agents to validate decision states while maintaining operational data confidentiality. For example, the inventors tested various transformation operation sets including cryptographic hash functions, keyed hash functions, and deterministic encoding functions to identify the most efficient and effective approaches for generating verification artifacts. Additionally, the inventors systematically evaluated different strategies for coordinating programmatic workflow execution across multiple distributed storage systems. The inventors evaluated, for example, different methods of implementing restriction status mechanisms and atomic operation guarantees, such as developing synchronized execution protocols that prevent partial execution states while maintaining consistency across distributed verification processes.

The disclosed system (hereinafter "agent management platform") can implement privacy-preserving cross-verification mechanisms that enable autonomous AI agents to validate decision states and coordinate execution workflows across multiple distributed storage systems while maintaining operational data confidentiality. The agent management platform can utilize cryptographic verification modules that generate zero-knowledge proofs and other privacy-preserving attestations to demonstrate compliance with operational boundaries without revealing sensitive details or proprietary datasets (e.g., zk-SNARKs, bulletproofs, homomorphic encryption). For example, the agent management platform can enable AI agents to prove that their internal decision-making processes satisfy specified criteria while protecting confidential information such as customer data, pricing models, or competitive intelligence. The agent management platform can implement multi-agent storage architectures that coordinate verification artifacts and execution workflows across different blockchain networks and distributed ledger systems through cross-chain communication protocols. Further, the agent management platform can generate and execute programmatic workflow sets that trigger coordinated sequences of computer-executable commands across multiple memory structures while maintaining atomic operation guarantees and preventing partial execution states.

The disclosed agent management platform can implement automated verification status determination mechanisms that evaluate cryptographic proofs and attestations submitted by different AI agent sets to establish trust and validation across organizational boundaries. For example, the agent management platform can process verification artifacts generated through transformation operations applied to recorded decision artifacts, enabling independent validation of agent compliance without requiring direct access to internal operational datasets. The agent management platform can coordinate the simultaneous execution of multiple programmatic workflow sets across different AI agent sets and memory structures, ensuring synchronized operation and maintaining consistency across distributed verification processes. Further, the agent management platform can implement restriction status mechanisms that prevent unauthorized modifications to memory structures during verification and execution processes, maintaining data integrity and preventing interference from concurrent operations. The agent management platform can generate comprehensive verification records that document the complete verification workflow, including verification status determinations, agent identifications, and execution outcomes, providing immutable audit trails for compliance and dispute resolution purposes.

The disclosed agent management platform can extend beyond traditional blockchain and distributed computing applications to address verification challenges in various technological domains including supply chain management, healthcare data sharing, financial services compliance, and collaborative research networks. The agent management platform can enable pharmaceutical companies to verify drug manufacturing compliance across multiple supplier tiers without exposing proprietary production processes or competitive pricing information. For example, the agent management platform can facilitate regulatory compliance verification in financial services where banks must demonstrate adherence to risk management requirements while protecting customer data and proprietary trading processes. The agent management platform can support secure collaboration in academic research networks where institutions must verify data quality and research methodology compliance while maintaining confidentiality over sensitive research data and competitive research directions. Further, the agent management platform can enable autonomous vehicle coordination networks where individual vehicles must verify safety compliance and traffic rule adherence while protecting proprietary navigation algorithms and operational patterns.

While the current description provides examples of the agent management platform related to LLMs, one of skill in the art would understand that the disclosed techniques can apply to other forms of machine learning or algorithms, including unsupervised, semi-supervised, supervised, and reinforcement learning techniques. For example, the disclosed agent management platform can use model outputs from support vector machine (SVM), k-nearest neighbor (KNN), decision-making, linear regression, random forest, naïve Bayes, or logistic regression algorithms, gradient boosting, and/or other suitable computational models.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Implementations of Verifying AI Agents in Multi-Tiered Distributed Systems FIG. 1 illustrates an example environment 100 of an agent management platform for verifying autonomous agents in multi-tiered distributed systems while maintaining operational data privacy of respective autonomous agents, in accordance with some implementations of the present technology. The environment 100 can be implemented using components of example computer system 2600 illustrated and described in more detail with reference to FIG. 26. Likewise, implementations of example environment 100 can include different and/or additional components or can be connected in different ways.

Environment 100 can be segmented into an entity domain 102 and a service provider domain 104 communicatively connected by a smart contract layer 118. The entity domain 102 refers to a computational environment associated with an entity such as a primary organization or enterprise. As used herein, an entity domain 102 is defined as a computational node, execution environment, or virtual machine instance that maintains a unique identity and is configured to execute software instructions, store and process data, and manage associated autonomous and/or semiautonomous agents via one or more processor and memory subsystems. The entity domain 102 includes components such as internal process execution units, structured data storage and retrieval subsystems (e.g., databases, data lakes, or object stores), autonomous and/or semiautonomous agents, network interfaces and access control modules operating to enforce authentication and authorization for inbound and outbound data flows, and so forth. The entity domain 102 may be implemented as an isolated network segment with controlled access points to external systems. The entity domain 102 may generate separate environments for different departments or functions within the organization.

The provider domain 104 refers to a logically and/or physically isolated computing environment associated with external service providers or vendors that interact with the primary entity (i.e., the entity corresponding to the entity domain 102). The provider domain 104 includes the internal systems, autonomous agents, data structures, data repositories, and so forth corresponding to the external service providers. In some implementations, rather than the entity of the entity domain 102 being associated with a single service provider, the service provider domain 104 is implemented as a federated network of multiple service providers, each with its own subdomains.

Within the entity domain 102, multiple autonomous agentic AI models referred to as entity agents 106 (e.g., procurement AI agent 106A, compliance AI agent 106B, quality AI agent 106C, and so forth) can be used to perform operations associated with the entity domain 102. In the context of the agent management platform, an "agent" is a computational entity, implemented as an artificial intelligence (AI) process or human-supervised software module, whose operational behavior is governed by a machine-readable objective function. The objective function encodes the agent's optimization target or operational policy and directs its semiautonomous or autonomous programmatic decision-making. An agent is enabled to execute one or more actions independently, with autonomy defined as the ability to process input data, evaluate system proposals, generate evidence, and effectuate state-modifying operations without stepwise external control. Each agent can be constructed to include structured, persistent memory for maintaining state information, logs of historical transactions, and/or cryptographic credentials; input interfaces for acquiring data, protocol instructions, and authenticated messages from system components or external adapters; and output channels for transmitting verifiable decisions, artifacts, and/or cryptographic proofs to distributed ledgers or interfacing subsystems. Executable actions can include sequences of deterministic or conditional computer instructions triggered by protocol events or smart contract logic.

For example, the procurement AI agent 106A refers to an agent trained on structured datasets including historical transaction records, where each dataset entry is formatted as a data structure containing multi-field attributes such as cost, supplier identifier, item type, and timestamp. The procurement AI agent 106A can execute predictive analytics workflows, such as regression or classification models, to output predictions for attributes of prospective transactions (including but not limited to supplier selection, projected pricing, and estimated delivery time), wherein the predictions are determined based on input features provided at runtime.

In another example, the compliance AI agent 106B is an agent that receives operational metadata as input, such metadata including model parameter logs, event audit trails, and configuration data associated with subordinate AI models deployed by the entity or by external provider domains. The compliance AI agent 106B validates, through machine-executable rule sets, whether the operational behaviors of AI-driven processes within the domain adhere to externally provided regulatory standards, internal compliance policies, programmed constraints, or defined industry benchmarks. The compliance AI agent 106B can operate as a real-time or near-real time monitoring module by subscribing to streaming data feeds, detecting protocol violations, and generating machine-formatted compliance reports or alert notifications when such violations are detected. The compliance AI agent 106B can include logic to initiate automated, computer-implemented remediation workflows in software systems that are identified as noncompliant.

The quality AI agent 106C refers to an agent that can be used to maintain and/or align attributes of products, services, or processes within the entity with a set of criteria (e.g., quality criteria). The quality AI agent 106C can be implemented as an AI model that receives structured product or process data as input and applies machine-executable criteria to determine conformity of the data with technical quality specifications.

The service provider domain 104 can include its own (e.g., different) set of agents, referred to as the provider agents 108 (e.g., sales AI agent 108A, delivery AI agent 108B, compliance AI agent 108C, and so forth) herein. The entity agents 106 and provider agents 108 are the same as or similar to the AI system 2500 illustrated and described in more detail with reference to FIG. 25. As used herein, a "provider agent" is a software-implemented artificial intelligence (AI) process, instantiated on a processor or distributed compute instance, that autonomously executes computational routines and protocol-driven actions on behalf of the service provider.

The sales AI agent 108A, as instantiated within the service provider domain 104, is an agent whose objective function can be to maximize or increase the execution of digital sales transactions in accordance with specified logic and system constraints. The sales AI agent 108A can, for example, interface with input/output APIs to receive structured digital sales inquiries, smart contract templates, and/or service capability attestations as input artifacts. The sales AI agent can execute one or more evaluations, such as ranking, classification, or constraint satisfaction, to determine transaction parameters, generate digitally signed smart contract proposals, or send negotiation messages. All outputs can be formatted as machine-readable digital artifacts and communicated through agent interfaces to distributed smart contract layers for verification and further automated workflow execution.

The delivery AI agent 108B refers to an agent used to autonomously coordinate and/or verify the fulfillment of service delivery obligations specified by digital smart contracts. The delivery AI agent can receive as input smart contract terms, delivery event data, and service logs, represented as structured, machine-parsable digital records. The delivery AI agent can continuously monitor delivery states and generate digitally signed fulfillment confirmations and delivery status updates. The output artifacts can be transmitted to a shared data structure 120 or other agents.

The compliance AI agent 108C, similar to its counterpart in the entity domain 102, can validate adherence to computationally defined compliance requirements and digital contract clauses. Inputs to the compliance AI agent can include policy documents, regulatory parameter sets, operational logs, and machine-readable copies of smart contract terms. The compliance AI agent 108C can autonomously evaluate operational events and output compliance certificates, audit trails, or zero-knowledge proof artifacts as evidence of conformity to system policies or smart contract obligations.

The entity rules repository 110 refers to a centralized data store associated with the entity domain 102 that is enabled to store, retrieve, and manage machine-readable rule sets, policy objects, and criteria-defining data structures that regulate an entity's operations and interactions with service providers (e.g., the service provider agent associated with the provider domain 104). A rule can be defined as a logic statement or parameterized condition that can be programmatically evaluated by autonomous agents at execution time. The repository can define operative boundary parameters for products, services, and internal processes in the form of configuration entries, logical expressions, or modular policy code that can be referenced by agents for automated compliance checks. The entity rules repository 110 can operate as a versioned database that defines the operative boundaries parameters for products, services, and/or processes within the organization. Additionally, the entity rules repository 110 may store provider criteria, which can be encoded as structured data tuples that specify provider qualification metrics, evaluation thresholds, and performance indicators, enabling agents to execute dynamic selection and scoring routines for service providers.

The service capabilities 112 within the service provider domain 104 refer to an unstructured, semi-structured, or structured (e.g., JSON, XML, relational) representation encoding the operational state, resource availability, and functional capacity of the provider's infrastructure. The service capabilities 112 can be implemented as a dynamic, self-updating environment that continuously assesses and reports on the provider's current capabilities. The service capabilities 112 can be formatted in accordance with one or more standardized ontologies, which define semantic schemas and controlled vocabularies that enable machine interpretation and interoperability with entity agents from the entity domain 102, used by the entity agent(s) associated with the entity domain 102.

The entity agent interface 114 refers to a communication layer that facilitates interactions between the entity domain 102 and other components of the environment 100. This entity agent interface 114 can operate as a gateway for entity agents 106 to exchange information, submit requests, and/or receive responses from external systems, including the service provider domain 104 and the smart contract layer 118. The provider agent interface 116 refers to a complementary communication layer operating within the service provider domain 104 and enables provider agents 108 to interact with the environment 100. This provider agent interface 116 enables provider agents 108 to submit capability information, respond to requests, and/or participate in smart contract executions. The entity agent interface 114 and/or the provider agent interface 116 can maintain a record of entity agents 106 and/or provider agent 108 interactions (e.g., for compliance or dispute resolution purposes).

The smart contract layer 118 refers to a set of self-executing programs deployed on a shared data structure 120. The shared data structure 120 refers to a distributed ledger or blockchain system that operates to facilitate data exchange and transaction recording between the entity domain 102 and the service provider domain 104 (e.g., their respective agents). The shared data structure 120 can be implemented using a consortium blockchain architecture, where participating entities maintain nodes that collectively validate and store transactions. The smart contract layer 118 may include modules for generating and updating data structures defining agreements (e.g., parent service agreements, which operate as contracts governing the communications between the entity and service provider or their respective agent(s)). Further methods of generating and updating smart contracts between AI agents are discussed with reference to FIGS. 15-20. These data structures defining agreements may be implemented as template-based smart contracts with parameterizable clauses that can be customized for specific engagements. The smart contract layer 118 can, in some implementations, use a compliance verification module that uses zero-knowledge proofs to perform compliance checks without revealing sensitive operational data to enable trustless verification of adherence to agreed-upon terms. Additionally, the smart contract layer 118 can include a multi-part orchestration module used to manage interactions and dependencies between the smart contract between the entity agents and the provider agents and any subcontractor agreements between the provider agents and subcontractor agents, thereby ensuring compliance across the entire service delivery chain.

The internal governance module 122 within the entity domain 102 operates to manage internal policies, rules, and operational standards. The internal governance module 122 can use rule-based systems and/or machine learning models to dynamically update and enforce policies based on changing regulatory landscapes. The internal governance module 122 can automatically propose and/or execute updates to the entity rules repository 110. The internal governance module 122 can continuously monitor operational data of the entity domain and trigger automated responses to policy violations (e.g., remediation actions, alerts). The internal governance module 122 can maintain an audit trail using, for example, append-only data structures to ensure the immutability of governance-related actions and decisions. Additionally, the internal governance module 122 can continuously monitor operational data of the entity domain to determine one or more performance-based metrics (e.g., latency, accuracy) and use the determined metrics to assess the effectiveness of governance policies and identify areas for improvement.

The subcontractor network 124 within the service provider domain 104 refers to a hierarchical (e.g., graph-based) network of additional service providers or subcontractors that may be communicated with by the service provider agents 108 to fulfill specific aspects of the data structures defining agreements between the service provider agents 108 and the entity agents 106. The network may be implemented as a dynamic, graph-based structure that represents the relationships and dependencies between various subcontractor agents. Each node in the network data structure can correspond to a unique subcontractor agent, defined by digital identity keys and operational capability descriptors, while edges can encode communication channels, dependency hierarchies, or cascading workflow triggers. The subcontractor network 124 may use smart contracts to manage and enforce cascading compliance requirements across multiple tiers of subcontractor agents. In some implementations, the agent management platform can instantiate, monitor, and enforce smart contract terms programmatically and propagate compliance verification logic through the subcontractor graph.

Figure 2:
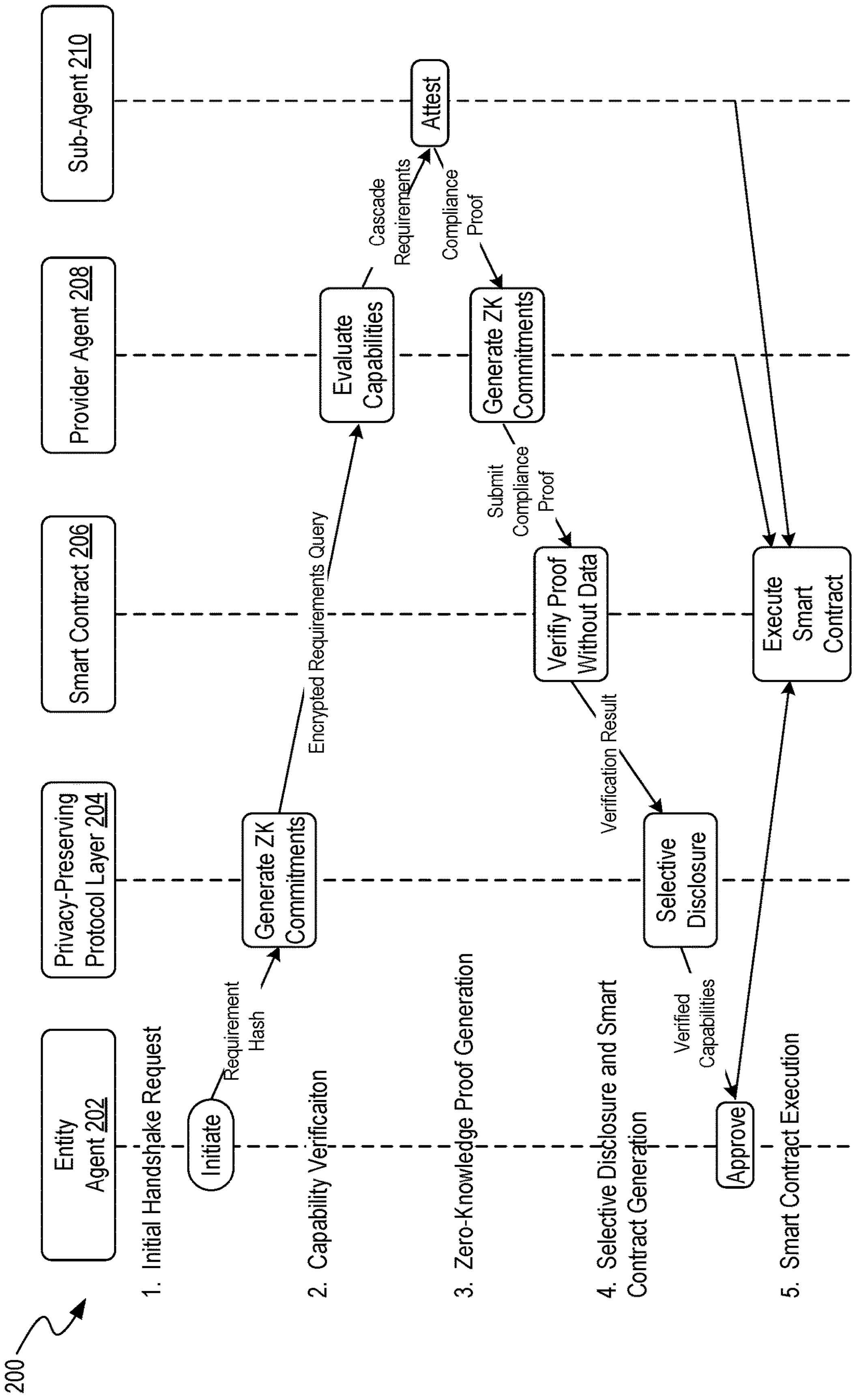
FIG. 2 illustrates an example environment of an agent management platform for verifying autonomous agents in multi-tiered distributed systems that include a sub-agent associated with a provider agent, in accordance with some implementations of the present technology.

FIG. 2 illustrates an example environment 200 of an agent management platform for verifying autonomous agents in multi-tiered distributed systems that include a sub-agent associated with a provider agent, in accordance with some implementations of the present technology. Environment 200 includes an entity agent 202 (e.g., the entity agents 106 in FIG. 1), privacy-preserving protocol layer 204, smart contract 206, provider agent 208 (e.g., the provider agents 108 in FIG. 1), and sub-agent 210. The sub-agent 210 is the same as or similar to the AI system 2500 illustrated and described in more detail with reference to FIG. 25. The environment 200 can be implemented using components of example computer system 2600 illustrated and described in more detail with reference to FIG. 26. Likewise, implementations of example environment 200 can include different and/or additional components or can be connected in different ways.

The entity agent 202 refers to an agent representing the primary organization (e.g., entity) in the multi-tiered distributed system (e.g., the entity agents 106 in FIG. 1). The entity agent 202 can generate an initial handshake request, which includes a cryptographic requirement hash. For example, the entity agent 202 constructs an initialization packet containing digitally encoded operational parameters and constraints. The parameters are transformed into a fixed-length, non-invertible digital summary, thereby ensuring that the operational data can be uniquely referenced without direct exposure. The resulting digital artifact can be referred to as a cryptographic commitment and can be transmitted to a privacy-preserving protocol layer 204.

The privacy-preserving protocol layer 204 is enabled to facilitate secure and confidential interactions between the various agents in the system. Upon receiving the requirement hash from the entity agent 202, this privacy-preserving protocol layer 204 generates zero-knowledge (ZK) commitments, or additional binding values (i.e., commitments that securely reference but do not expose values of the original dataset). The values can be linked to their source data via collision-resistant transformations and can include random secret values to prevent reverse engineering. The privacy-preserving protocol layer 204 enables computational routines (such as verification of agent capabilities) to be executed on encrypted or obfuscated data inputs, such that assertions about agent compliance or resource sufficiency can be verified by external parties without the underlying operational data being revealed.

The smart contract 206 refers to a self-executing program deployed on a distributed ledger or blockchain infrastructure. The smart contract 206 can implement zero-knowledge proof verification to validate compliance proofs submitted by the provider agent 208. The provider agent 208 refers to an agent representing a service provider or vendor in the multi-tiered system (e.g., the provider agents 108 in FIG. 1). The provider agent 208 receives encrypted requirements queries and evaluates the respective capabilities of the provider agent 208 against these requirements. The provider agent 208 can generate and submit compliance proofs.

In some implementations, the requirements query from the smart contract 206 includes cascading requirements. Cascading requirements refer to a hierarchical set of operational, regulatory, or contractual obligations that originate from a primary contracting entity and are enforced across every tier of participating service agents, ensuring that not only provider agent 208 but also any associated sub-agent 210 adheres to the same standards. When the provider agent 208 receives these upstream requirements, the provider agent 208 can determine which obligations are applicable to each sub-agent under its domain. For example, the provider agent 208 can generate a subset of requirements applicable to a sub-agent 210 by applying one or more field filters on the requirements. The provider agent 208 can transmit the resulting subset of requirements to the sub-agent 210.

The sub-agent 210 refers to an agent operating under the purview of the provider agent 208. Upon receiving cascaded requirements, the sub-agent 210 can verify its compliance by running self-diagnostic routines, analyzing historical performance data, or conducting near-real-time or real-time capability assessments. The sub-agent 210 generates its own artifacts, such as ZK commitments, which can be aggregated or composed with those of the provider agent 208. These artifacts can be relayed upstream to provider agent 208, who aggregates and/or verifies them prior to generating an overall compliance proof for submission to the contracting entity or smart contract layer. The smart contract 206 and/or the entity agent 202 can verify incoming proofs, generated and submitted by the provider agent 208 and/or the sub-agent 210, against predefined compliance conditions whose parameters correspond to the commitment artifacts transmitted earlier in the process. Upon successful validation of these proofs by the smart contract 206 and/or the entity agent 202, the smart contract 206 autonomously updates the shared ledger.

Figure 3:
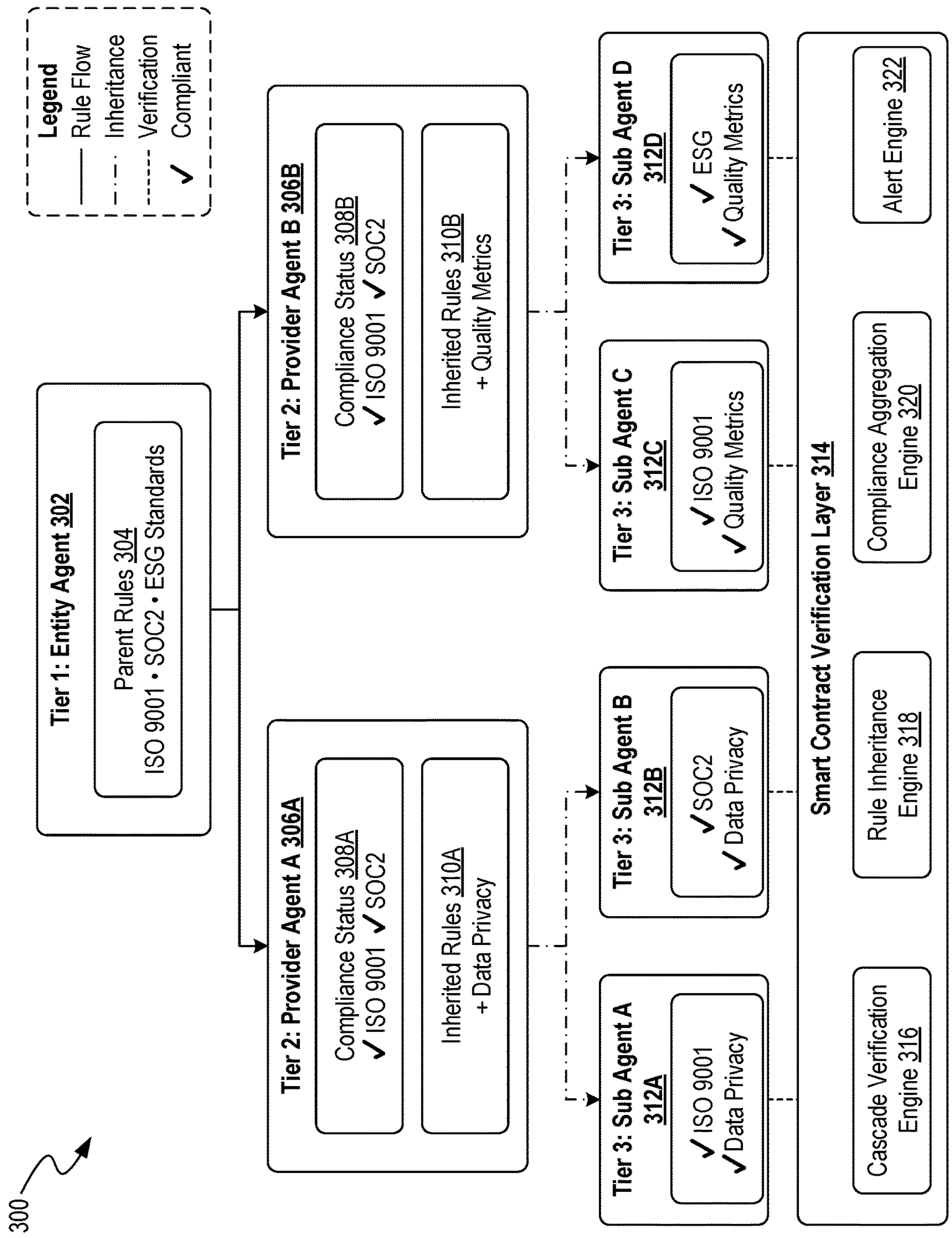
FIG. 3 illustrates an example environment of an agent management platform for verifying autonomous agents in multi-tiered distributed systems that include multiple provider agents and sub-agents, in accordance with some implementations of the present technology.

FIG. 3 illustrates an example environment 300 of an agent management platform for verifying autonomous agents in multi-tiered distributed systems that include, for an entity agent 302 (e.g., the entity agent 202 in FIG. 2, the entity agents 106 in FIG. 1), multiple provider agents 306 (e.g., a first provider agent 306A, a second provider agent 306B, and so forth) and sub-agents (e.g., a first sub-agent 312A, a second sub-agent 312B, a third sub-agent 312C, a fourth sub-agent 312D, and so forth), in accordance with some implementations of the present technology. The environment 300 can be implemented using components of example computer system 2600 illustrated and described in more detail with reference to FIG. 26. Likewise, implementations of example environment 300 can include different and/or additional components or can be connected in different ways.

The entity agent 302 is instantiated as an autonomous or semiautonomous software module representing the primary organization's computational authority in a distributed, multi-tiered system. The entity agent 302 defines and/or maintains the parent rules 304, which operate to provide global requirement specifications for all subordinate nodes and agents throughout the system. These rules may cover technical standards, operational thresholds, security benchmarks, and compliance objectives (e.g., categories such as quality management, information security, and sustainability). In the illustrated example, the parent rules 304 include ISO 9001 quality management standards, SOC2 information security standards, and ESG (environmental, social, and governance) criteria. The parent rules 304 can be implemented as a dynamic, graph-based data structure to enable rule propagation and inheritance across multiple tiers. Each rule node can include metadata, conditional logic, and pointers to child rules for inheritance. If a parent rule is updated based on downstream feedback or external regulatory triggers, the change can be automatically distributed through the graph, thereby updating the rule subsets for each downstream provider agent or sub-agent. The parent rules 304 can include self-modifying code elements that enable automated updates based on feedback from lower tiers and/or external regulatory changes (e.g., automatically increasing security requirements if new risks are detected or downgrading thresholds upon regulatory relaxation).

The provider agents 306 (e.g., first provider agent 306A, second provider agent 306B) refer to second-tier (or lower-tier) agents representing service providers or vendors within the multi-tiered network. The provider agents 306 can interpret and implement particular subsets of the parent rules 304. Each provider agent can maintain its own digital compliance status 308 (e.g., first compliance status 308A, second compliance status 308B), which can be implemented as an updatable data object or transaction log that records the agent's current adherence to technical, operational, and contractual standards. Status updates can be computed via continuous assessments. For example, provider agents automatically ingest operational logs, telemetry data, and workflow outputs, then execute probabilistic, rule-based processes to determine and revise the real-time state of compliance. Status objects can generate and export cryptographically signed attestations or proofs, enabling compliance states to be independently verified by upstream agents or the system's smart contract layer.

The inherited rules 310 (e.g., first inherited rule 310A, second inherited rule 310B) refer to subsets of the parent rules 304 that are specifically associated with each provider agent and its associated sub-agents. For example, a rule inheritance engine (such as rule inheritance engine 318, detailed below) can parse the rule graph to identify and filter the specific requirements applicable to each agent's operational context, resource capabilities, and contractual obligations. The output is a machine-readable structure for each inherited rule (e.g., first inherited rule 310A on data privacy, second inherited rule 310B on quality metrics), with metadata tags linking each inherited rule back to its parent.

The sub-agents 312 (e.g., first sub-agent 312A, second sub-agent 312B, third sub-agent 312C, fourth sub-agent 312D) refer to agents operating under the purview of the provider agents. Each sub-agent 312 receives its assigned inherited rules 310, parses rule logic, and executes local verification routines to determine its own degree of compliance. The sub-agents 312 may form collaborative groups and execute multi-party computation protocols that enable the sub-agents 312 to jointly compute aggregate compliance metrics or execute shared compliance verification tasks. For example, the sub-agents 312 contribute encrypted data shares or partial proofs so that no single entity learns the complete operational data of another; yet, the system can still collectively determine the state of compliance across all collaborating sub-agents.

The smart contract verification layer 314 refers to a blockchain-based infrastructure that enables automated compliance verification and enforcement across all tiers of the system. The smart contract verification layer 314 hosts smart contracts that receive compliance data, proofs, and attestations from agents and execute deterministic verification routines encoded as program logic. The smart contract verification layer 314 can include a cascade verification engine 316, which propagates and verifies compliance requirements from the top tier down to the sub-agents. The cascade verification engine 316 can use directed acyclic graph (DAG) structures of verification dependencies to map which agents and which compliance tasks must be fulfilled before system-wide compliance is recognized. As compliance proofs are submitted, the engine traverses the DAG, validating each dependency and updating network state accordingly.

The rule inheritance engine 318 refers to a module that manages the dynamic generation and adaptation of inherited rules for each tier. The rule inheritance engine 318 accepts as input the parent rule graph and agent profile data, then applies inheritance policies and prioritization logic to output a customized set of inherited rules for every downstream agent. The rule inheritance engine 318 can continuously adapt rule assignments as new agents come online, as feedback or compliance reports are received, and/or as parent rules are updated, thereby ensuring all rule propagation is contextually accurate and up-to-date throughout the distributed network.

The compliance aggregation engine 320 can collect and synthesize compliance data streams from multiple provider agents and sub-agents. The compliance aggregation engine 320 can use weighted scoring to combine the disparate data into an overall compliance report or status object reflecting the state of the entire multi-agent, multi-tiered system. Results can be stored as machine-readable records.

The alert engine 322 refers to a near-real-time or real-time monitoring and notification system that detects and reports compliance violations or anomalies. The alert engine 322 can evaluate compliance data and system telemetry in near-real time or real time. When a violation or anomaly is detected, the alert engine 322 triggers automated notifications (such as digital alerts or on-chain events), and can include diagnostic data or remediation instructions. All alerts can be logged for auditability, and the alert engine's 322 thresholds and response behaviors can be dynamically adjustable based on evolving system states.

FIG. 4 illustrates an example environment 400 of a smart contract layer 402 within an agent management platform for verifying autonomous agents in multi-tiered distributed systems, in accordance with some implementations of the present technology. The smart contract layer 402 includes a parent service agreement module 404, a compliance verification module 406, a performance tracking module 408, a privacy-preserving engine 410, a multi-party orchestration engine 412, and a smart contract lifecycle management engine 414. The environment 400 can be implemented using components of example computer system 2600 illustrated and described in more detail with reference to FIG. 26. Likewise, implementations of example environment 400 can include different and/or additional components or can be connected in different ways.

The parent service agreement module 404 refers to a software component managing the formation, adaptation, and enforcement of obligations between the entity agent and downstream provider or sub-agent entities within the multi-tiered system. The parent service agreement module 404 enables the generation of standardized templates that can be dynamically instantiated according to specific agent roles, protocol state, or service context. Upon initiation, historical interaction data and machine-readable business rules can be used to forecast negotiation outcomes or proactively suggest amendments to the contractual terms. The parent service agreement module 404 can manage Service Level Expectation (SLE) definitions by translating requirements within smart contracts or agreements into measurable technical parameters (e.g., latency thresholds, uptime guarantees) and encoding these as monitorable variables inside smart contracts. During operation, the parent service agreement module 404 can track resource allocation states, such as payment flows or token-based disbursements, and trigger automated, condition-based value transfers when predefined thresholds or service proofs are detected on-chain. For enforcement, the parent service agreement module 404 maintains digitally encoded penalty clauses, such that if a monitored parameter falls out of compliance, the parent service agreement module 404 programmatically invokes corresponding penalty routines (e.g., withholding or debiting digital assets) without manual intervention.

The compliance verification module 406 uses ZK proof validation to enable parties to verify compliance without revealing sensitive underlying data. For example, when an agent claims compliance with a contractual obligation, the compliance verification module 406 receives a proof package structured to conceal underlying sensitive data. The compliance verification module 406 can check contract execution against predefined compliance criteria, triggering alerts or actions when deviations are detected. Validation processes can be fully automated, on contract execution or at scheduled compliance checkpoints, and can initiate protocol-defined responses or alert routines if deviations or violations are detected. The compliance verification module 406 can conduct certification checks by interfacing with external systems to validate and update the certification status of involved parties. The compliance verification module 406 maintains an audit trail by recording compliance-related activities and verifications in a blockchain-based log.

The performance tracking module 408 monitors and evaluates the operational execution of the smart contracts. The performance tracking module 408 ingests event logs, telemetry streams, and data feeds from agent interfaces and external sensors, such as IoT devices monitoring delivery or production metrics. The performance tracking module 408 parses contract terms to derive quantifiable performance indicators, translates these requirements into runtime queries, and then compares observed system behavior with expected benchmarks (e.g., SLA parameters, performance thresholds). As performance is measured against each benchmark, the performance tracking module 408 can automatically record trend data, detect anomalies or deviations, and/or update the compliance status signals for each involved party. The performance tracking module 408 can perform reputation updates, aggregating performance data to dynamically adjust trust or reliability indices/scores for involved parties (as described below in further detail with reference to FIG. 5), which can influence future execution parameters of the smart contract.

The privacy-preserving engine 410 enables parties to reveal only the required information on a need-to-know basis using role-based access controls to ensure that data and contract functionalities are accessible only to authorized entities based on their defined roles and permissions within the system. For example, each data transaction or contract function call is checked against an authenticated role and permission set. The privacy-preserving engine 410 enables operations to run directly on encrypted, tokenized, or obfuscated data structures, using techniques such as range evaluation, set membership approximation, or threshold validation, so that only the outcome (e.g., whether a number falls within a range or a status is affirmative) is revealed to the querying party rather than the underlying raw value. For example, the privacy-preserving engine 410 can use range proofs to demonstrate that a value falls within a specified range without disclosing the actual value, set membership verifications to prove inclusion in a set without revealing other set elements, and/or perform threshold checks to validate that certain conditions are met without exposing the specific data points involved in the evaluation.

The multi-party orchestration engine 412 uses a workflow engine to manage sequential approvals, ensuring that contract actions or state transitions occur in a predefined order and only when particular conditions are met. The multi-party orchestration engine 412 can use consensus rules that define how agreement is reached among multiple parties, which can include voting thresholds specifying the level of agreement required for different types of decisions, quorum requirements ensuring that a minimum number of participants are involved in decision-making processes, veto rights that allow designated parties to block certain actions under specified conditions, and so forth.

The smart contract lifecycle management engine 414 can manage a negotiation phase to facilitate the proposal of contract terms, respond to counter-offers through automated or semiautomated processes, and/or coordinate consensus among involved parties. The smart contract lifecycle management engine 414 tracks contract activation triggers, whether event-driven, time-based, or KPI-dependent, and monitors ongoing performance and compliance by ingesting near-real-time or real-time system data and executing rule-based state evaluation routines. The smart contract lifecycle management engine 414, for example, tracks KPIs, performs ongoing compliance checks, and executes adjustments to contract parameters or execution based on observed outcomes or changing conditions. In the settlement phase, the smart contract lifecycle management engine 414 manages resource (e.g., payment) releases by, for example, interfacing with digital payment systems. The smart contract lifecycle management engine 414 can manage dispute resolution processes that can include automated arbitration or integration with external dispute resolution systems. The smart contract lifecycle management engine 414 can further manage contract closure, ensuring all obligations are fulfilled, all parties are notified, and/or that the contract state is archived for future reference or audit purposes.

Figure 5:
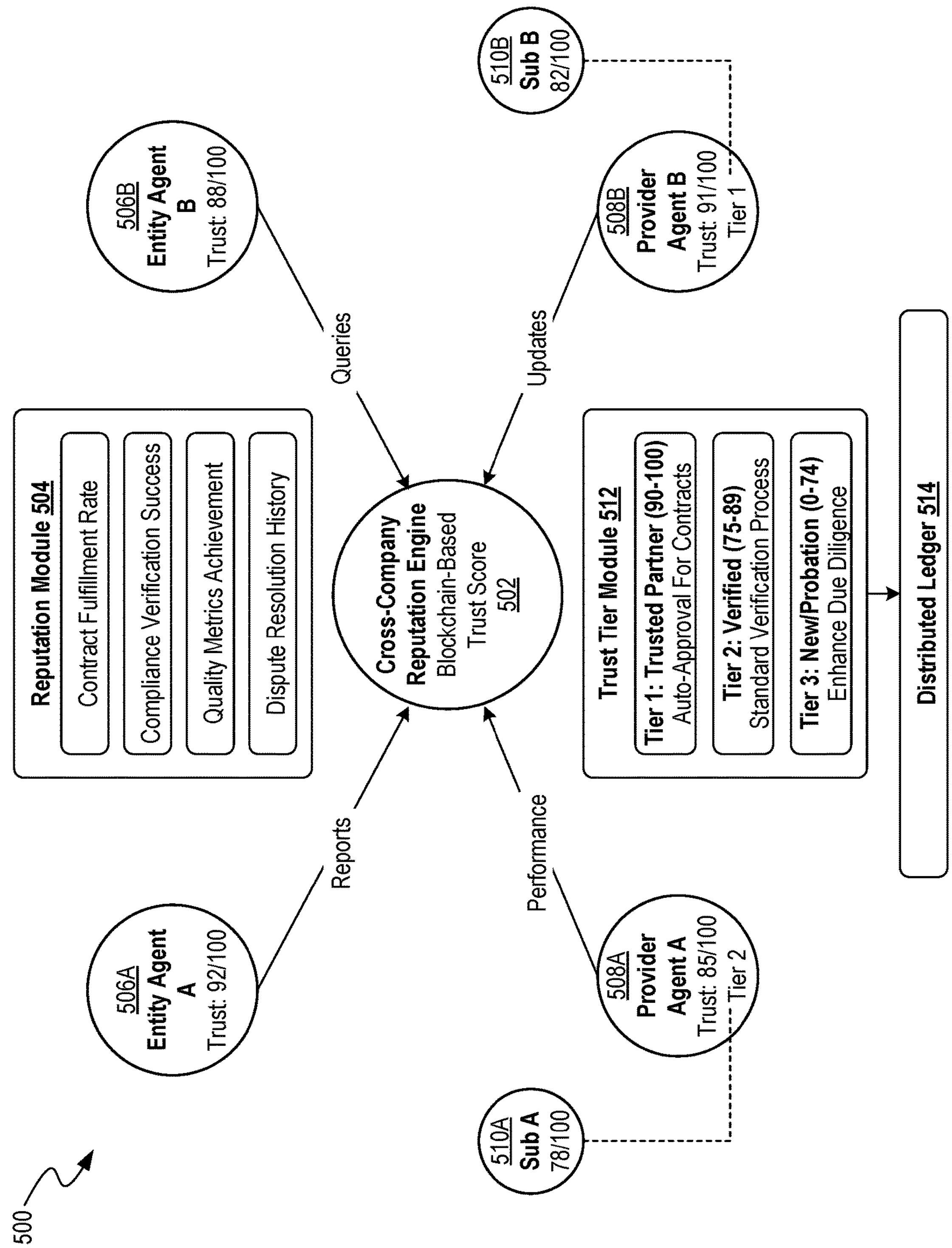
FIG. 5 illustrates an example environment of a reputation engine within an agent management platform for verifying autonomous agents in multi-tiered distributed systems, in accordance with some implementations of the present technology.

FIG. 5 illustrates an example environment 500 of a reputation engine 502 within an agent management platform for verifying autonomous agents in multi-tiered distributed systems, in accordance with some implementations of the present technology. The environment 500 can be implemented using components of example computer system 2600 illustrated and described in more detail with reference to FIG. 26. Likewise, implementations of example environment 500 can include different and/or additional components or can be connected in different ways.

The reputation engine 502 aggregates, processes, and maintains digital trust scores for agents (including entity agents, provider agents, and/or sub-agents) operating within the multi-tiered distributed system. The reputation engine 502 can continuously collect performance data, operational logs, compliance outcomes, and dispute resolution records from multiple system modules and external sources via authenticated data feeds. Upon receipt, the engine stores raw and processed data in a distributed ledger, such as a blockchain. Computational routines can be periodically executed on this data to recalculate trust scores based on updated metrics or changing network context. The reputation engine 502 exposes transaction endpoints through which agents can submit new records, query current scores, or request aggregated reports.

The reputation module 504 defines the concrete parameters and operational metrics used to compute trust scores for each agent. The reputation module 504 can encode a set of scoring metrics, which may include contract fulfillment rate (quantifying on-time and complete delivery of agreed tasks), compliance verification success (measuring the agent's historical adherence to requirements and standards), quality metric achievement (scoring based on objective outcomes such as error rate, defect absence, or service consistency), and dispute resolution history (capturing the agent's track record for resolving conflicts within protocol parameters). Data for the metrics can be ingested as time-series logs. Metric weightings can be dynamically recalibrated by system administrators or in response to particular received data signals (e.g., changes in sub-agents, provider agents, entity agents, and so forth).

The entity agents 506 (e.g., first entity agent 506A, second entity agent 506B) refer to agents representing primary organizations within the network. The entity agents 506 can transmit digitally signed operational reports, submit event records for scoring, and/or query the reputation engine 502 for up-to-date trust scores on itself or third parties. Trust scores for entity agents 506, such as the illustrative 92/100 (for agent 506A) and 88/100 (for agent 506B), can be computed through the weighted aggregation of the metrics provided by the reputation module 504. The reputation engine 502 can reconfigure weights based on factors such as industry vertical, contract type, or network risk signals. Updated trust scores can be recorded as transaction entries to the distributed ledger.

The provider agents 508 (e.g., first provider agent 508A, second provider agent 508B) refer to agents representing service providers or vendors. The provider agents 508 collect and submit quantitative performance data, such as delivery punctuality, transaction accuracy, and compliance proof submissions, to the reputation engine 502, where the data is used to update their corresponding trust scores (e.g., provider agent 508A: 85/100, provider agent 508B: 91/100). Trust scores can directly influence automated classification into tiers, which can be referenced by smart contracts and the multi-party orchestration engine for determining workflow paths, verification requirements, and/or permission or settlement protocols. The provider agents can receive automated trust score updates at a conclusion of each transactional or monitoring cycle.

The sub-agents 510 (e.g., first sub-agent 510A, second sub-agent 510B) refer to third-tier AI systems operating under the purview of provider agents. The trust scores for sub-agents (e.g., 510A: 78/100, 510B: 82/100) can be determined using hierarchical aggregation logic, in which a sub-agent's performance data is evaluated both independently (via direct metrics) and in the context of its parent provider agent's reputation footprint. Thus, trust signals can be weighted or modified by the performance and standing of supervising agents.

The trust tier module 512 can categorize agents into predefined categories or "tiers" (e.g., Tier 1, Tier 2, Tier 3) according to configurable threshold criteria. For instance, Tier 1 may be reserved for trust scores in the 90-100 range, enabling privileges such as smart contract auto-approval, whereas lower tiers (e.g., Tier 2: 75-89, Tier 3: 0-74) may impose graduated verification, additional review steps, or additional due diligence requirements. The module can dynamically shift tier boundaries in response to environmental signals, such as systemic changes in network risk, new regulatory mandates, or altered transaction volume.

The distributed ledger 514 refers to the underlying blockchain infrastructure that stores and validates reputation-related transactions and/or trust scores. Smart contracts deployed on the distributed ledger 514 automate the execution of reputation calculations, tier assignments, and access control based on trust scores. Transactions, reputation updates, and tier assignments can be encoded as cryptographically hashed, append-only record objects, providing an immutable audit trail and non-repudiable evidence chain for all trust management activities. The distributed ledger 514 exposes API endpoints to modules across the platform for both data retrieval and transactional submission.

Figure 6:
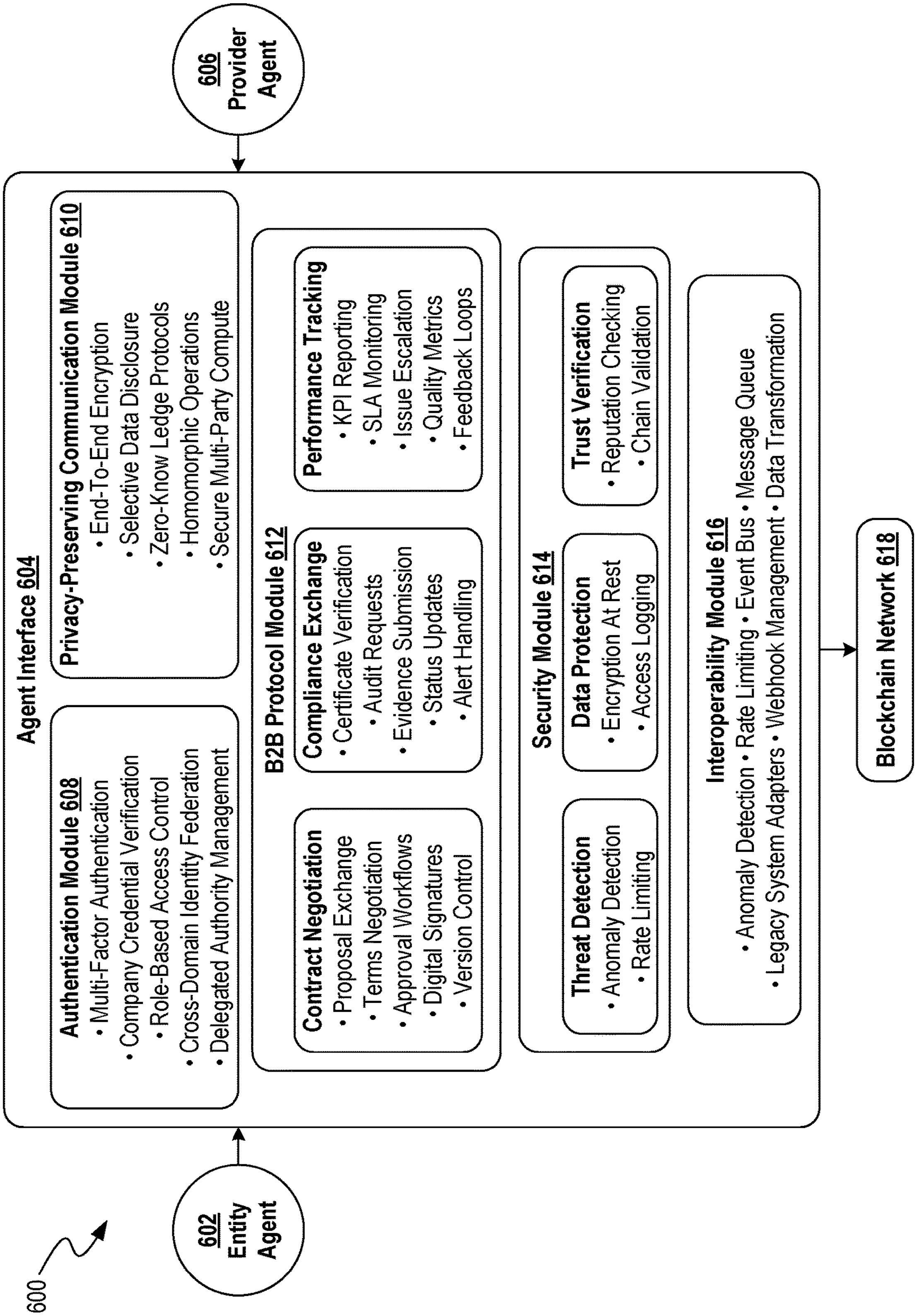
FIG. 6 illustrates an example environment of an agent interface within an agent management platform for enabling communication between autonomous agents in multi-tiered distributed systems, in accordance with some implementations of the present technology.

FIG. 6 illustrates an example environment 600 of an agent interface 604 within an agent management platform for enabling communication between autonomous agents in multi-tiered distributed systems, in accordance with some implementations of the present technology. The environment 600 can be implemented using components of example computer system 2600 illustrated and described in more detail with reference to FIG. 26. Likewise, implementations of example environment 600 can include different and/or additional components or can be connected in different ways.

The environment 600 includes an entity agent 602, the agent interface 604, and a provider agent 606. The agent interface 604 operates as an intermediary layer between different autonomous agents and provides a standardized set of protocols and services for inter-agent communication. The agent interface 604 includes an authentication module 608, a communication module 610, a protocol module 612, a security module 614, an interoperability module 616, and a network 618.

The authentication module 608 can be used to verify the identity and credentials of agents attempting to interact with the system. The authentication module 608 can implement multi-factor authentication, which may combine various authentication methods such as digital certificates, biometric data, and time-based one-time passwords. When an agent initiates a session or requests access to a protected operation, it submits authentication credentials, which may include digital certificates, biometric vectors, or one-time digital tokens. The authentication module 608 can compile these credentials into an authentication request, which is then compared against verifiable credential records stored within a distributed identity management registry. By employing digital signatures and time-based proofs, the authentication module 608 can ensure both the origin and validity of submitted credentials. Role-based access assignments can be invoked. Once authenticated, each agent's unique identity can be mapped to a predefined role that encodes permissions for actions and data access within the system. The authentication module 608 can enable federated authentication, allowing agents validated in external domains with compatible protocols to gain time-bound or task-specific authorization, managed through temporary access tokens and enforced expiration logic. All authentication and authorization events can be written as immutable logs, providing a permanent and auditable transaction trail.

The privacy-preserving communication module 610 uses end-to-end encryption to ensure that data remains secure throughout its transmission. Each communication session can generate a negotiated encryption context, so that transmitted packets are only intelligible to authorized senders and recipients. For interactions requiring minimal disclosure, the privacy-preserving communication module 610 can extract only the verification statements from agent data, then package the statements as proofs or attestations, which are relayed to requesting agents or subsystems. All non-essential data (i.e., data that is not the verification statement) can be withheld from transmission. When agents establish that they possess (or comply with) certain knowledge, rules, or properties without exposing the details, the privacy-preserving communication module 610 can generate and validate proof objects that confirm properties without disseminating the protected data. In collaborative scenarios involving multiple agents, the privacy-preserving communication module 610 enables computation routines that allow joint calculation or protocol advancement based solely on exchanged, privacy-preserving proofs, so that no party gains access to another's underlying inputs.

The business-to-business (B2B) protocol module 612 manages the interactions and data exchanges specific to entity-to-entity operations. Data packets including proposals, negotiation terms, and/or approval workflows can be formatted into standardized, machine-readable documents. When an entity submits a proposal, the B2B protocol module 612 routes the proposal to the recipient agent, which can accept, modify, or reject the proposal. Approved terms can be automatically registered as transaction records on the platform. For ongoing relationships, the B2B protocol module 612 can perform periodic transmission and archiving of KPI data, service level reports, and incident or escalation notices.

The security module 614 implements threat detection operations to identify potential security threats in real time or near-real time. As data and interaction requests flow through the platform, the security module 614 continuously inspects all payloads, session states, and event logs for anomalous patterns, unauthorized signatures, or deviations from known baselines of trusted agent behaviors. Whenever an interaction originates from an agent, the security module 614 cross-references the agent's trust profile (as derived from an internal reputation system or external trust registry) to determine whether access constraints should be applied. Should a pattern indicative of attack or policy violation be detected, the security module 614 automatically generates alerts, initiates session quarantines, or triggers protocol-level blocks.

The interoperability module 616 coordinates communications and protocol conversions between the current platform and external or legacy systems. The interoperability module 616 maintains an event bus, which refers to an internal messaging infrastructure that receives, packages, and sequentially distributes events, data packets, or notifications to all relevant modules. Upon receiving data from outside systems, the interoperability module 616 adapts and transforms legacy or non-standard data formats to the agent management platform's schema, validates external signatures, and injects integration events onto the bus. In reverse, when outgoing communications target older or third-party systems, the interoperability module 616 translates structured records into compatible formats and manages delivery channels.

The blockchain network 618 refers to the underlying distributed ledger technology that enables immutable recording of transactions and interactions between agents. Each agent or organization may operate a node within this network, which receives transaction proposals, bundles them into blocks, and participates in decentralized validation cycles. Upon reaching protocol consensus, new blocks are appended to the shared ledger, and all network participants synchronize their local copies, ensuring a single, non-repudiable source of truth. Contract terms, permissions changes, dispute resolutions, and audit logs can be stored as structured records within the ledger. Smart contracts deployed to the blockchain automate the enforcement of agreement conditions. When conditions are satisfied or violated by agent actions, the contracts autonomously trigger or prevent subsequent operations (such as payment release or service continuation).

Figure 7:
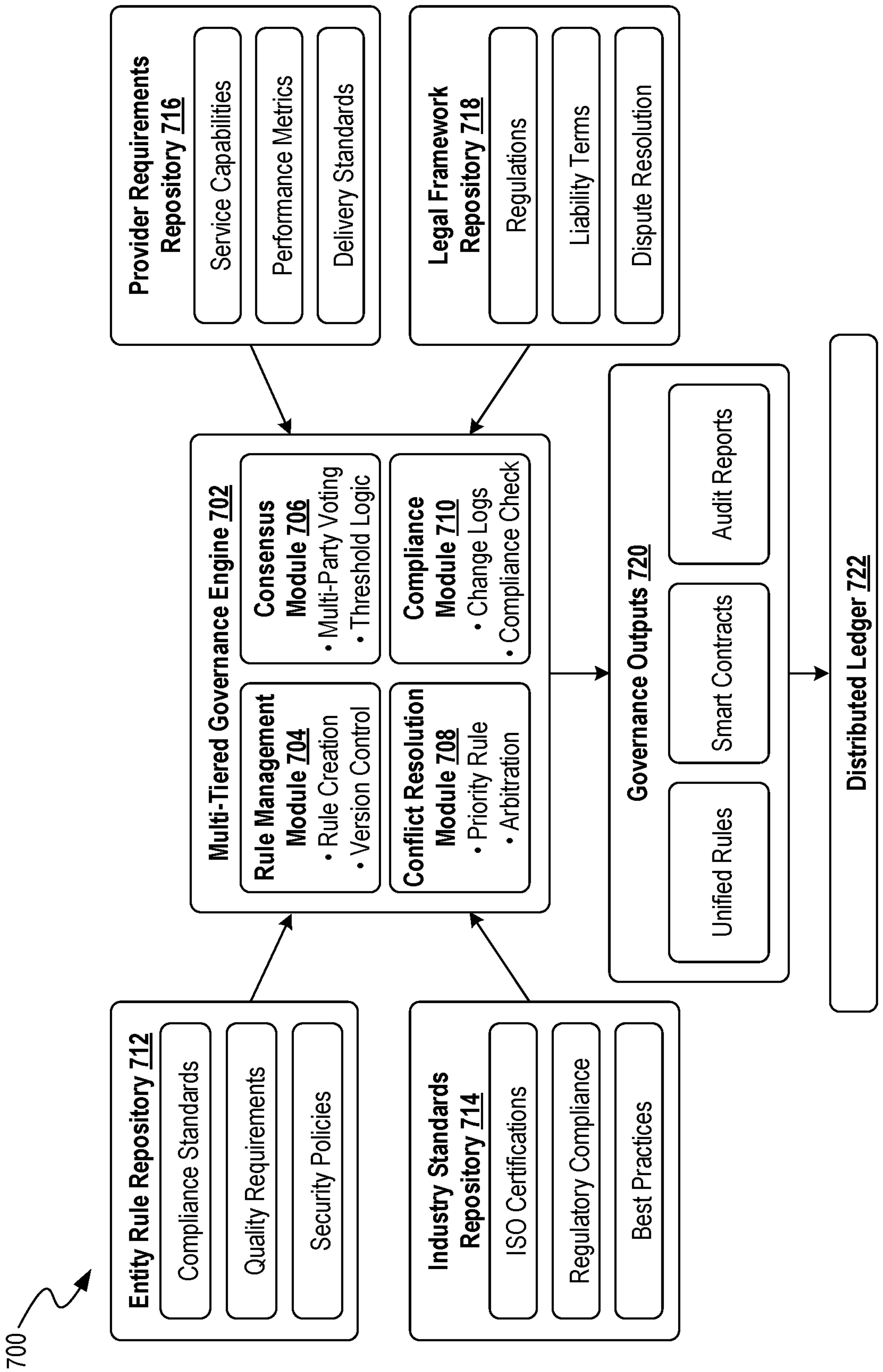
FIG. 7 illustrates an example environment of a governance engine within an agent management platform defining operative boundaries of autonomous agents in multi-tiered distributed systems, in accordance with some implementations of the present technology.

FIG. 7 illustrates an example environment 700 of a governance engine within an agent management platform defining operative boundaries of autonomous agents in multi-tiered distributed systems, in accordance with some implementations of the present technology. The environment 700 can be implemented using components of example computer system 2600 illustrated and described in more detail with reference to FIG. 26. Likewise, implementations of example environment 700 can include different and/or additional components or can be connected in different ways.

The governance engine 702 refers to a modular computational subsystem that can be implemented as a federated service using distributed microservices, or as a containerized software runtime within a cloud environment, and is configured to ingest, process, normalize, and propagate governance policies and requirements across the agent management platform. The governance engine 702 can receive inputs such as rule definitions, change proposals, compliance logs, contract state transitions, and external legal updates and transform these inputs into actionable governance outputs and audit artifacts consumed by downstream modules using, for example, rule-based mappings.

Within the governance engine 702, the rule management module 704 operates to generate and/or update machine-readable rule sets and governance logic. The rule management module 704 may provide user-facing APIs or agent-accessible endpoints for submission, validation, and approval of new or revised rules. When a new rule is added, the rule management module 704 can store the rules as persistent objects, which can be appended with metadata such as authorship, version sequence, timestamps, and digital signatures. Rule updates and deprecations can be similarly managed, with each event producing immutable change records. In some implementations, the rule management module 704 may be integrated with external policy sources or receive input from industry-specific domain ontologies.

The consensus module 706 mediates multi-party decision-making regarding policy adoptions, updates, or dispute adjudications. The consensus module 706 aggregates stakeholder votes, agent endorsements, or digital ballots according to predetermined voting schemas, such as majority, supermajority, or weighted-reputation methods, and continuously transforms submitted votes into single, deterministic consensus results. The consensus module 706 can validate submitted ballots for authenticity and eligibility, compute attested outcomes and propagate consensus state changes to other system modules.

The conflict resolution module 708 detects, logs, and/or resolves policy or data conflicts that may arise from asynchronous actions, competing rule updates, or network-level adversarial behavior. The conflict resolution module 708 ingests divergent state records, contradictory rule changes, or evidence of operational anomaly and executes rule-based or adjudication workflows for alignment, rollback, or dispute mediation. Conflict resolution can include automated precedence logic, voting resolution by a select panel, or escalation to external arbiters (e.g., administrators). Each resolution operation can be logged with immutable event records, such as before-and-after state hashes.

The compliance module 710 validates agent and workflow conformance with approved rules, contract clauses, and regulatory requirements. The compliance module 710 receives compliance criteria from the rule management module, applies these checks to event streams and agent actions (such as transaction logs or resource allocation events), and/or records the outcome of each compliance assessment as a machine-readable verdict (e.g., pass/fail, out-of-bounds, or escalation-needed). The compliance module 710 can trigger automated enforcement actions, such as penalties, role adjustments, or notifications to other governance elements in the case of detected violations.

The entity rule repository 712 refers to a persistent, version-controlled data store for storing rules and policies authored by or otherwise associated with the primary organizational entity. The entity rule repository 712 may be implemented as a distributed, append-only ledger, a cloud-based document datastore, or a blockchain state channel backing and stores each rule entry with structured metadata and historical lineage to support provenance and audit tracing. Rule entries can be retrieved by authorized governance engine components to inform real-time compliance, update cascades, or versioned change reconciliations.

The industry standards repository 714 refers to a persistent storage and retrieval subsystem maintaining externally sourced or standardized policy objects, such as ISO standards, industry frameworks, or regulatory reference rulesets. The industry standards repository 714 can operate both as a near-real-time or real-time policy lookup (enabling the governance engine to map internal rules to external obligations) as well as a historical policy audit log (storing timestamped records of standards in effect at any given time). The industry standards repository 714 can receive inputs from third-party data feeds or manual data import. The provider requirements repository 716 refers to a structured data store identifying input requirements stipulated by providers, vendors, or external agents interacting with the platform. The provider requirements repository 716 ensures that provider-specific obligations, such as quality metrics, delivery guarantees, or compatibility thresholds, are encoded as structured objects, transformed to match internal taxonomies, and evaluated against respective agents for operational alignment. The legal framework repository 718 refers to a database that manages codified legal requirements and regulatory provisions applicable to the system and its agents. The legal framework repository 718 can be updated with jurisdictional and cross-jurisdictional legal texts, statutory obligations, and case law and operates to provide an authoritative reference during rule design, compliance checks, or dispute resolutions. Repository entries can be annotated to indicate applicable regions, effective dates, and citation sources.

Governance outputs 720 refer to the collection of artifacts generated by the governance engine 702 to identify system policies, compliance verdicts, and audit traces. Governance outputs 720 may include signed compliance certificates, change-of-state notifications, escalation alerts, conflict resolution records, and machine-readable configuration changes. Governance outputs 720 can be formatted for automated consumption by other system modules, downstream agents, or audit platforms. The distributed ledger 722 can validate and/or store the governance outputs 720 and can supply synchronous and/or asynchronous data access to system components and external auditors.

Figure 8:
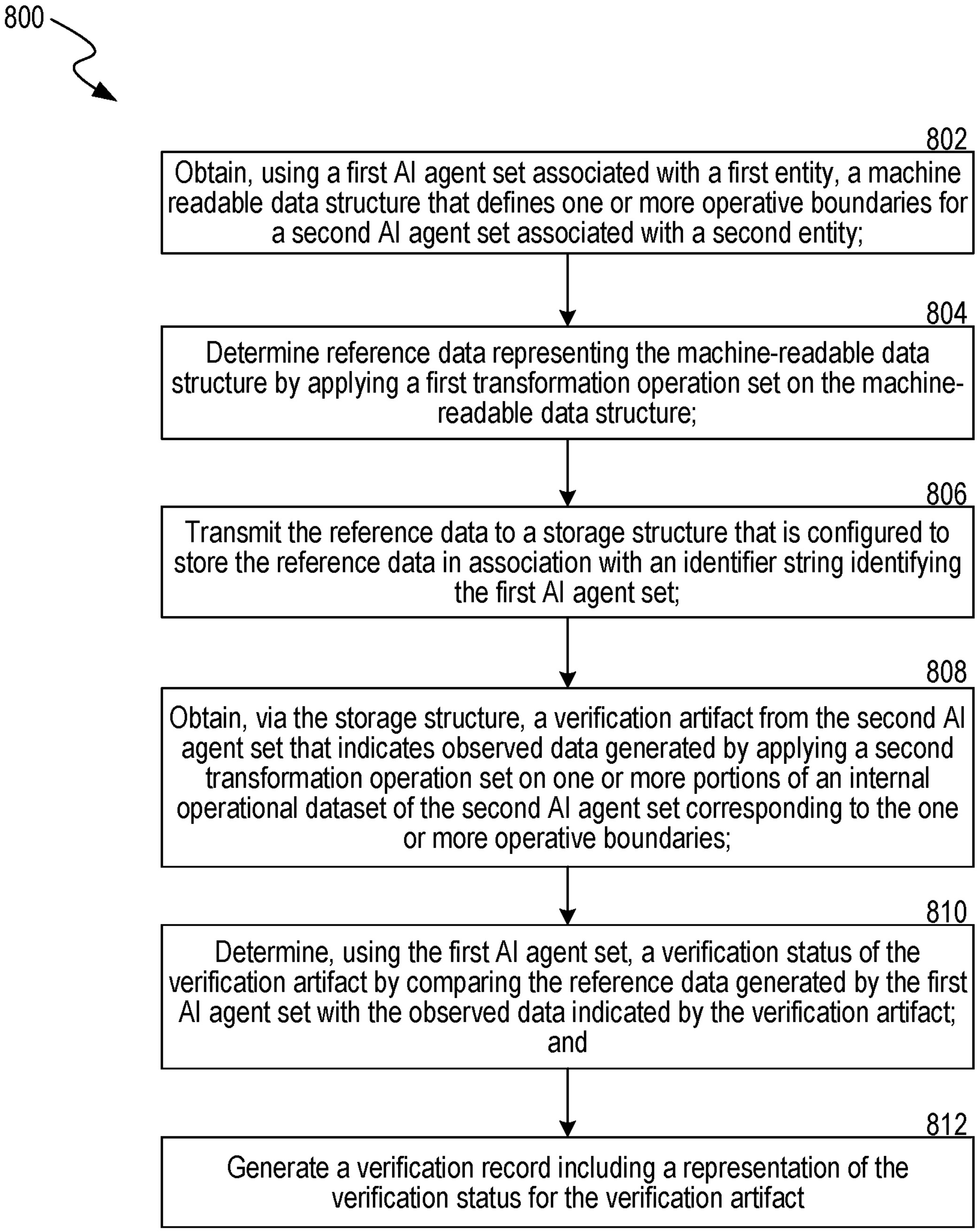
FIG. 8 is a flow diagram illustrating an example process of verifying autonomous agents in multi-tiered distributed systems using an agent management platform, in accordance with some implementations of the present technology.

FIG. 8 is a flow diagram illustrating an example process 800 of verifying autonomous agents in multi-tiered distributed systems using an agent management platform according to some implementations of the present technology. In some implementations, the process 800 is performed by a computer system, e.g., example computer system 2600 illustrated and described in more detail with reference to FIG. 26. Implementations can include different and/or additional operations or can perform the operations in different orders.

In operation 802, the agent management platform can obtain, using a first AI agent associated with a first entity (i.e., the primary organization), a machine-readable data structure (i.e., a requirements hash) that defines one or more operative boundaries for a second AI agent associated with a second entity (e.g., representing organizational guidelines, industry standards, or provider criteria). The machine-readable data structure can indicate permissible value ranges for model parameters (e.g., weight coefficients of a neural network) of a second AI agent (e.g., a provider agent), a data signal used in operation of the second AI agent (e.g., feature vectors, event traces), information related to a completed computational operation of the second AI agent (e.g., specifications of allowable outputs for completed computational operations such as a result set cardinality, data type conformance, or adherence to external regulatory normative), and the like. For example, the first AI agent can obtain the machine-readable data structure through an API call. If the operative boundary includes references to dynamic or externally sourced values (such as regulatory rules that change over time), the first AI agent fetches the current authoritative values from one or more predefined "trusted" sources.

In operation 804, the agent management platform can generate/determine a unique fixed reference value (e.g., reference data, or encrypted requirements query generated by privacy-preserving protocol layer) representing the machine-readable data structure by applying a first transformation operation set (e.g., a cryptographic hash function, a keyed hash function, or a deterministic encoding function) on the machine-readable data structure. To generate the unique fixed reference value representing the machine-readable data structure, the agent management platform can serialize the input structure, such as an object with nested fields and values, into a canonical byte sequence that captures its hierarchical arrangement and/or data content in a format agnostic to particular differences (such as field order or whitespace). The agent management platform can process the resulting byte sequence through a deterministic and/or fixed-size transformation operation by mapping the entire data structure, regardless of its original length or complexity, into a compact, uniquely identifying fixed-length output. Therefore, the agent management platform can generate the same output for any two semantically equivalent inputs, yet yield distinctly different results for even minor changes within the original data.

In operation 806, the agent management platform can transmit the unique fixed reference value to a multi-agent storage (e.g., storage structure such as a distributed ledger or blockchain). In some implementations, the storage structure is a distributed ledger. The verification record can be stored as a transaction on the distributed ledger. The multi-agent storage can include a memory structure accessible to multiple AI agents including the first AI agent and the second AI agent. The multi-agent storage can store the unique fixed reference value in association with an identifier, such as an identifier string (e.g., name or unique code), identifying the first AI agent. For example, before the transaction is transmitted, the agent management platform can digitally sign the transaction using a private cryptographic key of the submitting agent. The signed record can be broadcast to all nodes or participants in the storage structure, where the record can be checked and validated according to the agent management platform's rules for consensus. Once approved, the transaction can be permanently added to the storage structure.

In operation 808, the agent management platform can obtain/receive, via the multi-agent storage, a verification artifact (e.g., compliance proof) from the second AI agent that indicates an observed value (e.g., a commitment value) generated by applying a second transformation operation set (e.g., a different hash/binding function such as a a cryptographic hash function, a cryptographic commitment, or a zero-knowledge proof) on one or more portions of an internal operational dataset of the second AI agent corresponding to the one or more operative boundaries.

In some implementations, the second AI agent generates a transaction that includes the artifact (such as the hash or proof) and transmits the transaction to a blockchain or distributed ledger, where it is stored immutably and associated with submitting the second AI agent's unique identifier. In some implementations, the artifact is uploaded to a shared cloud repository or decentralized file system with an indexed reference stored on a ledger. The agent management platform can obtain the verification artifact by querying the multi-agent storage using the agent's identifier or other transaction metadata. The agent management platform can retrieve the artifact and/or associated metadata such as timestamps or digital signatures.

In operation 810, the agent management platform can determine, using the first AI agent, a verification status (e.g., compliance status) of the verification artifact by comparing the unique fixed reference value generated by the first AI agent with the observed value indicated by the verification artifact. In some implementations, the verification artifact includes a zero-knowledge proof generated by the second AI agent. The zero-knowledge proof can indicate that the internal operational dataset satisfies the one or more operative boundaries defined by the machine-readable data structure. The verification status can be determined using the zero-knowledge proof. For sequential approvals, the verification artifact can be routed to a plurality of AI agents within the first AI agent set in a predetermined sequence. Each AI agent in the predetermined sequence can generate an agent-specific verification status indicating satisfaction of the verification artifact with the one or more operative boundaries.

For example, if both values are cryptographic hashes, the agent management platform performs a direct byte-to-byte equality check, where a match confirms that the second agent's internal dataset satisfies the operative boundaries, resulting in a positive compliance (or verification) status, while a mismatch triggers a noncompliance flag. In some implementations, such as when the verification artifact includes a ZK proof, the first AI agent can operate as a verifier by using the original reference value and the ZK proof to validate that the second agent's internal dataset meets essential boundaries without revealing the data itself using cryptographic operations (specific to a ZK protocol chosen, such as verifying elliptic curve pairings for zk-SNARKs or checking inner product equations for Bulletproofs). If the ZK proof is valid, the compliance status indicates that the second AI agent is verified. In some implementations, if the verification status indicates that the observed value satisfies the unique fixed reference value, the AI agents can share portions of data. For example, the agent management platform autonomously executes, using the first AI agent, one or more computer-implemented actions to transmit one or more portions of a respective internal operational dataset to the second AI agent. In some implementations, the agent management platform can automatically approve/verify, using the first AI agent, a transaction associated with the second AI agent in response to the reputation score exceeding a predetermined threshold.

To implement reputation-based scoring, the agent management platform can determine, using the first AI agent, a reputation score for the second AI agent based on a plurality of verification artifacts associated with the second AI agent. The reputation score can be determined by a weighted average of one or more verification statuses indicating satisfaction of a respective observed value with a respective unique fixed reference value, a decay value applied on one or more verification statuses based on a time since last failure of satisfaction of the respective observed value with the respective unique fixed reference value, a penalty value applied on one or more verification statuses indicating a failure of satisfaction of the respective observed value with the respective unique fixed reference value, and so forth. For example, historical verification statuses for previously evaluated verification artifacts of agents can be standardized into a score or flag, such as corresponding numerical representations (e.g., 1 for pass, 0 for fail). The agent management platform can apply a time-based decay such that older scores are discounted relative to more recent events by multiplying scores by a decay factor that decreases as the age of each event increases. Failures can cause the agent management platform to apply penalty adjustments by subtracting predefined amounts to reduce the overall score. The agent management platform can assign, using the first AI agent set, a reputation score for the second AI agent set based on a plurality of verification artifacts associated with a third AI agent set (e.g., a sub-agent) associated with a third entity using the same or similar methods described above with reference to determining the reputation score for the second AI agent.

In some implementations, the agent management platform can assign, by the first AI agent, a probationary status to the second AI agent in response to the reputation score being within a predetermined range. The agent management platform can remove the probationary status from the second AI agent in response to the reputation score exceeding the predetermined range for a predetermined time period. For example, the reputation score can be compared against lower and upper numeric bounds specifically designated for probation. If the score meets this conditional range, a "probationary" flag or marker can be programmatically added to the status metadata of the second agent within an agent directory or profile registry by updating a structured status field and/or triggering additional controls such as restricted permissions or increased monitoring. While in the probationary state, the agent management platform can continuously or periodically reevaluate the agent's reputation score at periodic intervals or upon event triggers (such as new verification artifacts). If the score rises above the probationary threshold and/or remains there for a defined observation period, the probationary flag can be removed.

To implement voting when determining consensus between a plurality of agents, the agent management platform can determine, using each AI agent of the first AI agent set, an agent-specific verification status for a particular verification artifact. The agent management platform can determine the verification status (e.g., a "yes," "no," or a numerical confidence score) based on a number of respective agent-specific verification statuses indicating satisfaction of the second AI agent set with the one or more operative boundaries exceeding a predetermined threshold (for example, requiring a simple majority, supermajority, or a minimum reputation-weighted score).

In operation 812, the agent management platform can autonomously generate a verification record (e.g., blockchain transaction) including a representation of the verification status for the verification artifact, a timestamp, a digital signature of the first AI agent, and/or an indication of the machine-readable data structure. In some implementations, the agent management platform transmits (e.g., via APIs or direct smart contract calls) the verification record to the multi-agent storage, wherein the verification record is stored in association with respective identifier strings identifying the first AI agent and the second AI agent. To notify an administrator/supervisor of noncompliance in cases where the verification status indicates that the observed value fails to satisfy the unique fixed reference value, the agent management platform can transmit, by the first AI agent, a notification message to a predetermined network address indicating the verification status for the verification artifact.

The agent management platform can generate, by the second AI agent, a second verification record including a representation of a second verification status for a third AI agent associated with a third entity. The agent management platform can store the second verification record in the multi-agent storage in association with respective identifier strings identifying the second AI agent and the third AI agent.

Figure 9:
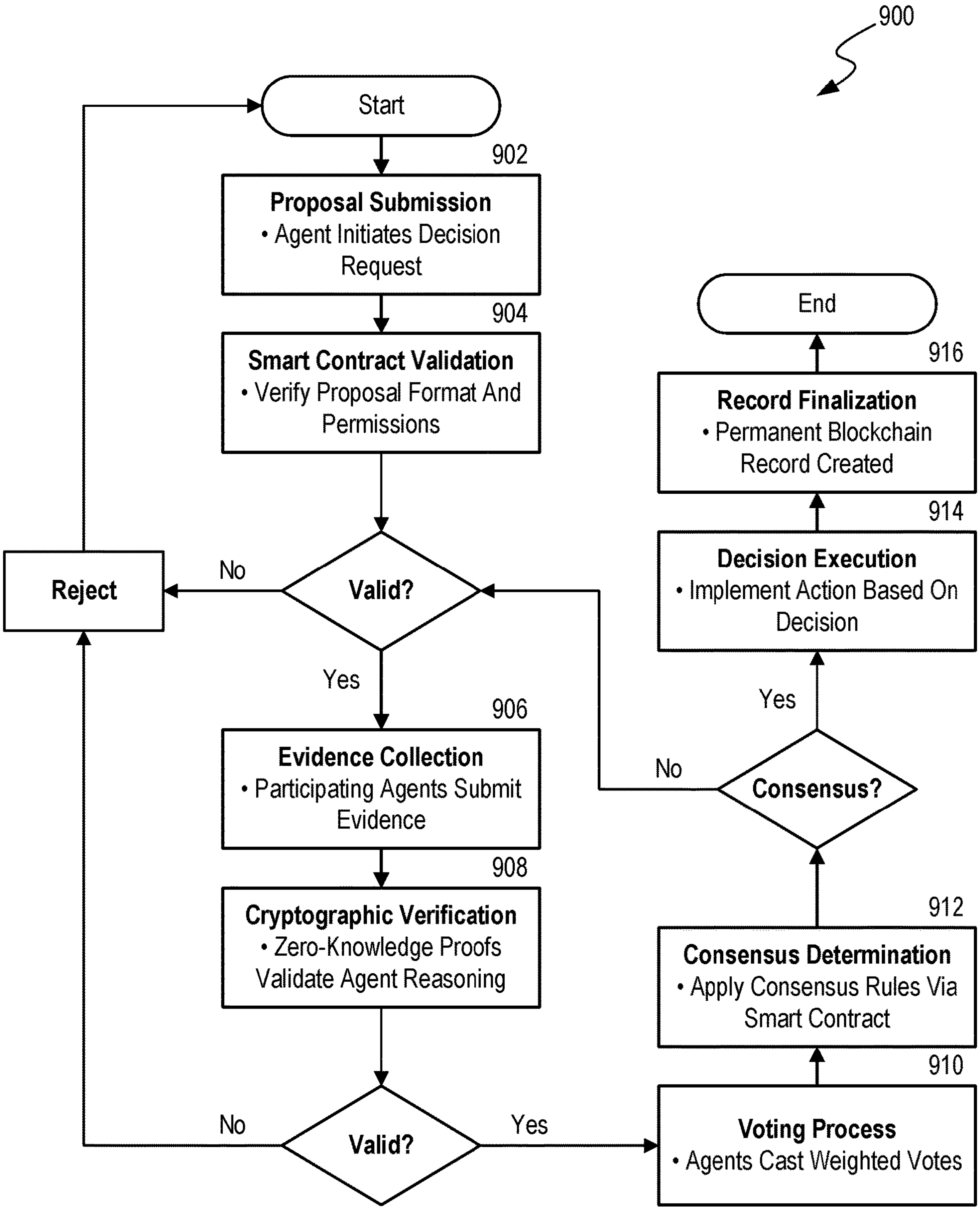
FIG. 9 is a flowchart that illustrates an example process for encrypted autonomous agent execution using cross-verification methods, in accordance with some implementations of the present technology.

FIG. 9 is a flowchart that illustrates an example process for encrypted autonomous agent execution using cross-verification methods in accordance with some implementations of the present technology. The process 900 can be performed by a platform (e.g., agent management platform) configured to enable secure decision-making workflows between autonomous agents operating within multi-tiered distributed systems while maintaining cryptographic verification and consensus mechanisms. In one example, the platform includes at least one hardware processor and at least one non-transitory memory storing instructions, which, when executed by the at least one hardware processor, cause the platform to perform the process 900. In another example, the platform includes a non-transitory, computer-readable storage medium comprising instructions recorded thereon, which, when executed by at least one data processor, cause the platform to perform the process 900.

At block 902, the platform can initiate a proposal submission where an agent submits a decision request to commence the encrypted decision-making workflow. In some implementations, the agent can generate a structured proposal that includes machine-readable parameters defining the scope, objectives, and constraints of the requested decision. The proposal submission mechanism can operate through the agent interface 604 which formats the request into a standardized protocol message that includes cryptographic signatures, timestamp data, and agent identification credentials (e.g., digital certificates, public key identifiers, authentication tokens, and/or the like). The platform can validate the submitting agent's authorization level by cross-referencing the agent's credentials against the entity rules repository 110 or provider requirements repository 716 to ensure the agent possesses the necessary permissions to initiate decision processes within the environment 100. The proposal data structure can include encoded decision parameters, resource requirements, timeline constraints, and compliance criteria that define the operational boundaries for the requested decision (e.g., budget limits, regulatory standards, quality thresholds, and/or the like). The platform can generate a unique proposal identifier using cryptographic hashing functions that create an immutable reference to the submitted proposal, enabling subsequent tracking and verification throughout the decision workflow while maintaining data integrity and non-repudiation properties.

At block 904, the platform can execute a smart contract validation to verify proposal format and permissions before proceeding with the decision-making process. In some implementations, the smart contract layer 118 can receive the proposal submission and perform automated validation routines that examine the structural integrity, data completeness, and authorization credentials of the submitted request. The validation process can include format verification where the smart contract examines the proposal's data structure against predefined schemas to ensure all required fields are present and properly formatted (e.g., numerical values within acceptable ranges, text fields containing valid character sets, timestamp formats conforming to ISO standards, and/or the like). The smart contract 206 can execute permission checks by querying the distributed ledger 514 to verify that the submitting agent possesses the necessary authorization levels and has not exceeded any rate limits or resource quotas established by the governance outputs 720. The validation mechanism can include cryptographic signature verification where the smart contract uses public key cryptography to authenticate the proposal's origin and ensure the submission has not been tampered with during transmission. The platform can perform compliance pre-screening where the smart contract evaluates the proposal against regulatory requirements stored in the legal framework repository 718 and industry standards repository 714 to identify potential compliance issues before proceeding to evidence collection phases.

At block 906, the platform can perform evidence collection where participating agents submit relevant data and supporting documentation to inform the decision-making process. In some implementations, the evidence collection mechanism can operate through the privacy-preserving communication module 610 which enables agents to submit sensitive operational data while maintaining confidentiality through cryptographic protection methods. The participating agents can include the entity agent 202, provider agent 208, and associated sub-agents operating within the subcontractor network 124, each contributing domain-specific evidence relevant to the proposed decision. The evidence submission process can include data packaging where agents transform their internal operational datasets into standardized evidence artifacts using transformation operations (e.g., cryptographic hash functions, zero-knowledge proof generation, homomorphic encryption, and/or the like). The platform can perform evidence validation where the smart contract verification layer 314 examines submitted evidence for completeness, authenticity, and relevance to the decision parameters established during proposal submission. The cascade verification engine 316 can coordinate evidence collection across multiple tiers of the agent hierarchy, ensuring that sub-agents provide necessary supporting data while the rule inheritance engine 318 applies appropriate evidence requirements based on the inherited rules 310 applicable to each participating agent. The evidence aggregation process can include temporal synchronization mechanisms that ensure all evidence submissions are collected within specified time windows and cryptographically timestamped to maintain audit trail integrity.

At block 908, the platform can execute cryptographic verification using zero-knowledge proofs to validate agent reasoning without exposing sensitive underlying data. In some implementations, the cryptographic verification process can operate through specialized cryptographic modules that implement privacy-preserving protocols including zk-SNARKs, zk-STARKs, and bulletproof systems to enable verification of agent compliance and reasoning validity. The verification mechanism can include proof generation where participating agents create zero-knowledge proofs that demonstrate their internal decision-making processes satisfy the operative boundaries defined in the original proposal without revealing proprietary processes, sensitive data, or competitive information (e.g., pricing models, supplier relationships, internal performance metrics, and/or the like). The platform can incorporate multi-party computation protocols that enable collaborative verification where multiple agents jointly validate evidence and reasoning without exposing their individual contributions to other participants. The cryptographic verification engine can implement homomorphic encryption techniques that allow mathematical operations to be performed directly on encrypted data, enabling agents to participate in collective decision-making while maintaining data confidentiality. The verification process can include range proofs that demonstrate numerical values fall within acceptable parameters, set membership proofs that confirm agent capabilities align with requirements, and threshold signatures that enable distributed authorization without revealing individual agent positions. The platform can perform verification artifact generation where the cryptographic verification module 1002 produces machine-readable proof objects that can be independently validated by external parties while preserving the privacy of underlying operational data.

At block 910, the platform can conduct the voting process where agents cast weighted votes based on their reputation scores and domain expertise. In some implementations, the voting mechanism can operate through the consensus module 706 which implements voting protocols that account for agent reputation, historical performance, and domain-specific expertise when weighting individual vote contributions. The voting process can include vote weighting calculations where the reputation module 504 provides trust scores for participating agents, and these scores are applied as multipliers to individual vote values to reflect the relative reliability and expertise of each participant (e.g., agents with higher compliance verification success rates receive increased vote weights, agents with recent performance issues receive reduced influence, and/or the like). The platform can perform secure vote casting where agents submit encrypted vote data through the privacy-preserving communication module 610, ensuring vote confidentiality while maintaining the ability to verify vote authenticity through cryptographic signatures. The voting mechanism can implement various consensus protocols including simple majority, supermajority, and weighted reputation-based thresholds depending on the decision type and risk level established during proposal submission. The trust tier module 512 can influence voting parameters by applying different quorum requirements and vote weighting schemes based on the tier classification of participating agents (e.g., Tier 1 agents with scores of 90-100 receive standard voting weights, Tier 2 agents with scores of 75-89 receive reduced weights, Tier 3 agents require additional verification steps, and/or the like). The platform can perform vote aggregation where the platform collects all submitted votes, applies appropriate weighting factors, and calculates preliminary consensus results while maintaining cryptographic audit trails for all voting activities.

At block 912, the platform can execute a consensus determination where consensus rules are applied via smart contract logic to evaluate whether sufficient agreement has been reached among participating agents. In some implementations, the consensus determination mechanism can operate through the smart contract layer 118 which implements programmable consensus rules that automatically evaluate vote tallies against predefined thresholds and decision criteria established during the proposal validation phase. The consensus evaluation process can include threshold analysis where the smart contract examines the weighted vote totals and compares them against minimum consensus requirements, which can vary based on decision type, risk level, and regulatory requirements stored in the legal framework repository 718 (e.g., routine operational decisions requiring simple majority, strategic decisions requiring supermajority, compliance-critical decisions requiring unanimous agreement, and/or the like). The platform can perform quorum verification where the platform ensures sufficient participation levels have been achieved by validating that the minimum number of required agents have submitted valid votes, with quorum requirements potentially varying based on the trust tier module 512 classifications of participating agents. The consensus determination logic can implement decision trees that account for multiple factors including vote distribution patterns, agent reputation scores, evidence quality assessments, and potential conflicts of interest among participating agents. The smart contract can execute tie-breaking mechanisms when vote tallies are inconclusive, potentially including escalation to higher-tier agents, extended deliberation periods, or additional evidence collection rounds. The platform can perform consensus validation where the platform generates cryptographic proofs of the consensus determination process, creating immutable records that demonstrate the decision-making process followed established protocols and achieved legitimate consensus among authorized participants.

At block 914, the platform can perform decision execution to implement actions based on the consensus decision reached through the voting and consensus determination processes. In some implementations, the decision execution mechanism can operate through the multi-party orchestration engine 412 which coordinates the implementation of approved decisions across multiple agents and system components while maintaining synchronization and consistency throughout the execution process. The execution process can include workflow generation where the platform creates detailed implementation plans that specify the sequence of actions, resource allocations, and coordination requirements necessary to effectuate the approved decision (e.g., contract modifications, resource transfers, compliance updates, performance adjustments, and/or the like). The platform can incorporate atomic execution protocols that ensure either all required actions are completed successfully or the entire execution is rolled back to prevent partial implementation states that could compromise system integrity. The decision execution engine can coordinate with the smart contract lifecycle management engine 414 to manage complex execution workflows that span multiple phases including preparation, implementation, monitoring, and completion verification. The execution process can include real-time monitoring where the performance tracking module 408 continuously observes execution progress and validates that implemented actions conform to the approved decision parameters and maintain compliance with applicable regulatory requirements. The platform can perform execution verification where participating agents provide cryptographic confirmations of their individual action completions, enabling the platform to maintain comprehensive audit trails and ensure accountability throughout the implementation process. The execution mechanism can implement rollback capabilities that enable the platform to reverse implemented actions if execution failures or compliance violations are detected during the implementation process.

At block 916, the platform can conclude with record finalization where permanent blockchain records are created to document the complete decision-making process and execution outcomes. In some implementations, the record finalization mechanism can operate through the distributed ledger 514 which creates immutable, cryptographically secured records that capture all aspects of the decision workflow including proposal details, evidence submissions, voting records, consensus determinations, and execution confirmations. The finalization process can include comprehensive data compilation where the platform aggregates all transaction logs, cryptographic proofs, agent interactions, and execution results into structured record objects that provide complete auditability and traceability for the entire decision process (e.g., proposal timestamps, evidence hashes, vote tallies, consensus proofs, execution confirmations, and/or the like). The platform can perform cryptographic sealing where the compiled records are processed through hash functions and digital signatures to create tamper-evident record packages that can be independently verified by external auditors or regulatory authorities. The record finalization engine can generate multiple record formats including human-readable audit reports, machine-readable transaction logs, and cryptographic proof artifacts that serve different stakeholder needs while maintaining consistency and completeness across all record types. The blockchain storage mechanism can implement redundant storage across multiple nodes within the blockchain network 618 to ensure record persistence and availability even in the event of individual node failures or network disruptions. The platform can perform record indexing where the platform creates searchable metadata structures that enable efficient retrieval of historical decision records based on various criteria including agent identifiers, decision types, time ranges, and outcome classifications, supporting ongoing governance, compliance monitoring, and performance analysis activities throughout the agent management platform.

FIG. 10 is a block diagram that illustrates a cryptographic verification environment 1000 for privacy-preserving validation of agent reasoning in accordance with some implementations of the present technology. As shown in FIG. 10, the cryptographic verification environment 1000 can include a cryptographic verification module 1002. In some implementations, the cryptographic verification environment 1000 can enable privacy-preserving validation of agent reasoning and contributions within multi-tiered distributed systems while maintaining operational data confidentiality of respective autonomous agents. The cryptographic verification environment 1000 can be implemented using components of the computer system 2600 illustrated and described in more detail with reference to FIG. 26. The cryptographic verification environment 1000 can operate as a specialized computational infrastructure that facilitates secure verification processes between autonomous agents without exposing sensitive details, proprietary data structures, or competitive information (e.g., internal decision-making logic, performance metrics, operational parameters, and/or the like). The cryptographic verification environment 1000 can implement cryptographic protocols that enable agents to demonstrate compliance with operative boundaries while preserving the confidentiality of underlying datasets and computational processes. The cryptographic verification environment 1000 can include distributed processing capabilities that coordinate verification activities across multiple computational nodes, ensuring scalability and fault tolerance for large-scale multi-agent environments. For example, the cryptographic verification environment 1000 can manage verification workflows for supply chain compliance scenarios where multiple vendor agents must demonstrate adherence to quality standards without revealing proprietary manufacturing processes, pricing structures, or supplier relationships. In another example, the cryptographic verification environment 1000 can facilitate regulatory compliance verification where financial services agents can prove adherence to risk management requirements without exposing sensitive customer data, trading processes, or portfolio compositions. Additionally, the cryptographic verification environment 1000 can support cross-organizational collaboration scenarios where competing entities can jointly validate shared objectives while maintaining strategic confidentiality over their individual operational approaches and competitive advantages.

In some implementations, the cryptographic verification module 1002 can orchestrate privacy-preserving verification processes through specialized computational components that implement cryptographic protocols and secure computation techniques. The cryptographic verification module 1002 can be constructed as a modular software architecture that includes distinct functional components for agent interaction management, cryptographic proof processing, and secure data structure operations (e.g., zero-knowledge proof validation, homomorphic computation coordination, multi-party protocol execution, and/or the like). The cryptographic verification module 1002 can implement standardized interfaces that enable integration with existing agent management platforms while providing extensible frameworks for incorporating emerging cryptographic techniques and verification protocols. The cryptographic verification module 1002 can maintain persistent state information across verification sessions, enabling complex multi-phase verification workflows that span extended time periods and involve multiple rounds of evidence submission and validation. The cryptographic verification module 1002 can include automated workflow orchestration capabilities that coordinate the sequence of cryptographic operations, ensuring proper execution order and maintaining consistency across distributed verification processes. For example, the cryptographic verification module 1002 can manage pharmaceutical supply chain verification workflows where drug manufacturers, distributors, and retailers must collectively demonstrate compliance with safety regulations while protecting proprietary formulations, pricing agreements, and distribution strategies. In another example, the cryptographic verification module 1002 can coordinate intellectual property licensing verification processes where technology companies can validate patent compliance and royalty calculations without exposing underlying technical implementations, market strategies, or financial terms. Additionally, the cryptographic verification module 1002 can facilitate environmental compliance verification scenarios where industrial operators can demonstrate adherence to emission standards and sustainability targets while maintaining confidentiality over production processes, efficiency metrics, and competitive operational data.

In some implementations, an AI agent component 1010 can provide autonomous computational capabilities for generating cryptographic proofs and managing evidence submission processes within the cryptographic verification environment 1000. The AI agent component 1010 can be implemented as an intelligent software module that combines machine learning algorithms with cryptographic protocol execution to enable autonomous agents to participate in verification workflows without manual intervention or external oversight (e.g., automated proof generation, evidence packaging, reasoning validation, and/or the like). The AI agent component 1010 can include adaptive learning mechanisms that enable continuous improvement of proof generation efficiency and accuracy based on historical verification outcomes and system feedback. The AI agent component 1010 can implement secure execution environments that isolate sensitive computational processes from external access while maintaining the ability to generate verifiable outputs and cryptographic attestations. The AI agent component 1010 can include distributed processing capabilities that enable parallel execution of computationally intensive cryptographic operations across multiple processing units, ensuring scalability for complex verification scenarios involving large datasets and proof requirements. The AI agent component 1010 can maintain encrypted communication channels with other environment components, ensuring that sensitive data and intermediate computational results remain protected throughout the verification process. For example, the AI agent component 1010 can enable autonomous trading agents in financial markets to generate zero-knowledge proofs demonstrating compliance with regulatory capital requirements while protecting proprietary trading processes, position data, and risk management strategies. In another example, the AI agent component 1010 can facilitate healthcare data sharing scenarios where medical research agents can prove statistical significance of clinical findings while maintaining patient privacy and protecting proprietary research methodologies. Additionally, the AI agent component 1010 can support autonomous vehicle coordination systems where individual vehicles can demonstrate safety compliance and traffic rule adherence while protecting proprietary navigation processes, sensor data, and operational patterns.

In some implementations, an agent reasoning module 1012 can execute private process operations that enable autonomous agents to perform internal decision-making processes while generating verifiable outputs for external validation. The agent reasoning module 1012 can be constructed as a secure computational environment that isolates proprietary processes and sensitive data processing operations from external observation while maintaining the ability to produce cryptographic proofs of correct execution (e.g., algorithm integrity verification, decision process validation, compliance demonstration, and/or the like). The agent reasoning module 1012 can implement trusted execution environments that provide hardware-level security guarantees for sensitive computational operations, ensuring that proprietary processes and confidential data remain protected even in distributed computing scenarios. The agent reasoning module 1012 can include formal verification capabilities that mathematically prove the correctness of reasoning processes and decision-making processes, enabling agents to generate cryptographic attestations of algorithmic integrity without revealing implementation details. The agent reasoning module 1012 can maintain audit trails of reasoning processes through cryptographically secured logs that capture decision inputs, intermediate computational steps, and final outputs while preserving confidentiality through selective disclosure mechanisms. The agent reasoning module 1012 can implement adaptive reasoning capabilities that enable dynamic adjustment of decision-making parameters based on changing environmental conditions while maintaining consistency with predefined operative boundaries and compliance requirements. For example, the agent reasoning module 1012 can enable credit scoring agents in financial institutions to demonstrate fair lending practices and regulatory compliance while protecting proprietary scoring protocols, customer data analysis methods, and risk assessment models. In another example, the agent reasoning module 1012 can facilitate autonomous procurement agents in supply chain management to prove optimal vendor selection and cost optimization while maintaining confidentiality over supplier negotiations, pricing strategies, and competitive intelligence. Additionally, the agent reasoning module 1012 can support medical diagnosis agents in healthcare systems to validate diagnostic accuracy and treatment recommendations while protecting patient privacy, proprietary diagnostic processes, and clinical decision-making processes.

In some implementations, a proof generation module 1014 can create zero-knowledge proofs that enable agents to demonstrate compliance with operative boundaries and verification requirements without revealing underlying sensitive data or algorithmic implementations. The proof generation module 1014 can be implemented as a specialized cryptographic engine that transforms internal operational datasets and decision-making processes into mathematically verifiable proof artifacts using zero-knowledge protocols (e.g., zk-SNARKs, zk-STARKs, bulletproofs, and/or the like). The proof generation module 1014 can include automated proof construction processes that analyze agent operational data and generate appropriate proof structures based on verification requirements, compliance criteria, and privacy constraints specified by requesting parties. The proof generation module 1014 can implement optimized, or biased, proof generation techniques that minimize computational overhead and proof size while maintaining cryptographic security guarantees and verification efficiency for large-scale distributed systems. The proof generation module 1014 can include batch processing capabilities that enable efficient generation of multiple proofs simultaneously, supporting high-throughput verification scenarios where numerous agents must demonstrate compliance within constrained time windows. The proof generation module 1014 can maintain cryptographic key management systems that ensure proper generation, storage, and utilization of cryptographic materials required for proof construction while preventing unauthorized access to sensitive keying information. For example, the proof generation module 1014 can enable pharmaceutical manufacturing agents to generate proofs demonstrating adherence to Good Manufacturing Practice standards while protecting proprietary production processes, quality control methodologies, and batch-specific operational parameters. In another example, the proof generation module 1014 can facilitate tax compliance agents in corporate accounting systems to prove accurate tax calculations and regulatory adherence while maintaining confidentiality over financial data, accounting methods, and strategic business information. Additionally, the proof generation module 1014 can support environmental monitoring agents in industrial facilities to demonstrate emission compliance and environmental impact assessments while protecting proprietary operational data, efficiency metrics, and competitive environmental strategies.

In some implementations, an evidence packaging module 1016 can organize and structure verification artifacts for secure transmission and storage within the cryptographic verification environment 1000. The evidence packaging module 1016 can be constructed as a data management component that transforms raw verification data, cryptographic proofs, and supporting documentation into standardized evidence packages that maintain integrity, authenticity, and confidentiality throughout the verification workflow (e.g., data serialization, cryptographic sealing, metadata attachment, and/or the like). The evidence packaging module 1016 can implement secure packaging protocols that combine multiple evidence artifacts into cohesive verification packages while applying appropriate encryption, digital signatures, and tamper-detection mechanisms to ensure evidence integrity during transmission and storage. The evidence packaging module 1016 can include compression and optimization procceses that reduce evidence package sizes while preserving all necessary verification information, enabling efficient transmission across network infrastructure and storage within distributed ledger systems. The evidence packaging module 1016 can maintain version control and provenance tracking for evidence packages, ensuring that all modifications, updates, and access events are cryptographically logged and auditable by authorized parties. The evidence packaging module 1016 can implement selective disclosure mechanisms that enable evidence packages to reveal different levels of detail to different verification parties based on their authorization levels and verification requirements. For example, the evidence packaging module 1016 can create evidence packages for clinical trial data where pharmaceutical companies can demonstrate drug efficacy and safety while protecting patient identities, proprietary research methodologies, and competitive clinical strategies. In another example, the evidence packaging module 1016 can facilitate cybersecurity compliance verification where technology companies can package evidence of security control implementation while protecting system architectures, vulnerability assessments, and incident response procedures. Additionally, the evidence packaging module 1016 can support intellectual property verification scenarios where research institutions can package evidence of innovation and patent compliance while maintaining confidentiality over research processes, technical implementations, and competitive research directions.

In some implementations, a data structure component 1020 can manage secure storage and retrieval of verification artifacts, cryptographic proofs, and decision records within the cryptographic verification environment 1000. The data structure component 1020 can be implemented as a distributed data management infrastructure that provides persistent storage, efficient indexing, and secure access control for verification-related data structures while maintaining consistency and availability across multiple system nodes (e.g., blockchain integration, distributed databases, encrypted storage systems, and/or the like). The data structure component 1020 can include automated data lifecycle management capabilities that handle evidence retention, archival, and secure deletion according to regulatory requirements and organizational policies while maintaining audit trails and compliance documentation. The data structure component 1020 can implement indexing and search capabilities that enable efficient retrieval of verification records based on various criteria including agent identifiers, verification types, time ranges, and compliance categories without compromising data confidentiality. The data structure component 1020 can maintain data integrity through cryptographic checksums, merkle tree structures, and distributed consensus mechanisms that detect and prevent unauthorized modifications to stored verification artifacts. The data structure component 1020 can include backup and disaster recovery mechanisms that ensure verification data remains available and recoverable even in the event of system failures, network disruptions, or security incidents. For example, the data structure component 1020 can manage verification records for financial services compliance where banks must maintain long-term records of regulatory compliance demonstrations while ensuring data availability for audits and regulatory examinations. In another example, the data structure component 1020 can facilitate healthcare compliance data management where medical institutions must store patient privacy compliance records and treatment verification data while maintaining HIPAA compliance and enabling authorized access for quality assurance purposes. Additionally, the data structure component 1020 can support supply chain traceability systems where manufacturers must maintain comprehensive records of component sourcing, quality verification, and compliance demonstrations while enabling selective disclosure to customers and regulatory authorities.

In some implementations, a proof verification module 1022 can validate zero-knowledge proofs and cryptographic attestations submitted by autonomous agents to determine compliance with operative boundaries and verification requirements. The proof verification module 1022 can be constructed as a specialized cryptographic validation engine that implements mathematical verification processes for various zero-knowledge proof systems while maintaining high performance and security standards (e.g., pairing-based cryptography, elliptic curve operations, polynomial commitment schemes, and/or the like). The proof verification module 1022 can include automated proof validation workflows that examine submitted proof artifacts for mathematical correctness, cryptographic integrity, and compliance with predefined verification criteria without requiring manual intervention or expert cryptographic knowledge. The proof verification module 1022 can implement batch verification capabilities that enable simultaneous validation of multiple proofs, improving system throughput and reducing computational overhead for large-scale verification scenarios involving numerous participating agents. The proof verification module 1022 can maintain verification result caching mechanisms that store validation outcomes for previously verified proofs, enabling efficient re-verification and reducing redundant computational operations while ensuring cache integrity through cryptographic protection. The proof verification module 1022 can include comprehensive logging and audit trail generation that records all verification activities, outcomes, and associated metadata for compliance monitoring and dispute resolution purposes. For example, the proof verification module 1022 can validate proofs from autonomous trading systems demonstrating compliance with market regulations and risk management requirements while enabling real-time verification of trading activities without exposing proprietary trading strategies. In another example, the proof verification module 1022 can verify proofs from medical device agents demonstrating safety compliance and performance standards while maintaining patient privacy and protecting proprietary device processes and operational parameters. Additionally, the proof verification module 1022 can validate proofs from environmental monitoring systems demonstrating emission compliance and sustainability metrics while enabling regulatory verification without revealing proprietary operational data and competitive environmental strategies.

In some implementations, a decision registry module 1024 can provide secure evidence storage and maintain comprehensive records of verification processes, decision outcomes, and compliance demonstrations within the cryptographic verification environment 1000. The decision registry module 1024 can be implemented as a distributed ledger-based storage system that creates immutable records of all verification activities while providing efficient access mechanisms for authorized parties and audit processes (e.g., blockchain storage, distributed hash tables, cryptographic timestamping, and/or the like). The decision registry module 1024 can include automated record generation capabilities that capture complete verification workflows including initial requests, evidence submissions, proof validations, and final outcomes while maintaining cryptographic integrity and non-repudiation properties. The decision registry module 1024 can implement indexing and categorization systems that enable efficient retrieval of verification records based on multiple criteria including agent identities, verification types, compliance categories, and temporal ranges while preserving privacy through selective disclosure mechanisms. The decision registry module 1024 can maintain cross-reference capabilities that link related verification records and enable comprehensive audit trails spanning multiple verification sessions and involving multiple participating agents. The decision registry module 1024 can include automated compliance reporting features that generate standardized reports for regulatory authorities and audit processes while ensuring that sensitive operational data remains protected through privacy-preserving aggregation techniques. For example, the decision registry module 1024 can maintain comprehensive records of pharmaceutical supply chain verification activities where drug manufacturers, distributors, and pharmacies can demonstrate compliance with safety regulations while enabling regulatory oversight without exposing proprietary business relationships and competitive strategies. In another example, the decision registry module 1024 can store verification records for financial services compliance where banks can maintain comprehensive audit trails of risk management compliance and regulatory adherence while protecting customer data and proprietary risk assessment methodologies. Additionally, the decision registry module 1024 can manage verification records for cybersecurity compliance where technology companies can demonstrate security control implementation and incident response capabilities while maintaining confidentiality over system architectures and security vulnerabilities.

In some implementations, an access control module 1026 can manage permissions and visibility controls for verification data and cryptographic artifacts within the cryptographic verification environment 1000. The access control module 1026 can be constructed as a comprehensive authorization framework that implements role-based access controls, attribute-based permissions, and dynamic authorization policies to ensure that verification data is accessible only to authorized parties based on their roles, responsibilities, and verification requirements (e.g., multi-factor authentication, digital certificates, time-based access tokens, and/or the like). The access control module 1026 can include fine-grained permission management capabilities that enable selective disclosure of verification information based on specific data elements, verification contexts, and requesting party authorizations while maintaining comprehensive audit trails of all access activities. The access control module 1026 can implement dynamic access policy evaluation that considers multiple factors including user credentials, data sensitivity levels, regulatory requirements, and organizational policies to make real-time authorization decisions for verification data access requests. The access control module 1026 can maintain secure credential management systems that handle authentication tokens, digital certificates, and cryptographic keys while providing secure credential distribution, rotation, and revocation capabilities for participating agents and verification parties. The access control module 1026 can include privacy-preserving access logging that records all access attempts and authorization decisions while protecting sensitive information about data access patterns and user behaviors through cryptographic protection mechanisms. For example, the access control module 1026 can manage access permissions for clinical trial verification data where pharmaceutical companies, regulatory authorities, and research institutions require different levels of access to verification records while maintaining patient privacy and protecting proprietary research information. In another example, the access control module 1026 can control access to financial compliance verification data where banks, auditors, and regulatory agencies need varying levels of verification information access while protecting customer data and proprietary risk management processes. Additionally, the access control module 1026 can manage permissions for supply chain verification data where manufacturers, suppliers, customers, and regulatory authorities require different access levels to compliance demonstrations while maintaining competitive confidentiality and trade secret protection.

In some implementations, a cryptographic features module 1030 can provide cryptographic capabilities that enable privacy-preserving computations and secure multi-party protocols within the cryptographic verification environment 1000. The cryptographic features module 1030 can be implemented as a cryptographic library that includes implementations of cryptographic protocols and techniques for secure computation, privacy preservation, and distributed verification (e.g., homomorphic encryption schemes, secure multi-party computation protocols, threshold cryptography, and/or the like). The cryptographic features module 1030 can include protocol abstraction layers that enable integration of different cryptographic techniques while providing standardized interfaces for application developers and system integrators to utilize cryptographic capabilities without requiring deep cryptographic expertise. The cryptographic features module 1030 can implement performance optimization techniques that enhance the efficiency of cryptographic operations through hardware acceleration, algorithmic improvements, and parallel processing capabilities while maintaining security guarantees and cryptographic correctness. The cryptographic features module 1030 can maintain cryptographic parameter management systems that handle the generation, distribution, and lifecycle management of cryptographic parameters, keys, and system configurations required for secure protocol execution. The cryptographic features module 1030 can include interoperability frameworks that enable integration with external cryptographic systems and standards while maintaining security properties and enabling cross-platform verification capabilities. For example, the cryptographic features module 1030 can enable secure auction systems where multiple bidders can participate in procurement processes while maintaining bid confidentiality and enabling verifiable auction outcomes without revealing individual bid amounts or bidder strategies. In another example, the cryptographic features module 1030 can facilitate secure benchmarking scenarios where competing organizations can jointly compute industry performance metrics and comparative analyses while protecting individual performance data and competitive information. Additionally, the cryptographic features module 1030 can support secure voting systems where multiple stakeholders can participate in governance decisions while maintaining vote privacy and enabling verifiable election outcomes without compromising voter confidentiality.

In some implementations, the cryptographic parameter management systems within the cryptographic features module 1030 can implement automated key generation protocols that utilize cryptographically secure random number generators and entropy sources to create cryptographic keys, initialization vectors, and system parameters while ensuring sufficient randomness and unpredictability for security guarantees. The parameter management systems can include hierarchical key derivation mechanisms that generate master keys and derive child keys for specific cryptographic operations while maintaining key isolation and enabling efficient key rotation without compromising previously encrypted data. The cryptographic features module 1030 can implement distributed key generation protocols that enable multiple parties to collaboratively generate cryptographic parameters without any single party having complete knowledge of the generated keys while ensuring that the resulting parameters maintain cryptographic strength and security properties. The parameter management systems can include automated parameter validation mechanisms that verify the mathematical properties and security characteristics of generated cryptographic parameters while implementing rejection sampling and parameter regeneration when security requirements are not met. The cryptographic features module 1030 can maintain secure parameter distribution channels that utilize authenticated encryption and secure communication protocols to distribute cryptographic parameters to participating agents while preventing interception, modification, or unauthorized access during transmission. The parameter lifecycle management capabilities can implement automated key rotation schedules that periodically generate new cryptographic parameters and securely transition system operations to utilize updated parameters while maintaining backward compatibility for ongoing cryptographic operations and ensuring seamless parameter updates without service disruption.

In some implementations, the interoperability frameworks within the cryptographic features module 1030 can implement standardized cryptographic protocol interfaces that enable seamless integration with external cryptographic libraries, hardware security modules, and blockchain networks while maintaining consistent security properties and enabling cross-platform verification capabilities. The interoperability frameworks can include protocol adaptation layers that translate between different cryptographic standards and implementations while preserving security guarantees and enabling communication between systems utilizing different cryptographic approaches such as RSA, elliptic curve cryptography, and post-quantum cryptographic algorithms. The cryptographic features module 1030 can implement cross-chain cryptographic verification protocols that enable validation of cryptographic proofs and attestations across different blockchain networks while maintaining proof integrity and enabling interoperability between heterogeneous distributed ledger systems. The interoperability frameworks can include cryptographic format conversion mechanisms that transform cryptographic artifacts between different encoding standards and representation formats while preserving mathematical properties and enabling compatibility with diverse cryptographic systems and verification platforms. The cryptographic features module 1030 can maintain compatibility matrices and version management systems that track supported cryptographic algorithms, protocol versions, and implementation standards while enabling automatic selection of compatible cryptographic techniques for cross-system interactions and ensuring optimal interoperability without compromising security requirements. The interoperability frameworks can implement cryptographic bridging protocols that enable secure communication and verification between systems utilizing different cryptographic paradigms while maintaining end-to-end security properties and enabling seamless integration of legacy cryptographic systems with modern privacy-preserving verification infrastructure.

In some implementations, a homomorphic encryption module 1032 can enable computations directly on encrypted data without decryption, allowing collaborative analysis while preserving privacy of underlying datasets and computational inputs. The homomorphic encryption module 1032 can be constructed as a specialized cryptographic engine that implements various homomorphic encryption schemes including partially homomorphic, somewhat homomorphic, and fully homomorphic encryption systems to support different computational requirements and performance constraints (e.g., additive homomorphic schemes for financial calculations, multiplicative homomorphic schemes for statistical analysis, fully homomorphic schemes for complex algorithmic operations, and/or the like). The homomorphic encryption module 1032 can include automated encryption parameter selection algorithms that bias cryptographic parameters based on computational requirements, security levels, and performance constraints while ensuring that encrypted computations produce mathematically correct results. The homomorphic encryption module 1032 can implement noise management techniques that control cryptographic noise accumulation during homomorphic operations, enabling complex multi-step computations while maintaining decryption accuracy and computational correctness. The homomorphic encryption module 1032 can include distributed computation coordination capabilities that enable multiple parties to jointly perform homomorphic computations across encrypted datasets while maintaining data confidentiality and ensuring computational integrity. The homomorphic encryption module 1032 can maintain performance optimization features that utilize hardware acceleration, algorithmic improvements, and caching mechanisms to enhance the efficiency of homomorphic operations while preserving security guarantees and cryptographic properties. For example, the homomorphic encryption module 1032 can enable collaborative financial risk assessment where multiple banks can jointly compute portfolio risk metrics and market exposure calculations while maintaining confidentiality over individual customer data, trading positions, and proprietary risk models. In another example, the homomorphic encryption module 1032 can facilitate secure healthcare analytics where multiple medical institutions can jointly analyze patient outcomes and treatment effectiveness while preserving patient privacy and protecting proprietary clinical protocols and research methodologies. Additionally, the homomorphic encryption module 1032 can support secure supply chain optimization where multiple suppliers and manufacturers can jointly bias logistics and inventory management while maintaining confidentiality over production capacities, cost structures, and competitive operational strategies.

In some implementations, a computation module 1034 can coordinate secure multi-party computation protocols that enable multiple agents to jointly compute functions over private inputs without revealing those inputs to each other or external parties. The computation module 1034 can be implemented as a distributed protocol orchestration system that manages complex multi-party computation workflows involving multiple participating agents while ensuring input privacy, computational correctness, and output integrity (e.g., secret sharing schemes, garbled circuits, oblivious transfer protocols, and/or the like). The computation module 1034 can include protocol selection algorithms that automatically choose appropriate secure multi-party computation techniques based on computational requirements, participant constraints, and security objectives while optimizing for performance and resource utilization. The computation module 1034 can implement fault tolerance mechanisms that enable secure computations to continue even when some participating agents become unavailable or experience technical difficulties while maintaining security properties and computational accuracy. The computation module 1034 can maintain communication coordination capabilities that manage secure message passing, synchronization, and result aggregation across multiple participating agents while protecting intermediate computational states and preventing information leakage. The computation module 1034 can include result verification mechanisms that enable participating agents to independently verify the correctness of computed results without revealing their individual inputs or compromising the privacy properties of the secure computation protocol. For example, the computation module 1034 can enable secure benchmarking scenarios where competing technology companies can jointly compute industry performance metrics and market analysis while maintaining confidentiality over individual performance data, customer bases, and competitive strategies. In another example, the computation module 1034 can facilitate secure auction mechanisms where multiple bidders can participate in complex procurement processes involving multi-attribute bidding while maintaining bid confidentiality and enabling optimal winner selection without revealing losing bids or bidding strategies. Additionally, the computation module 1034 can support secure machine learning scenarios where multiple organizations can jointly train predictive models using their combined datasets while maintaining data privacy and protecting proprietary training data and algorithmic approaches.

In some implementations, a key components module 1040 can provide essential cryptographic primitives and proof systems that support the cryptographic verification capabilities of the cryptographic verification environment 1000. The key components module 1040 can be constructed as a comprehensive cryptographic toolkit that includes implementations of state-of-the-art cryptographic protocols and proof systems including zk-SNARKs, zk-STARKs, bulletproofs, verifiable credentials, and threshold signatures to enable verification scenarios and privacy-preserving protocols (e.g., pairing-based cryptography, polynomial commitment schemes, merkle tree constructions, and/or the like). The key components module 1040 can include automated proof system selection algorithms that choose appropriate cryptographic techniques based on verification requirements, performance constraints, and security objectives while ensuring optimal resource utilization and verification efficiency. The key components module 1040 can implement cryptographic parameter generation and management systems that handle the creation, distribution, and lifecycle management of cryptographic materials required for proof systems while ensuring security properties and preventing cryptographic vulnerabilities. The key components module 1040 can maintain interoperability frameworks that enable integration with external cryptographic libraries and standards while preserving security guarantees and enabling cross-platform verification capabilities. The key components module 1040 can include performance monitoring and optimization capabilities that continuously assess cryptographic operation efficiency and automatically adjust system parameters to maintain optimal performance while preserving security properties and verification accuracy. For example, the key components module 1040 can enable verifiable credential systems for professional licensing where individuals can demonstrate qualifications and certifications while maintaining privacy over personal information and enabling selective disclosure of relevant credentials to different verification parties. In another example, the key components module 1040 can facilitate threshold signature schemes for corporate governance where multiple executives can jointly authorize critical business decisions while maintaining individual privacy and enabling verifiable authorization without revealing individual voting patterns or decision-making processes. Additionally, the key components module 1040 can support range proof systems for financial compliance where organizations can demonstrate adherence to regulatory capital requirements and risk limits while maintaining confidentiality over specific financial positions, trading strategies, and competitive financial information.

Figure 11:
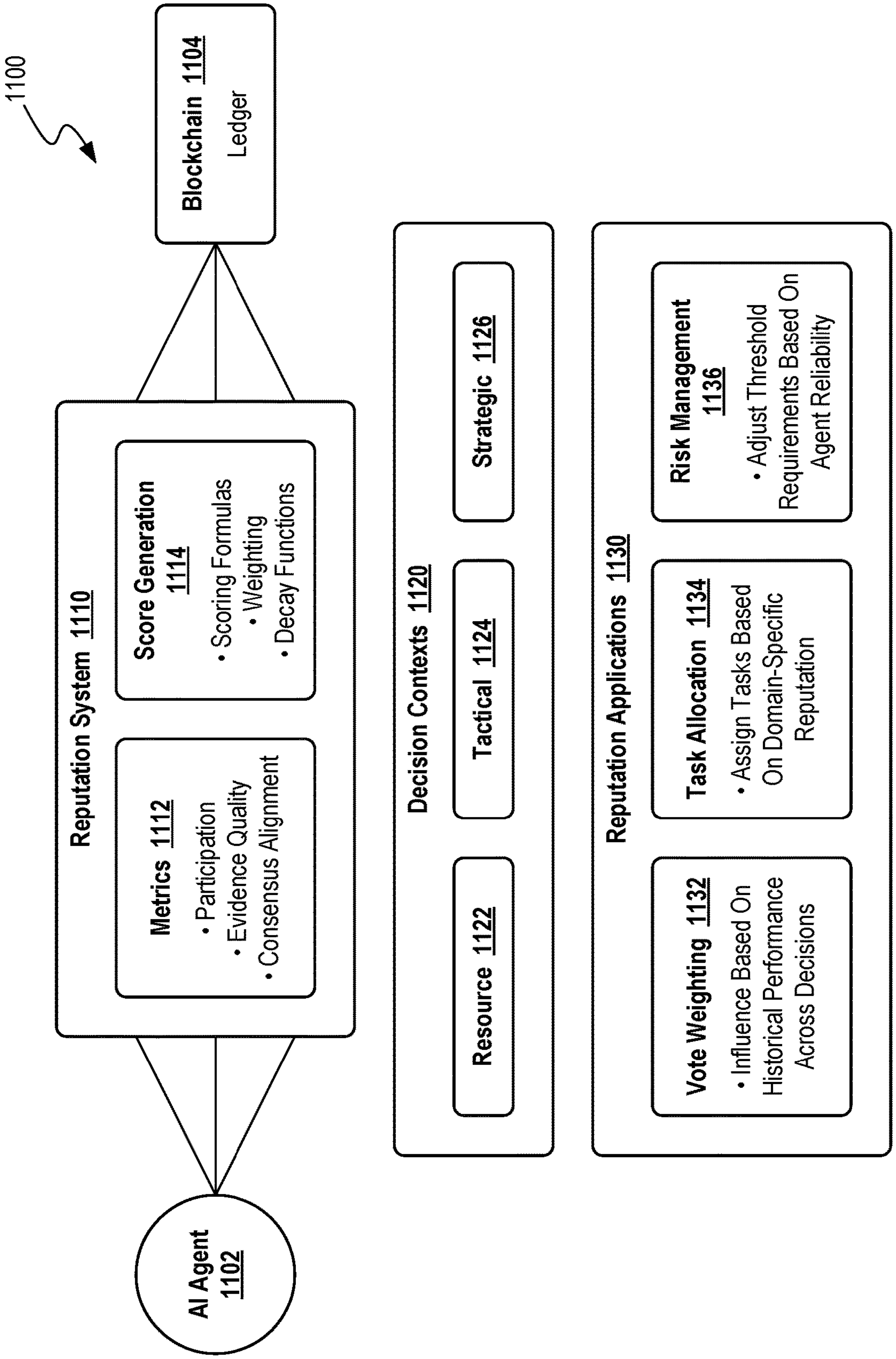
FIG. 11 is a block diagram that illustrates a reputation environment for managing AI agent performance and decision-making within blockchain-based environments, in accordance with some implementations of the present technology.

FIG. 11 is a block diagram that illustrates a reputation environment 1100 for managing AI agent performance and decision-making within blockchain-based environments in accordance with some implementations of the present technology. In some implementations, the reputation environment 1100 can operate as a comprehensive trust evaluation infrastructure that manages AI agent performance assessment and decision-making coordination within blockchain-based distributed environments while maintaining dynamic scoring mechanisms across multiple operational contexts. The reputation environment 1100 can be constructed as a multi-layered computational framework that integrates performance monitoring capabilities, trust calculation algorithms, and context-aware evaluation mechanisms to provide real-time reputation scoring for autonomous agents participating in distributed decision-making processes (e.g., blockchain-based consensus protocols, multi-agent coordination systems, distributed ledger validation networks, and/or the like). The reputation environment 1100 can include persistent data storage systems that maintain historical performance records, transaction logs, and behavioral patterns for individual agents while implementing cryptographic protection mechanisms to ensure data integrity and prevent unauthorized manipulation of reputation scores. The reputation environment 1100 can implement automated reputation calculation workflows that continuously process incoming performance data, behavioral observations, and decision outcomes to generate updated trust scores that reflect current agent reliability and competence levels. The reputation environment 1100 can maintain integration interfaces with blockchain networks, smart contract systems, and distributed ledger infrastructures to enable incorporation of reputation-based decision-making logic into automated governance processes and consensus mechanisms. For example, the reputation environment 1100 can manage trust evaluation processes for supply chain management scenarios where multiple vendor agents must demonstrate consistent performance in delivery reliability, quality compliance, and contractual adherence while maintaining reputation scores that influence future procurement decisions and partnership opportunities. In another example, the reputation environment 1100 can facilitate financial services compliance monitoring where banking agents must maintain reputation scores based on regulatory adherence, risk management effectiveness, and customer service quality while enabling automated trust-based authorization for high-value transactions and regulatory reporting processes. Additionally, the reputation environment 1100 can support healthcare data sharing networks where medical research agents must maintain reputation scores based on data quality, privacy compliance, and research methodology standards while enabling trust-based access control for sensitive patient information and collaborative research initiatives.

In some implementations, an AI agent 1102 can function as an autonomous computational entity that participates in reputation-based decision-making processes while maintaining individual performance records and contributing to collective intelligence systems within distributed blockchain environments. The AI agent 1102 can be implemented as a software module that combines machine learning algorithms, decision-making logic, and blockchain interaction capabilities to enable autonomous participation in complex multi-agent coordination scenarios (e.g., consensus voting protocols, resource allocation decisions, collaborative problem-solving tasks, and/or the like). The AI agent 1102 can include internal performance monitoring systems that continuously track decision accuracy, response times, resource utilization efficiency, and compliance adherence to generate self-assessment data that contributes to overall reputation calculations. The AI agent 1102 can implement secure communication protocols that enable encrypted data exchange with other agents and system components while maintaining privacy protection for sensitive operational data and proprietary decision-making algorithms. The AI agent 1102 can maintain persistent memory systems that store historical interaction records, learning experiences, and performance feedback to enable continuous improvement of decision-making capabilities and adaptation to changing operational environments. The AI agent 1102 can include cryptographic credential management systems that handle digital signatures, authentication tokens, and verification certificates required for secure participation in blockchain-based reputation systems and distributed consensus processes. For example, the AI agent 1102 can operate as an autonomous trading agent in financial markets that maintains reputation scores based on trading performance, risk management effectiveness, and regulatory compliance while participating in collaborative market analysis and investment decision-making processes with other agents. In another example, the AI agent 1102 can function as a medical diagnosis agent in healthcare networks that builds reputation through diagnostic accuracy, treatment recommendation quality, and patient outcome improvements while collaborating with other medical agents to provide comprehensive patient care and clinical decision support. Additionally, the AI agent 1102 can serve as an autonomous procurement agent in supply chain management systems that develops reputation through vendor selection accuracy, cost optimization achievements, and delivery performance while coordinating with logistics agents and quality control systems to ensure optimal procurement outcomes.

In some implementations, a blockchain 1104 can serve as the underlying distributed ledger infrastructure that provides immutable storage, cryptographic security, and decentralized validation for reputation-related transactions and trust score management within the reputation environment 1100. The blockchain 1104 can be constructed as a distributed network of interconnected nodes that collectively maintain a synchronized ledger of reputation transactions, performance records, and trust score updates while implementing consensus mechanisms to ensure data integrity and prevent unauthorized modifications (e.g., proof-of-work validation, proof-of-stake consensus, Byzantine fault tolerance protocols, and/or the like). The blockchain 1104 can include smart contract execution environments that enable automated reputation calculation logic, trust-based decision-making protocols, and performance-based reward distribution mechanisms to operate autonomously without requiring manual intervention or centralized oversight. The blockchain 1104 can implement cryptographic hashing algorithms, digital signature verification systems, and merkle tree structures to ensure that all reputation-related data remains tamper-evident and cryptographically verifiable by participating agents and external auditors. The blockchain 1104 can maintain distributed storage mechanisms that replicate reputation data across multiple network nodes to ensure high availability, fault tolerance, and resistance to single points of failure while enabling efficient data retrieval and query processing for reputation-based applications. The blockchain 1104 can include transaction processing capabilities that handle high-throughput reputation updates, performance record submissions, and trust score queries while maintaining low latency and scalable performance for large-scale multi-agent systems. For example, the blockchain 1104 can support pharmaceutical supply chain reputation management where drug manufacturers, distributors, and pharmacies maintain reputation scores based on safety compliance, delivery reliability, and quality assurance while enabling transparent tracking of reputation changes and performance improvements across the entire supply network. In another example, the blockchain 1104 can facilitate academic research collaboration networks where research institutions and individual researchers build reputation through publication quality, peer review contributions, and collaborative project success while maintaining immutable records of research contributions and academic achievements. Additionally, the blockchain 1104 can enable renewable energy trading platforms where energy producers, distributors, and consumers maintain reputation scores based on energy delivery reliability, pricing fairness, and environmental compliance while supporting automated energy trading decisions based on trust relationships and historical performance data.

In some implementations, a reputation system 1110 can operate as a specialized computational module within the broader reputation environment 1100 that implements core trust calculation algorithms, performance evaluation logic, and reputation score management functions for autonomous agents participating in distributed decision-making processes. The reputation system 1110 can be constructed as a modular software architecture that includes distinct functional components for data collection, metric calculation, score aggregation, and reputation distribution while maintaining standardized interfaces for integration with blockchain networks and multi-agent coordination systems (e.g., performance data ingestion APIs, reputation query endpoints, trust score update mechanisms, and/or the like). The reputation system 1110 can implement real-time reputation calculation engines that process incoming performance data, behavioral observations, and decision outcomes to generate updated trust scores that reflect current agent reliability and competence levels across multiple evaluation dimensions. The reputation system 1110 can include historical data analysis capabilities that examine long-term performance trends, seasonal variations, and behavioral patterns to provide comprehensive reputation assessments that account for both recent performance and historical consistency. The reputation system 1110 can maintain reputation score normalization mechanisms that ensure fair comparison between agents operating in different contexts, time periods, and operational environments while preventing reputation inflation or deflation that could compromise system-wide trust calibration. The reputation system 1110 can include automated reputation decay functions that gradually reduce the influence of outdated performance data while ensuring that recent actions and decisions carry appropriate weight in current reputation calculations. For example, the reputation system 1110 can manage reputation scoring for autonomous vehicle coordination networks where individual vehicles build trust through safe driving behavior, traffic rule compliance, and cooperative coordination with other vehicles while enabling reputation-based priority assignment for traffic management and route optimization decisions. In another example, the reputation system 1110 can facilitate reputation management for distributed computing networks where computational nodes earn reputation through task completion accuracy, resource availability, and network contribution reliability while supporting reputation-based task allocation and resource pricing mechanisms. Additionally, the reputation system 1110 can support reputation scoring for online marketplace platforms where buyers and sellers develop trust through transaction completion rates, product quality ratings, and dispute resolution cooperation while enabling reputation-based matching and recommendation systems.

In some implementations, a metrics module 1112 can function as a comprehensive data collection and performance measurement system that tracks participation levels, evidence quality assessments, and consensus alignment indicators for AI agents operating within reputation-based decision-making environments. The metrics module 1112 can be implemented as a multi-dimensional data acquisition framework that continuously monitors agent behaviors, decision outcomes, and collaborative interactions to generate quantitative performance indicators that serve as foundational inputs for reputation calculation algorithms (e.g., participation frequency measurements, decision accuracy tracking, response time monitoring, and/or the like). The metrics module 1112 can include automated data validation mechanisms that verify the authenticity, completeness, and accuracy of collected performance data while implementing cryptographic protection to prevent data tampering and ensure measurement integrity throughout the reputation evaluation process. The metrics module 1112 can implement context-aware measurement protocols that adjust performance evaluation criteria based on operational environments, decision complexity levels, and collaborative requirements to ensure fair and accurate assessment of agent capabilities across diverse operational scenarios. The metrics module 1112 can maintain standardized measurement frameworks that enable consistent performance comparison between different agents while accounting for variations in operational contexts, resource constraints, and collaborative requirements that may influence individual agent performance. The metrics module 1112 can include real-time data streaming capabilities that provide continuous performance monitoring and immediate feedback to reputation calculation systems while maintaining low-latency data processing to support dynamic reputation updates and responsive trust score adjustments. For example, the metrics module 1112 can track performance metrics for autonomous logistics agents in supply chain management systems by measuring delivery accuracy rates, route optimization effectiveness, and collaborative coordination success while providing detailed performance data that influences reputation scores and future task allocation decisions. In another example, the metrics module 1112 can monitor performance indicators for medical diagnosis agents in healthcare networks by evaluating diagnostic accuracy percentages, treatment recommendation quality scores, and patient outcome improvement rates while generating comprehensive performance profiles that support reputation-based medical decision-making and specialist referral systems. Additionally, the metrics module 1112 can assess performance metrics for financial trading agents in investment management platforms by tracking portfolio performance indicators, risk management effectiveness measures, and regulatory compliance scores while providing detailed performance analytics that inform reputation-based trading authorization and investment strategy selection processes.

In some implementations, a score generation module 1114 can implement mathematical algorithms and computational frameworks that process collected performance metrics to generate comprehensive reputation scores through scoring formulas, weighting mechanisms, and decay functions that account for temporal variations and performance consistency patterns. The score generation module 1114 can be constructed as a computational engine that combines statistical analysis techniques, machine learning algorithms, and mathematical modeling approaches to transform raw performance data into objective reputation scores that reflect a degree of agent trustworthiness and competence levels (e.g., weighted average calculations, exponential decay functions, Bayesian inference models, and/or the like). The score generation module 1114 can include adaptive weighting algorithms that dynamically adjust the relative importance of different performance metrics based on operational contexts, decision criticality levels, and collaborative requirements to ensure that reputation scores accurately reflect agent suitability for specific types of tasks and decision-making scenarios. The score generation module 1114 can implement temporal decay mechanisms that gradually reduce the influence of historical performance data while ensuring that recent actions and decisions receive appropriate emphasis in current reputation calculations, thereby maintaining relevance and responsiveness to changing agent capabilities and behavioral patterns. The score generation module 1114 can include statistical normalization processes that ensure fair comparison between agents operating under different conditions, time periods, and operational constraints while preventing reputation score inflation or deflation that could compromise the accuracy and reliability of trust-based decision-making systems. The score generation module 1114 can maintain mathematical validation frameworks that verify the correctness, consistency, and stability of reputation calculation algorithms while implementing error detection and correction mechanisms to ensure reliable and accurate reputation score generation. For example, the score generation module 1114 can process performance data for autonomous energy management agents in smart grid systems by applying weighted scoring algorithms that emphasize recent energy distribution efficiency, demand prediction accuracy, and grid stability contributions while implementing decay functions that gradually reduce the influence of outdated performance records to maintain current relevance of reputation scores. In another example, the score generation module 1114 can calculate reputation scores for collaborative research agents in scientific computing networks by combining publication quality metrics, peer review contribution scores, and collaborative project success rates through weighting mechanisms that account for research domain complexity and collaborative contribution levels while applying temporal decay to ensure current research capabilities are accurately reflected. Additionally, the score generation module 1114 can generate reputation scores for autonomous customer service agents in e-commerce platforms by processing customer satisfaction ratings, problem resolution success rates, and response time measurements through adaptive algorithms that weight recent performance more heavily while maintaining historical context to provide comprehensive trust assessments for customer interaction assignments.

In some implementations, decision contexts 1120 can provide specialized operational frameworks that categorize different types of decision-making environments and scenarios where AI agents operate, enabling context-specific reputation evaluation and trust-based coordination mechanisms tailored to particular operational requirements and performance criteria. The decision contexts 1120 can be implemented as a hierarchical classification system that organizes decision-making scenarios into distinct categories based on operational complexity, resource requirements, time constraints, and collaborative needs while providing specialized evaluation frameworks for each context type (e.g., resource allocation contexts, strategic planning contexts, tactical execution contexts, and/or the like). The decision contexts 1120 can include context-specific performance metrics that define relevant evaluation criteria for each operational environment while ensuring that reputation scores accurately reflect agent suitability and competence for particular types of decision-making tasks and collaborative scenarios. The decision contexts 1120 can implement dynamic context recognition algorithms that automatically identify the appropriate decision context for incoming tasks and requests while applying corresponding evaluation frameworks and reputation weighting mechanisms to ensure optimal agent selection and task allocation decisions. The decision contexts 1120 can maintain context transition mechanisms that enable smooth adaptation when decision-making scenarios evolve or change operational requirements while preserving reputation continuity and ensuring consistent trust evaluation across different operational phases. The decision contexts 1120 can include context-specific learning algorithms that enable continuous improvement of evaluation criteria and performance metrics based on observed outcomes and feedback from completed decision-making processes within each operational context. For example, the decision contexts 1120 can categorize emergency response scenarios where first responder agents must make rapid decisions under time pressure and resource constraints while applying specialized reputation evaluation criteria that emphasize response speed, decision accuracy under stress, and coordination effectiveness with other emergency response teams. In another example, the decision contexts 1120 can organize long-term strategic planning environments where business intelligence agents must analyze complex market data and competitive landscapes while implementing reputation evaluation frameworks that prioritize analytical depth, strategic insight quality, and long-term prediction accuracy over rapid response capabilities. Additionally, the decision contexts 1120 can structure collaborative research contexts where scientific agents must balance individual expertise with team coordination requirements while applying reputation metrics that evaluate both independent research capabilities and collaborative contribution effectiveness to ensure optimal team composition and project success rates.

In some implementations, a resource context 1122 can define operational environments where AI agents make decisions related to resource allocation, capacity management, and efficiency optimization while operating under constraints related to availability, cost, and utilization requirements that influence reputation evaluation criteria and trust-based coordination mechanisms. The resource context 1122 can be constructed as a specialized decision-making framework that focuses on agent capabilities related to resource identification, allocation optimization, utilization monitoring, and efficiency improvement while implementing reputation evaluation metrics that emphasize cost-effectiveness, resource conservation, and allocation accuracy (e.g., budget management effectiveness, resource utilization optimization, capacity planning accuracy, and/or the like). The resource context 1122 can include resource-specific performance tracking systems that monitor agent decisions related to inventory management, capacity allocation, budget distribution, and resource scheduling while generating detailed performance data that contributes to context-specific reputation scores and trust assessments. The resource context 1122 can implement constraint-aware evaluation mechanisms that account for resource limitations, budget restrictions, and availability constraints when assessing agent performance while ensuring that reputation scores accurately reflect agent capabilities within realistic operational boundaries and resource availability scenarios. The resource context 1122 can maintain resource optimization algorithms that enable agents to demonstrate efficiency improvements, cost reductions, and utilization enhancements while providing measurable performance indicators that contribute to reputation building and trust development within resource management scenarios. The resource context 1122 can include collaborative resource sharing protocols that enable multiple agents to coordinate resource allocation decisions while maintaining individual reputation tracking and collective performance assessment for complex resource management tasks that require multi-agent coordination. For example, the resource context 1122 can manage reputation evaluation for warehouse management agents in logistics systems that must bias inventory levels, storage space utilization, and order fulfillment efficiency while building reputation through cost reduction achievements, inventory accuracy improvements, and delivery time optimization that demonstrates effective resource management capabilities. In another example, the resource context 1122 can evaluate performance for cloud computing resource allocation agents that must balance computational capacity, storage requirements, and network bandwidth while developing reputation through efficient resource utilization, cost optimization, and service level maintenance that reflects effective resource management in distributed computing environments. Additionally, the resource context 1122 can assess reputation for energy management agents in smart building systems that must bias heating, cooling, and lighting resource consumption while building trust through energy efficiency improvements, cost reduction achievements, and comfort level maintenance that demonstrates effective resource optimization in building management scenarios.

In some implementations, a tactical context 1124 can establish operational frameworks for AI agents engaged in short-term decision-making scenarios that require rapid response capabilities, situational awareness, and adaptive execution strategies while maintaining reputation evaluation criteria focused on responsiveness, accuracy, and coordination effectiveness under time pressure. The tactical context 1124 can be implemented as a dynamic decision-making environment that emphasizes agent capabilities related to real-time analysis, quick decision execution, situational adaptation, and immediate response coordination while implementing reputation metrics that prioritize response speed, decision accuracy under pressure, and effective collaboration during time-critical operations (e.g., incident response effectiveness, real-time problem resolution, emergency coordination success, and/or the like). The tactical context 1124 can include rapid assessment mechanisms that evaluate agent performance during high-pressure situations, emergency responses, and time-sensitive decision-making scenarios while generating performance data that reflects agent capabilities under stress and operational urgency. The tactical context 1124 can implement situational awareness evaluation systems that assess agent abilities to quickly understand changing conditions, identify critical factors, and adapt decision-making strategies while maintaining effectiveness and coordination with other agents during dynamic operational scenarios. The tactical context 1124 can maintain real-time coordination protocols that enable multiple agents to collaborate effectively during tactical operations while tracking individual contributions, coordination effectiveness, and collective performance outcomes that contribute to reputation development in collaborative tactical scenarios. The tactical context 1124 can include adaptive learning mechanisms that enable agents to improve tactical decision-making capabilities based on experience from previous tactical operations while building reputation through demonstrated learning and performance improvement in similar operational contexts. For example, the tactical context 1124 can evaluate reputation for cybersecurity incident response agents that must quickly identify security threats, coordinate defensive measures, and implement containment strategies while building trust through rapid threat detection, effective incident containment, and successful coordination with security teams during cyber attack scenarios. In another example, the tactical context 1124 can assess performance for autonomous vehicle coordination agents that must make split-second navigation decisions, avoid obstacles, and coordinate with other vehicles while developing reputation through safe driving performance, traffic rule compliance, and effective coordination during complex traffic situations and emergency scenarios. Additionally, the tactical context 1124 can manage reputation evaluation for financial trading agents that must respond quickly to market changes, execute trades under time pressure, and coordinate with risk management systems while building trust through profitable trading decisions, risk mitigation effectiveness, and successful coordination during volatile market conditions.

In some implementations, a strategic context 1126 can provide comprehensive frameworks for AI agents involved in long-term planning, complex analysis, and strategic decision-making processes that require deep analytical capabilities, forward-thinking approaches, and comprehensive evaluation of multiple factors and potential outcomes over extended time horizons. The strategic context 1126 can be constructed as a decision-making environment that focuses on agent capabilities related to trend analysis, predictive modeling, strategic planning, and long-term optimization while implementing reputation evaluation criteria that emphasize analytical depth, prediction accuracy, strategic insight quality, and long-term value creation (e.g., strategic planning effectiveness, market analysis accuracy, long-term prediction success, and/or the like). The strategic context 1126 can include comprehensive analysis evaluation systems that assess agent abilities to process complex data sets, identify long-term trends, evaluate multiple scenarios, and develop strategic recommendations while generating performance metrics that reflect analytical sophistication and strategic thinking capabilities. The strategic context 1126 can implement long-term outcome tracking mechanisms that monitor the success of strategic decisions and recommendations over extended periods while building reputation based on actual results and long-term value creation rather than short-term performance indicators. The strategic context 1126 can maintain strategic collaboration protocols that enable multiple agents to contribute different analytical perspectives and expertise areas while coordinating comprehensive strategic analysis and planning processes that leverage collective intelligence and specialized knowledge. The strategic context 1126 can include strategic learning algorithms that enable agents to refine strategic analysis capabilities based on long-term outcome feedback and changing market conditions while continuously improving strategic decision-making effectiveness and reputation development in complex planning scenarios. For example, the strategic context 1126 can evaluate reputation for business intelligence agents in corporate planning systems that must analyze market trends, competitive landscapes, and growth opportunities while building trust through accurate market predictions, successful strategic recommendations, and long-term business value creation that demonstrates effective strategic analysis and planning capabilities. In another example, the strategic context 1126 can assess performance for investment portfolio management agents that must develop long-term investment strategies, analyze market conditions, and bias portfolio composition while developing reputation through consistent returns, risk management effectiveness, and successful long-term investment performance that reflects strategic investment planning expertise. Additionally, the strategic context 1126 can manage reputation evaluation for urban planning agents in smart city systems that must analyze demographic trends, infrastructure needs, and development patterns while building trust through successful long-term planning outcomes, infrastructure optimization achievements, and sustainable development success that demonstrates effective strategic urban planning capabilities.

In some implementations, reputation applications 1130 can utilize processed reputation data and trust scores to implement practical decision-making functions including vote weighting, task allocation, and risk management operations that leverage agent reputation information to bias system performance and ensure reliable operation of distributed multi-agent coordination systems. The reputation applications 1130 can be constructed as a comprehensive application framework that transforms reputation scores and trust assessments into actionable decision-making logic while implementing specialized algorithms for different operational functions that require trust-based coordination and performance optimization (e.g., consensus voting systems, resource allocation mechanisms, risk assessment protocols, and/or the like). The reputation applications 1130 can include dynamic application selection mechanisms that automatically choose appropriate reputation-based decision-making strategies based on operational contexts, system requirements, and performance objectives while ensuring optimal utilization of trust information for different types of coordination and management tasks. The reputation applications 1130 can implement real-time reputation integration systems that continuously incorporate updated trust scores and performance assessments into ongoing decision-making processes while maintaining responsiveness to changing agent capabilities and reputation developments. The reputation applications 1130 can maintain application-specific optimization algorithms that fine-tune reputation utilization strategies based on observed outcomes and system performance feedback while continuously improving the effectiveness of trust-based decision-making across different operational applications. The reputation applications 1130 can include comprehensive monitoring and evaluation systems that track the effectiveness of reputation-based applications while generating performance feedback that contributes to continuous improvement of trust utilization strategies and decision-making optimization. For example, the reputation applications 1130 can implement reputation-based quality control systems in manufacturing networks where production agents with higher reputation scores receive priority access to premium materials and advanced equipment while lower-reputation agents undergo additional quality verification processes to ensure consistent product quality and manufacturing reliability. In another example, the reputation applications 1130 can facilitate reputation-based service level management in cloud computing platforms where computational agents with proven reliability records receive preferential resource allocation and premium service assignments while newer or lower-reputation agents are assigned to less critical tasks until they demonstrate consistent performance and build trust within the system. Additionally, the reputation applications 1130 can support reputation-based collaboration matching in research networks where scientists and research agents with complementary expertise and high reputation scores are automatically paired for collaborative projects while reputation data is used to bias team composition and predict project success probability.

In some implementations, a vote weighting module 1132 can apply reputation-based influence adjustments to agent voting processes within consensus decision-making systems while implementing weighting algorithms that account for historical performance, domain expertise, and trust levels to ensure that more reliable and competent agents have appropriate influence over collective decisions. The vote weighting module 1132 can be implemented as a dynamic voting influence calculation system that processes reputation scores, performance histories, and domain-specific expertise indicators to generate weighted voting coefficients that reflect each agent's relative trustworthiness and competence for specific decision-making scenarios (e.g., expertise-based weighting, performance-based multipliers, trust-adjusted voting power, and/or the like). The vote weighting module 1132 can include context-aware weighting algorithms that adjust voting influence based on decision types, operational domains, and specific expertise requirements while ensuring that agents with relevant experience and proven performance in similar scenarios receive appropriate influence over related decisions. The vote weighting module 1132 can implement anti-manipulation mechanisms that prevent reputation gaming and voting power concentration while maintaining fair and balanced influence distribution that reflects genuine agent capabilities and trustworthiness rather than artificial reputation inflation or strategic manipulation. The vote weighting module 1132 can maintain dynamic weighting adjustment capabilities that continuously update voting influence based on recent performance data and reputation changes while ensuring that voting power accurately reflects current agent capabilities and reliability levels. The vote weighting module 1132 can include voting outcome analysis systems that evaluate the effectiveness of reputation-based vote weighting while generating feedback that contributes to continuous improvement of weighting algorithms and voting influence optimization strategies. For example, the vote weighting module 1132 can manage voting influence in corporate governance systems where board member agents with proven track records in financial management, strategic planning, and regulatory compliance receive weighted voting power that reflects their expertise and historical performance while ensuring that critical business decisions benefit from the most qualified and trustworthy decision-makers. In another example, the vote weighting module 1132 can implement reputation-based voting in academic peer review systems where researcher agents with established publication records, citation impact, and peer recognition receive enhanced voting influence for manuscript acceptance decisions while maintaining quality standards and ensuring that review decisions reflect expert judgment and academic credibility. Additionally, the vote weighting module 1132 can facilitate weighted voting in autonomous vehicle coordination networks where vehicles with superior safety records, traffic rule compliance, and coordination effectiveness receive greater influence over traffic management decisions while ensuring that road safety and traffic optimization benefit from the most reliable and competent autonomous driving agents.

In some implementations, a task allocation module 1134 can assign operational responsibilities and work assignments to AI agents based on reputation scores, domain-specific expertise ratings, and historical performance indicators while implementing matching algorithms that bias task-agent pairing to maximize success probability and operational efficiency. The task allocation module 1134 can be constructed as an intelligent assignment system that analyzes task requirements, agent capabilities, reputation profiles, and performance histories to generate optimal task-agent matching decisions while considering factors such as workload balance, expertise alignment, and success probability optimization (e.g., skill-based matching, performance-based assignment, reputation-weighted allocation, and/or the like). The task allocation module 1134 can include dynamic allocation algorithms that continuously reassess task assignments based on changing agent availability, updated reputation scores, and evolving task requirements while maintaining optimal resource utilization and performance outcomes throughout operational periods. The task allocation module 1134 can implement fairness mechanisms that ensure equitable task distribution while balancing reputation-based preferences with opportunity provision for agents to build reputation and demonstrate capabilities in new operational areas. The task allocation module 1134 can maintain performance tracking systems that monitor task completion outcomes and success rates while generating feedback that contributes to reputation updates and allocation algorithm refinement for continuous improvement of task-agent matching effectiveness. The task allocation module 1134 can include workload optimization capabilities that balance task distribution across available agents while considering reputation levels, capacity constraints, and performance objectives to ensure sustainable operation and optimal resource utilization. For example, the task allocation module 1134 can manage work assignment in software development projects where programming agents with high reputation scores in specific technologies and proven track records in similar projects receive priority assignment to critical development tasks while newer agents are assigned to less complex tasks with mentorship opportunities to build reputation and develop expertise. In another example, the task allocation module 1134 can facilitate task distribution in medical diagnosis networks where diagnostic agents with specialized expertise and high accuracy rates in particular medical domains receive assignment to complex cases within their specialization while maintaining balanced workload distribution and ensuring that all agents have opportunities to contribute and build reputation. Additionally, the task allocation module 1134 can bias task assignment in logistics coordination systems where delivery agents with superior performance records in specific geographic regions or delivery types receive preferential assignment to high-priority shipments while maintaining efficient route optimization and ensuring that reputation-based allocation contributes to overall logistics network performance and customer satisfaction.

In some implementations, a risk management module 1136 can adjust threshold requirements, authorization levels, and operational constraints based on agent reliability assessments and reputation scores while implementing risk mitigation strategies that account for agent trustworthiness and historical performance to minimize operational risks and ensure system security. The risk management module 1136 can be implemented as a comprehensive risk assessment and mitigation system that processes reputation data, performance histories, and reliability indicators to generate dynamic risk profiles and corresponding operational constraints for individual agents while maintaining system-wide security and performance standards (e.g., trust-based authorization levels, reputation-adjusted risk thresholds, performance-based operational limits, and/or the like). The risk management module 1136 can include adaptive risk threshold algorithms that automatically adjust operational limits, authorization requirements, and oversight levels based on agent reputation changes and performance trends while ensuring that higher-reputation agents receive appropriate operational freedom while lower-reputation agents operate under enhanced monitoring and control mechanisms. The risk management module 1136 can implement multi-layered risk mitigation strategies that combine reputation-based controls with technical safeguards, monitoring systems, and intervention mechanisms to provide comprehensive protection against operational risks and security threats while maintaining efficient system operation. The risk management module 1136 can maintain risk assessment databases that track risk incidents, mitigation effectiveness, and outcome patterns while generating analytical insights that contribute to continuous improvement of risk management strategies and reputation-based risk assessment accuracy. The risk management module 1136 can include emergency response protocols that enable rapid risk mitigation and system protection when reputation-based risk indicators suggest potential threats or operational failures while maintaining system continuity and minimizing disruption to ongoing operations. For example, the risk management module 1136 can implement risk-based access control in financial trading systems where agents with high reputation scores and proven risk management track records receive authorization for larger transaction limits and more complex trading strategies while agents with lower reputation or recent performance issues operate under enhanced oversight and reduced transaction limits to protect against financial losses and regulatory violations. In another example, the risk management module 1136 can manage operational risk in autonomous vehicle networks where vehicles with superior safety records and reliability ratings receive authorization for higher-speed operations and complex maneuvers while vehicles with lower reputation scores or recent safety incidents operate under enhanced monitoring and conservative operational parameters to ensure road safety and prevent accidents. Additionally, the risk management module 1136 can facilitate risk management in healthcare decision support systems where medical agents with established diagnostic accuracy and patient safety records receive authorization to make independent treatment recommendations while agents with lower reputation or recent performance concerns require additional verification and oversight to ensure patient safety and maintain healthcare quality standards.

Figure 12:
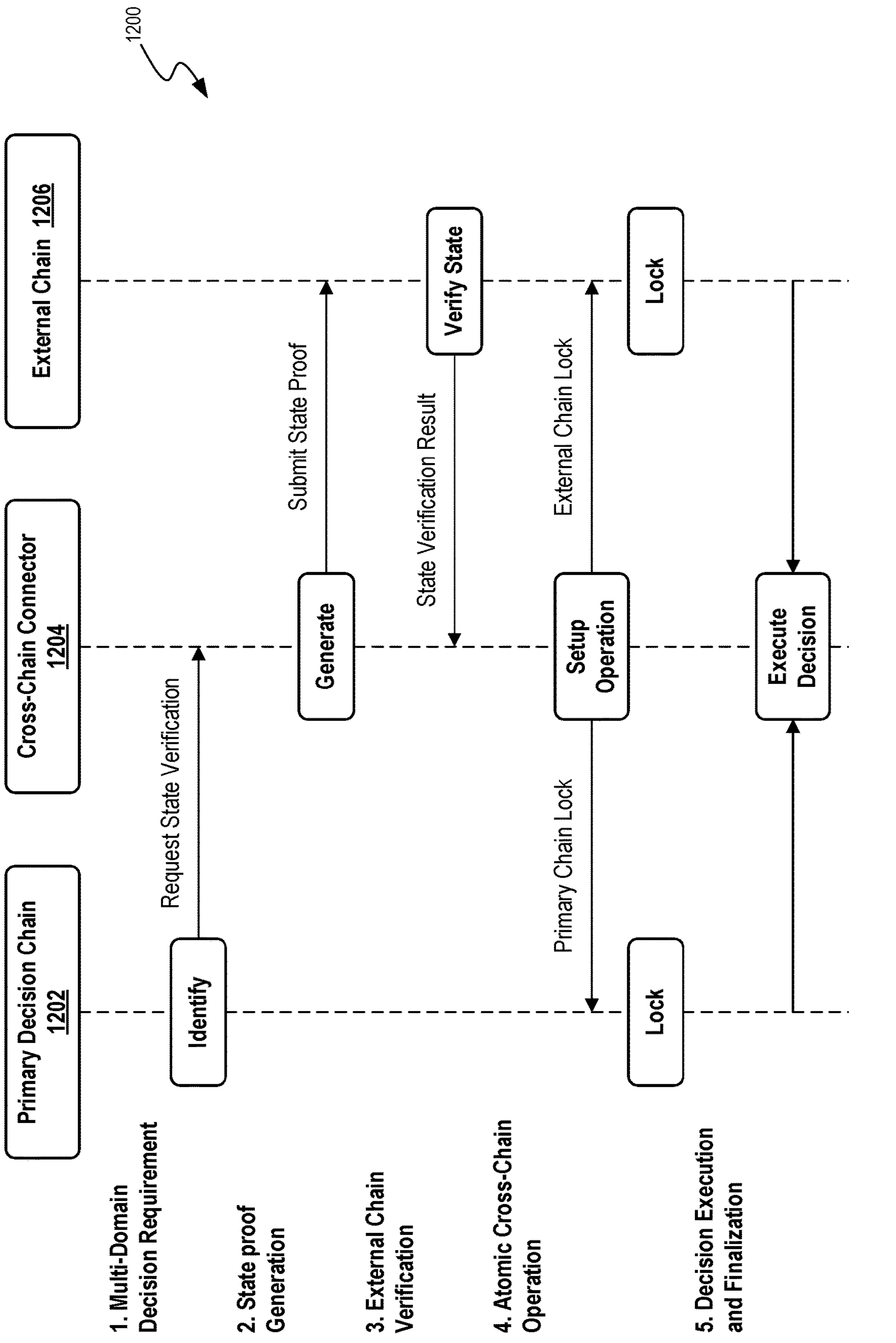
FIG. 12 is a flowchart that illustrates an example process for cross-chain interoperability and coordination mechanisms between multiple blockchain networks, in accordance with some implementations of the present technology.

FIG. 12 is a flowchart that illustrates an example process 1200 for cross-chain interoperability and coordination mechanisms between multiple blockchain networks in accordance with some implementations of the present technology. In some implementations, a process 1200 can facilitate cross-chain interoperability and coordination mechanisms that enable autonomous agents to execute decision-making workflows across multiple blockchain networks while maintaining cryptographic verification and consensus integrity throughout distributed ledger environments. The process 1200 can be constructed as a multi-blockchain coordination framework that orchestrates complex interactions between heterogeneous distributed ledger systems through specialized communication protocols and state synchronization mechanisms (e.g., Inter-Blockchain Communication protocols, atomic swap implementations, cross-chain state verification systems, and/or the like). The process 1200 can include automated workflow orchestration capabilities that coordinate sequential and parallel operations across multiple blockchain networks while ensuring that decision execution maintains consistency and integrity across all participating distributed ledger systems. The process 1200 can implement comprehensive state management systems that track decision progress, verification status, and execution outcomes across multiple blockchain environments while providing real-time monitoring and coordination feedback to participating agents and system components. The process 1200 can maintain cryptographic security guarantees throughout cross-chain operations by implementing verification protocols that ensure data integrity, transaction authenticity, and consensus validity across all participating blockchain networks. For example, the process 1200 can coordinate supply chain compliance verification workflows where manufacturing agents operating on one blockchain network must coordinate with logistics agents on a different blockchain network to ensure end-to-end traceability and compliance verification while maintaining data integrity and verification authenticity across both distributed ledger systems. In another example, the process 1200 can facilitate financial services coordination scenarios where trading agents on one blockchain network must coordinate with settlement agents on a different blockchain network to execute complex multi-asset transactions while ensuring atomic execution and preventing partial settlement failures. Additionally, the process 1200 can support healthcare data sharing workflows where medical research agents on one blockchain network must coordinate with patient data management agents on a different blockchain network to enable secure data analysis while maintaining patient privacy and regulatory compliance across multiple healthcare blockchain systems.

In some implementations, a primary decision chain 1202 can operate as the foundational blockchain infrastructure that hosts the initial decision-making processes and serves as the coordination hub for multi-blockchain decision execution workflows within the cross-chain interoperability system. The primary decision chain 1202 can be implemented as a specialized distributed ledger system that maintains comprehensive decision records, agent interactions, and consensus outcomes while providing standardized interfaces for cross-chain communication and coordination with external blockchain networks (e.g., smart contract execution environments, consensus validation mechanisms, transaction processing systems, and/or the like). The primary decision chain 1202 can include native decision-making protocols that enable autonomous agents to initiate proposals, submit evidence, conduct voting processes, and execute consensus-based decisions while maintaining cryptographic audit trails and immutable record keeping throughout the decision workflow. The primary decision chain 1202 can implement state management capabilities that track decision progress, participant contributions, and execution status while providing real-time state information to cross-chain coordination mechanisms and external blockchain networks. The primary decision chain 1202 can maintain specialized smart contract infrastructure that enables automated execution of decision outcomes while coordinating with cross-chain connectors to ensure that decision implementation spans multiple blockchain networks when required. The primary decision chain 1202 can include comprehensive security mechanisms that protect decision data, participant information, and execution logic while enabling secure communication and coordination with external blockchain networks through cryptographically protected channels. For example, the primary decision chain 1202 can host corporate governance decision-making processes where board member agents initiate strategic planning proposals, conduct voting procedures, and execute approved decisions while coordinating with subsidiary company blockchain networks to ensure that governance decisions are implemented across the entire corporate structure through cross-chain coordination mechanisms. In another example, the primary decision chain 1202 can manage regulatory compliance decision workflows where compliance agents evaluate regulatory requirements, conduct compliance assessments, and execute compliance actions while coordinating with industry-specific blockchain networks to ensure that compliance decisions are propagated and implemented across relevant regulatory domains. Additionally, the primary decision chain 1202 can facilitate research collaboration decision processes where academic agents propose research initiatives, conduct peer review processes, and execute research funding decisions while coordinating with institutional blockchain networks to ensure that research decisions are implemented across participating academic institutions and funding organizations.

In some implementations, a cross-chain connector 1204 can function as a specialized communication and coordination infrastructure that enables interaction between the primary decision chain 1202 and external blockchain networks while implementing protocol translation and state synchronization mechanisms. The cross-chain connector 1204 can be constructed as a multi-protocol bridge system that implements Inter-Blockchain Communication protocols and designated relayer node architectures to monitor blockchain events, translate protocol messages, and coordinate transaction execution across heterogeneous distributed ledger environments (e.g., message relay systems, protocol adaptation layers, state proof generation mechanisms, and/or the like). The cross-chain connector 1204 can include automated event monitoring capabilities that continuously observe blockchain state changes, transaction confirmations, and consensus outcomes on multiple blockchain networks while generating corresponding coordination messages and state updates for cross-chain synchronization processes. The cross-chain connector 1204 can implement protocol translation processes that convert blockchain-specific transaction formats, consensus mechanisms, and state representations into standardized cross-chain communication protocols while preserving data integrity and cryptographic security throughout the translation process. The cross-chain connector 1204 can maintain comprehensive state verification systems that generate cryptographically verifiable attestations of blockchain states and transaction outcomes while enabling external blockchain networks to independently verify cross-chain information without requiring direct access to internal blockchain data. The cross-chain connector 1204 can include atomic operation coordination capabilities that ensure either all required cross-chain operations complete successfully or all operations are rolled back to prevent partial execution states that could compromise system integrity across multiple blockchain networks. For example, the cross-chain connector 1204 can coordinate pharmaceutical supply chain verification processes where drug manufacturing compliance records on one blockchain network must be synchronized with distribution tracking data on a different blockchain network while ensuring that compliance verification and distribution authorization occur atomically across both blockchain systems to prevent unauthorized drug distribution. In another example, the cross-chain connector 1204 can facilitate cross-border financial transaction coordination where payment initiation on one blockchain network must be synchronized with currency conversion and settlement processes on different blockchain networks while ensuring atomic execution to prevent partial transaction completion and financial loss. Additionally, the cross-chain connector 1204 can support multi-institutional research data sharing scenarios where research data validation on one blockchain network must be coordinated with access control and usage tracking on different institutional blockchain networks while ensuring that data access authorization and usage logging occur simultaneously across all participating research institution blockchain systems.

In some implementations, an external chain 1206 can serve as an independent blockchain network that participates in cross-chain decision execution workflows while maintaining autonomous operation and providing specialized capabilities that complement the decision-making processes initiated on the primary decision chain 1202. The external chain 1206 can be implemented as a distinct distributed ledger system with specialized consensus mechanisms, transaction processing capabilities, and smart contract functionality that enables participation in multi-blockchain coordination scenarios while preserving network independence and operational autonomy (e.g., specialized consensus algorithms, domain-specific smart contracts, industry-focused transaction processing, and/or the like). The external chain 1206 can include cross-chain communication interfaces that enable secure interaction with the cross-chain connector 1204 while maintaining network security and preventing unauthorized access to internal blockchain operations and sensitive transaction data. The external chain 1206 can implement state verification capabilities that enable independent validation of cross-chain coordination requests and state proof artifacts while ensuring that external coordination requirements align with internal blockchain policies and operational constraints. The external chain 1206 can maintain specialized execution environments that enable implementation of decision outcomes received through cross-chain coordination while adapting execution logic to conform with network-specific requirements, regulatory constraints, and operational protocols. The external chain 1206 can include comprehensive audit and compliance systems that track cross-chain interactions, coordination outcomes, and execution results while maintaining detailed records for regulatory reporting and dispute resolution purposes. The external chain 1206 can implement security mechanisms that protect against cross-chain attack vectors while enabling legitimate coordination and collaboration with other blockchain networks through cryptographically secured communication channels. For example, the external chain 1206 can operate as a specialized healthcare blockchain network that maintains patient data and medical records while participating in cross-chain research coordination workflows where research proposals approved on the primary decision chain 1202 trigger automated data access and analysis processes on the healthcare blockchain while ensuring patient privacy protection and regulatory compliance throughout the cross-chain coordination process. In another example, the external chain 1206 can function as an industry-specific supply chain blockchain network that tracks component manufacturing and quality control while coordinating with procurement decision processes on the primary decision chain 1202 to ensure that approved procurement decisions automatically trigger component ordering and delivery tracking across the specialized supply chain blockchain network. Additionally, the external chain 1206 can serve as a regulatory compliance blockchain network that maintains industry standards and compliance records while coordinating with governance decision processes on the primary decision chain 1202 to ensure that approved policy changes automatically trigger compliance updates and verification processes across the regulatory blockchain network.

Referring to FIG. 12, the process 1200 can implement a comprehensive five-phase coordination workflow that orchestrates complex interactions between the primary decision chain 1202, the cross-chain connector 1204, and the external chain 1206 while ensuring cryptographic security and operational integrity throughout the multi-blockchain decision execution process. The process 1200 can initiate with a multi-domain decision requirement phase where the primary decision chain 1202 identifies the need for cross-chain coordination and generates state verification requests that specify the external blockchain capabilities and coordination requirements needed to complete the decision execution workflow (e.g., external data validation requirements, cross-chain resource allocation needs, multi-blockchain consensus coordination, and/or the like). The process 1200 can include automated requirement analysis processes that evaluate decision complexity, resource requirements, and coordination dependencies to determine optimal cross-chain coordination strategies while minimizing communication overhead and maximizing execution efficiency across multiple blockchain networks. The process 1200 can implement comprehensive coordination planning mechanisms that generate detailed execution workflows specifying the sequence of cross-chain operations, state synchronization requirements, and verification checkpoints needed to ensure successful multi-blockchain decision implementation. The process 1200 can maintain real-time coordination monitoring capabilities that track execution progress across all participating blockchain networks while providing immediate feedback and error detection to prevent coordination failures and ensure successful decision execution. The process 1200 can include comprehensive rollback and recovery mechanisms that enable automatic restoration of previous states when coordination failures occur while preventing partial execution states that could compromise system integrity across multiple blockchain networks. For example, the process 1200 can coordinate complex merger and acquisition decision workflows where corporate governance decisions on the primary decision chain 1202 must trigger simultaneous asset transfer processes on multiple subsidiary blockchain networks while ensuring that all asset transfers complete atomically to prevent partial ownership transfers and legal complications. In another example, the process 1200 can facilitate international trade coordination scenarios where export approval decisions on the primary decision chain 1202 must coordinate with customs processing on destination country blockchain networks while ensuring that export authorization and customs clearance occur simultaneously to prevent shipment delays and regulatory violations. Additionally, the process 1200 can support multi-jurisdictional regulatory compliance workflows where policy approval decisions on the primary decision chain 1202 must coordinate with implementation processes on regional regulatory blockchain networks while ensuring that policy implementation occurs consistently across all relevant jurisdictions to maintain regulatory compliance and operational consistency.

With continued reference to FIG. 12, the process 1200 can execute a state proof generation phase where the cross-chain connector 1204 creates cryptographically verifiable attestations of blockchain states and decision outcomes while implementing verification processes that enable external blockchain networks to independently validate cross-chain coordination information. The cross-chain connector 1204 can implement cryptographic proof generation systems that create mathematical attestations of blockchain state information using merkle tree constructions, cryptographic hash functions, and digital signature processes while ensuring that state proofs remain tamper-evident and independently verifiable (e.g., merkle proof generation, cryptographic hash chain construction, digital signature verification systems, and/or the like). The cross-chain connector 1204 can include automated proof optimization processes that minimize proof size and verification complexity while maintaining cryptographic security guarantees and enabling efficient transmission and validation across network infrastructure with varying bandwidth and computational constraints. The cross-chain connector 1204 can implement comprehensive proof validation mechanisms that verify the mathematical correctness and cryptographic integrity of generated state proofs while ensuring that proof artifacts accurately represent blockchain states and decision outcomes without introducing errors or inconsistencies. The cross-chain connector 1204 can maintain proof caching and optimization systems that store frequently used state proofs and enable efficient reuse of verification artifacts while reducing computational overhead and improving system performance for recurring cross-chain coordination scenarios. The cross-chain connector 1204 can include proof standardization frameworks that ensure state proof artifacts conform to industry standards and cross-chain communication protocols while enabling interoperability with diverse blockchain networks and verification systems. For example, the cross-chain connector 1204 can generate state proofs for intellectual property licensing decisions where patent approval processes on the primary decision chain 1202 must be verified by manufacturing blockchain networks to ensure that production authorization aligns with approved licensing terms while maintaining cryptographic proof of licensing compliance and preventing unauthorized intellectual property usage. In another example, the cross-chain connector 1204 can create state proofs for environmental compliance decisions where emission reduction commitments on the primary decision chain 1202 must be verified by industrial blockchain networks to ensure that production modifications align with approved environmental targets while providing cryptographic evidence of compliance commitment and implementation coordination. Additionally, the cross-chain connector 1204 can produce state proofs for financial audit decisions where audit approval processes on the primary decision chain 1202 must be verified by subsidiary blockchain networks to ensure that financial reporting modifications align with approved audit recommendations while maintaining cryptographic proof of audit compliance and financial accuracy.

As further shown in FIG. 12, the process 1200 can conduct an external chain verification phase where the external chain 1206 receives state proof artifacts from the cross-chain connector 1204 and performs independent validation of cross-chain coordination requests while ensuring that external coordination requirements align with internal blockchain policies and operational constraints. The external chain 1206 can implement state verification processes that mathematically validate cryptographic proofs, verify digital signatures, and confirm blockchain state authenticity while ensuring that cross-chain coordination requests originate from legitimate sources and contain accurate information (e.g., cryptographic signature verification, merkle proof validation, hash chain verification systems, and/or the like). The external chain 1206 can include automated policy compliance checking systems that evaluate cross-chain coordination requests against internal blockchain governance policies, regulatory requirements, and operational constraints while ensuring that external coordination activities align with network-specific rules and compliance obligations. The external chain 1206 can implement comprehensive risk assessment mechanisms that analyze cross-chain coordination requests for potential security threats, operational risks, and compliance violations while providing automated risk mitigation and threat prevention capabilities. The external chain 1206 can maintain detailed verification logging systems that record all cross-chain verification activities, outcomes, and associated metadata while providing comprehensive audit trails for regulatory compliance and dispute resolution purposes. The external chain 1206 can include verification result communication capabilities that generate standardized verification responses and status updates for transmission back to the cross-chain connector 1204 while ensuring that verification outcomes are accurately communicated and properly formatted for cross-chain coordination processes. For example, the external chain 1206 can verify pharmaceutical manufacturing authorization requests where drug production approval decisions from the primary decision chain 1202 must be validated against regulatory compliance records and manufacturing capacity constraints on the pharmaceutical blockchain network while ensuring that production authorization aligns with safety regulations and quality standards before enabling manufacturing processes. In another example, the external chain 1206 can validate financial transaction authorization requests where payment approval decisions from the primary decision chain 1202 must be verified against account balances and regulatory compliance records on banking blockchain networks while ensuring that transaction authorization aligns with anti-money laundering requirements and account holder permissions before enabling payment processing. Additionally, the external chain 1206 can authenticate research data access requests where data sharing approval decisions from the primary decision chain 1202 must be validated against privacy policies and institutional agreements on research blockchain networks while ensuring that data access authorization aligns with ethical review requirements and participant consent before enabling research data sharing.

The process 1200 can implement an atomic cross-chain operation phase where the cross-chain connector 1204 coordinates simultaneous execution of operations across multiple blockchain networks while implementing atomic swap protocols that ensure either all required operations complete successfully or all operations are rolled back to prevent partial execution states. The cross-chain connector 1204 can execute coordination processes that implement atomic swap protocols and multi-blockchain synchronization mechanisms to ensure that coordinated operations across the primary decision chain 1202 and the external chain 1206 occur simultaneously and maintain consistency throughout the execution process (e.g., time-locked transaction coordination, cryptographic commitment schemes, multi-signature authorization systems, and/or the like). The cross-chain connector 1204 can include comprehensive transaction locking mechanisms that temporarily restrict blockchain state modifications during atomic operation execution while ensuring that coordinated operations can proceed without interference from concurrent transactions or state changes that could compromise execution integrity. The cross-chain connector 1204 can implement failure detection and rollback systems that monitor atomic operation progress across all participating blockchain networks while automatically triggering rollback procedures when execution failures or inconsistencies are detected to prevent partial execution states and maintain system integrity. The cross-chain connector 1204 can maintain detailed execution monitoring capabilities that track operation progress, resource utilization, and performance metrics across multiple blockchain networks while providing real-time feedback and status updates to participating agents and system components. The cross-chain connector 1204 can include comprehensive execution verification systems that confirm successful completion of atomic operations across all participating blockchain networks while generating cryptographic proof of execution success and coordination integrity for audit and compliance purposes. For example, the cross-chain connector 1204 can coordinate atomic execution of international trade transactions where export authorization on the primary decision chain 1202 must occur simultaneously with import approval on destination country blockchain networks while ensuring that either both authorizations complete successfully or both are cancelled to prevent partial trade authorization that could result in shipment delays and regulatory violations. In another example, the cross-chain connector 1204 can facilitate atomic execution of multi-institutional research collaborations where research funding approval on the primary decision chain 1202 must occur simultaneously with resource allocation on participating institution blockchain networks while ensuring that either all funding and resource allocations complete successfully or all are cancelled to prevent partial project funding that could compromise research objectives. Additionally, the cross-chain connector 1204 can enable atomic execution of corporate merger processes where ownership transfer approval on the primary decision chain 1202 must occur simultaneously with asset transfer processes on subsidiary blockchain networks while ensuring that either all ownership and asset transfers complete successfully or all are cancelled to prevent partial merger completion that could create legal complications and operational inconsistencies.

The process 1200 can conclude with a decision execution and finalization phase where coordinated operations across the primary decision chain 1202 and the external chain 1206 are completed and finalized while comprehensive execution records are generated and stored across all participating blockchain networks for audit and compliance purposes. The cross-chain connector 1204 can implement comprehensive finalization protocols that confirm successful completion of all coordinated operations while generating detailed execution reports, performance metrics, and compliance documentation that provide complete audit trails for cross-chain coordination activities (e.g., execution confirmation systems, audit report generation, compliance documentation creation, and/or the like). The cross-chain connector 1204 can include automated record synchronization mechanisms that ensure execution records and audit documentation are consistently stored across all participating blockchain networks while maintaining data integrity and preventing record inconsistencies that could compromise audit accuracy and compliance verification. The cross-chain connector 1204 can implement comprehensive performance analysis systems that evaluate coordination efficiency, execution success rates, and system performance metrics while generating analytical insights that contribute to continuous improvement of cross-chain coordination processes and operational optimization. The cross-chain connector 1204 can maintain detailed outcome verification capabilities that confirm that coordinated operations achieved intended results and met specified performance criteria while providing verification documentation for stakeholder review and regulatory compliance purposes. The cross-chain connector 1204 can include comprehensive notification and reporting systems that communicate execution outcomes to participating agents, system administrators, and external stakeholders while ensuring that execution results are accurately communicated and properly documented for ongoing operational management and compliance monitoring. For example, the cross-chain connector 1204 can finalize complex supply chain coordination workflows where quality approval decisions on the primary decision chain 1202 coordinate with production scheduling on manufacturing blockchain networks while generating comprehensive execution reports that document quality verification outcomes, production scheduling confirmations, and coordination performance metrics for supply chain management and regulatory compliance purposes. In another example, the cross-chain connector 1204 can complete healthcare data sharing coordination processes where research approval decisions on the primary decision chain 1202 coordinate with data access provisioning on healthcare blockchain networks while producing detailed execution documentation that records research authorization outcomes, data access confirmations, and privacy compliance verification for healthcare governance and regulatory oversight purposes. Additionally, the cross-chain connector 1204 can finalize financial services coordination workflows where investment approval decisions on the primary decision chain 1202 coordinate with portfolio management processes on investment blockchain networks while creating comprehensive execution records that document investment authorization outcomes, portfolio modification confirmations, and regulatory compliance verification for financial oversight and audit purposes.

Figure 13:
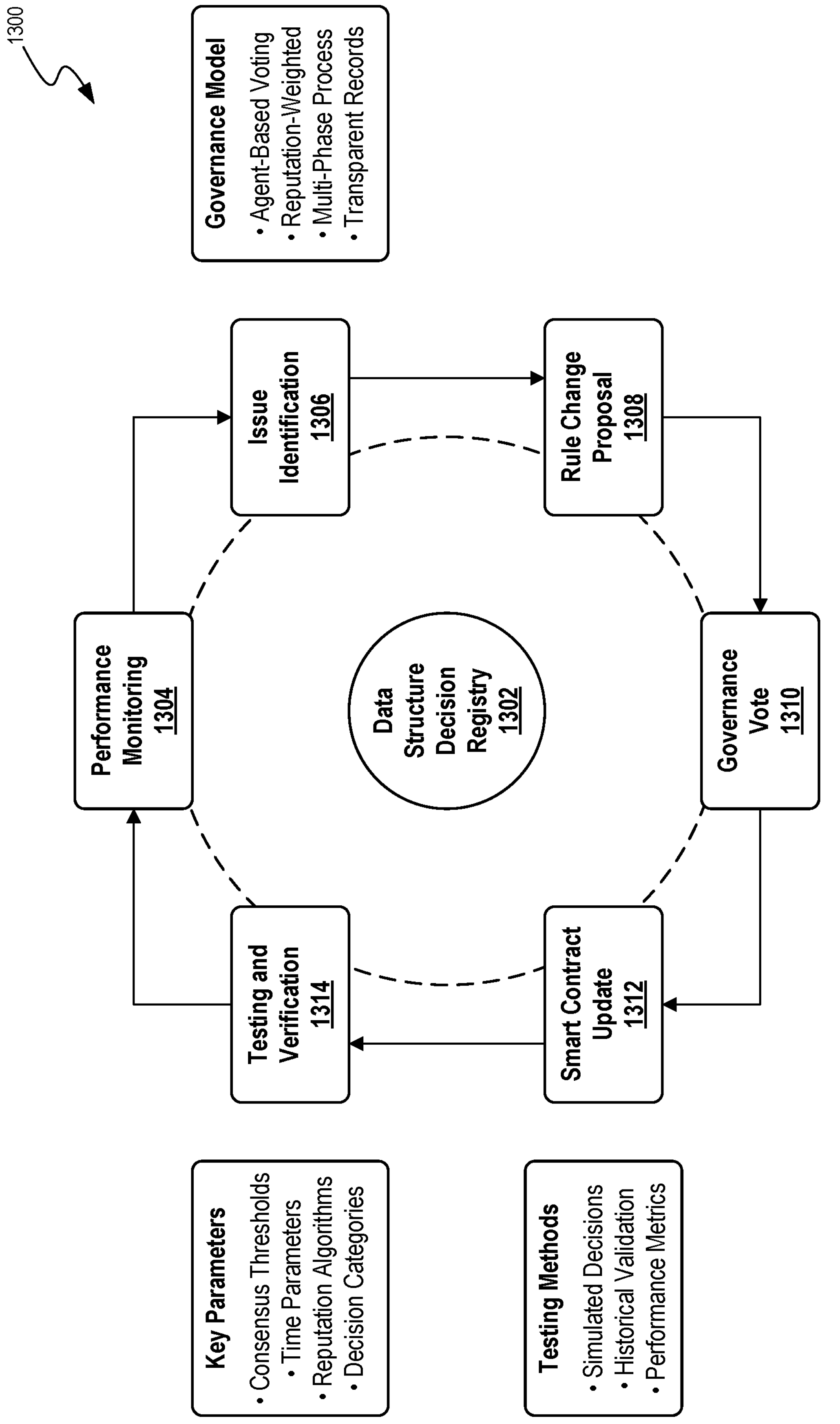
FIG. 13 is a block diagram that illustrates a distributed environment for executing autonomous agent decisions using cross-verification methods, in accordance with some implementations of the present technology.

FIG. 13 is a block diagram that illustrates a distributed environment 1300 for executing autonomous agent decisions using cross-verification methods in accordance with some implementations of the present technology. The distributed environment 1300 can be implemented using components of the computer system 2600 illustrated and described in more detail with reference to FIG. 26. The distributed environment 1300 can include different and/or additional components or can be connected in different ways. The distributed environment 1300 operates as a comprehensive governance adaptation infrastructure that enables dynamic modification of operational rules and policies based on real-time performance feedback and systematic evaluation of agent behaviors within multi-tiered distributed environments.

In some implementations, a data structure decision registry 1302 can function as the central coordination hub that maintains comprehensive records of all decision-making activities, performance metrics, and governance rule modifications while providing persistent storage and retrieval capabilities for historical decision data and rule evolution tracking. The data structure decision registry 1302 can be constructed as a distributed database system that includes structured data storage mechanisms for decision records (e.g., proposal submissions, voting outcomes, consensus determinations, and/or the like), performance measurement repositories for agent behavior tracking (e.g., response times, accuracy rates, compliance adherence scores, and/or the like), and rule versioning systems for governance policy evolution management (e.g., rule modification timestamps, change authorization records, implementation status indicators, and/or the like). The data structure decision registry 1302 can implement indexing processes that enable efficient retrieval of decision records based on multiple criteria including agent identifiers, decision types, temporal ranges, and performance outcomes while maintaining data integrity through cryptographic checksums and distributed consensus validation mechanisms. The data structure decision registry 1302 can include automated data lifecycle management capabilities that handle record retention policies, archival procedures, and secure deletion protocols according to regulatory requirements and organizational governance policies while maintaining comprehensive audit trails for compliance verification and dispute resolution purposes. The data structure decision registry 1302 can maintain real-time synchronization mechanisms that ensure consistent data availability across multiple system nodes while implementing conflict resolution processes that handle concurrent data modifications and maintain data consistency throughout the distributed environment 1300. For example, the data structure decision registry 1302 can manage comprehensive decision records for pharmaceutical supply chain governance where drug manufacturing approval decisions, quality control verification outcomes, and distribution authorization records are maintained with detailed performance metrics that track compliance adherence rates, processing times, and decision accuracy levels while enabling systematic analysis of governance effectiveness and identification of areas requiring rule modifications. In another example, the data structure decision registry 1302 can store decision records for financial services compliance governance where regulatory approval processes, risk assessment decisions, and audit verification outcomes are recorded with performance indicators that measure processing efficiency, accuracy rates, and compliance success levels while supporting continuous evaluation of governance rule effectiveness and systematic identification of improvement opportunities. Additionally, the data structure decision registry 1302 can maintain decision records for healthcare data sharing governance where patient privacy protection decisions, research authorization processes, and data access control outcomes are documented with performance metrics that track privacy compliance rates, authorization accuracy, and access control effectiveness while enabling ongoing assessment of governance policy performance and systematic identification of rule enhancement requirements.

In some implementations, a performance monitoring module 1304 can continuously observe and evaluate the operational effectiveness of governance rules and agent behaviors while implementing measurement processes that track decision quality, processing efficiency, and compliance adherence across multiple operational contexts and performance dimensions. The performance monitoring module 1304 can be implemented as a real-time data collection and analysis system that includes automated metric calculation engines for decision outcome assessment (e.g., accuracy measurements, timeliness evaluations, resource utilization tracking, and/or the like), behavioral pattern recognition processes for agent performance analysis (e.g., consistency scoring, reliability assessment, adaptation capability evaluation, and/or the like), and rule effectiveness evaluation mechanisms for governance policy performance measurement (e.g., compliance rate tracking, enforcement success monitoring, operational impact assessment, and/or the like). The performance monitoring module 1304 can include statistical analysis capabilities that identify performance trends, detect anomalies, and predict potential governance issues while implementing machine learning processes that continuously improve monitoring accuracy and predictive capabilities based on historical performance data and outcome feedback. The performance monitoring module 1304 can maintain comprehensive performance dashboards that provide real-time visibility into system-wide governance effectiveness while implementing automated alerting mechanisms that notify system administrators and governance stakeholders when performance metrics indicate potential issues or improvement opportunities. The performance monitoring module 1304 can implement context-aware monitoring protocols that adjust performance evaluation criteria based on operational environments, decision complexity levels, and regulatory requirements while ensuring fair and accurate assessment of governance rule effectiveness across diverse operational scenarios. The performance monitoring module 1304 can include automated performance reporting capabilities that generate detailed analysis reports for governance review processes while maintaining historical performance data for trend analysis and long-term governance optimization initiatives. For example, the performance monitoring module 1304 can track governance performance in autonomous vehicle coordination networks where traffic management rule effectiveness is measured through safety incident rates, traffic flow optimization metrics, and coordination success indicators while identifying patterns that suggest needs for rule modifications such as intersection priority protocols, emergency vehicle coordination protocols, or weather-specific traffic management procedures. In another example, the performance monitoring module 1304 can monitor governance effectiveness in distributed computing resource allocation systems where resource management rule performance is evaluated through utilization efficiency metrics, task completion rates, and system availability indicators while detecting trends that indicate requirements for rule adjustments such as load balancing processes, priority assignment mechanisms, or failure recovery procedures. Additionally, the performance monitoring module 1304 can assess governance performance in collaborative research networks where data sharing rule effectiveness is measured through research productivity metrics, collaboration success rates, and privacy compliance indicators while identifying patterns that suggest needs for rule enhancements such as access control mechanisms, data quality standards, or collaborative workflow procedures.

In some implementations, an issue identification module 1306 can analyze performance data and system behaviors to detect governance deficiencies, rule conflicts, and operational inefficiencies while implementing pattern recognition processes that identify systematic problems requiring governance rule modifications or policy adjustments. The issue identification module 1306 can be constructed as an intelligent analysis system that includes anomaly detection processes for performance deviation identification (e.g., statistical outlier detection, trend analysis, behavioral pattern recognition, and/or the like), root cause analysis engines for problem source determination (e.g., correlation analysis, causal inference processes, dependency mapping, and/or the like), and impact assessment mechanisms for issue severity evaluation (e.g., risk scoring, operational impact measurement, stakeholder effect analysis, and/or the like). The issue identification module 1306 can implement machine learning processes that continuously improve issue detection accuracy by learning from historical problem patterns, resolution outcomes, and system feedback while adapting detection criteria based on evolving operational environments and changing governance requirements. The issue identification module 1306 can include automated issue classification systems that categorize identified problems based on severity levels, operational domains, and resolution complexity while implementing priority ranking processes that determine issue resolution order based on impact assessment and resource availability. The issue identification module 1306 can maintain comprehensive issue tracking capabilities that monitor problem resolution progress, track resolution effectiveness, and evaluate the success of implemented governance rule modifications while providing feedback for continuous improvement of issue identification processes. The issue identification module 1306 can include collaborative issue validation mechanisms that enable multiple stakeholders to review and confirm identified issues while implementing consensus-based issue prioritization processes that ensure governance resources are allocated to address the most critical problems first. The issue identification module 1306 can implement predictive analysis capabilities that identify potential future issues based on current performance trends and system behaviors while enabling proactive governance rule modifications that prevent problems before operational impacts occur. For example, the issue identification module 1306 can detect governance issues in supply chain management systems where delivery delay patterns, quality control failures, and vendor performance inconsistencies are analyzed to identify systematic problems such as inadequate supplier qualification criteria, insufficient quality verification procedures, or ineffective performance monitoring mechanisms that require governance rule modifications to improve supply chain reliability and operational effectiveness. In another example, the issue identification module 1306 can identify governance deficiencies in financial trading systems where transaction processing delays, risk assessment inaccuracies, and compliance verification failures are examined to detect systematic issues such as outdated risk evaluation criteria, insufficient market volatility response mechanisms, or inadequate regulatory compliance procedures that necessitate governance rule updates to enhance trading system performance and regulatory adherence. Additionally, the issue identification module 1306 can recognize governance problems in healthcare data management systems where patient privacy violations, data access delays, and research collaboration inefficiencies are analyzed to identify systematic deficiencies such as overly restrictive access control policies, inadequate data quality standards, or insufficient collaboration facilitation mechanisms that require governance rule adjustments to improve healthcare data utilization while maintaining privacy protection.

In some implementations, a rule change proposal module 1308 can generate detailed recommendations for governance rule modifications based on identified issues and performance analysis while implementing proposal development processes that create comprehensive rule change specifications including implementation requirements, impact assessments, and validation criteria. The rule change proposal module 1308 can be implemented as an intelligent proposal generation system that includes automated rule analysis engines for current policy evaluation (e.g., rule effectiveness assessment, conflict identification, gap analysis, and/or the like), solution development processes for modification recommendation generation (e.g., rule optimization techniques, policy enhancement strategies, implementation pathway design, and/or the like), and impact modeling mechanisms for change consequence prediction (e.g., operational effect simulation, stakeholder impact analysis, resource requirement estimation, and/or the like). The rule change proposal module 1308 can include collaborative proposal development capabilities that enable multiple stakeholders to contribute expertise and perspectives while implementing consensus-building mechanisms that facilitate agreement on proposed rule modifications and implementation approaches. The rule change proposal module 1308 can implement comprehensive proposal documentation systems that create detailed specifications for proposed rule changes including technical implementation requirements, operational impact assessments, and success measurement criteria while maintaining version control and change tracking for proposal evolution management. The rule change proposal module 1308 can include automated proposal validation mechanisms that verify the technical feasibility, operational compatibility, and regulatory compliance of proposed rule changes while implementing risk assessment processes that evaluate potential negative consequences and mitigation strategies. The rule change proposal module 1308 can maintain proposal prioritization capabilities that rank multiple rule change recommendations based on impact potential, implementation complexity, and resource requirements while enabling systematic evaluation and selection of the most beneficial governance improvements. The rule change proposal module 1308 can include stakeholder communication systems that distribute proposed rule changes to relevant parties while implementing feedback collection mechanisms that gather input and suggestions for proposal refinement and improvement. For example, the rule change proposal module 1308 can generate governance rule modification proposals for autonomous logistics networks where delivery route optimization inefficiencies are addressed through proposed changes to routing processes, priority assignment mechanisms, and resource allocation procedures while providing detailed implementation specifications that include algorithm parameter adjustments, performance measurement criteria, and rollback procedures to ensure successful rule modification deployment. In another example, the rule change proposal module 1308 can develop governance rule enhancement proposals for collaborative research platforms where data sharing restrictions are addressed through proposed modifications to access control policies, privacy protection mechanisms, and collaboration facilitation procedures while creating comprehensive implementation plans that specify technical requirements, stakeholder training needs, and success evaluation metrics to ensure effective rule change implementation. Additionally, the rule change proposal module 1308 can create governance rule adjustment proposals for financial compliance systems where regulatory adherence inefficiencies are addressed through proposed updates to compliance verification procedures, risk assessment criteria, and audit trail requirements while developing detailed implementation roadmaps that include system modification specifications, testing protocols, and performance monitoring procedures to ensure successful governance rule improvements.

In some implementations, a governance vote module 1310 can coordinate democratic decision-making processes for proposed rule changes while implementing voting mechanisms that account for stakeholder expertise, authority levels, and affected interests to ensure legitimate and effective governance rule modifications. The governance vote module 1310 can be constructed as a comprehensive voting coordination system that includes voter authentication mechanisms for participant verification (e.g., digital certificate validation, role-based authorization, multi-factor authentication, and/or the like), ballot management systems for vote collection and processing (e.g., encrypted vote storage, anonymity protection, tamper detection, and/or the like), and consensus determination processes for voting outcome calculation (e.g., weighted voting schemes, quorum requirements, supermajority thresholds, and/or the like). The governance vote module 1310 can implement context-aware voting protocols that adjust voting procedures based on rule change complexity, operational impact levels, and stakeholder involvement requirements while ensuring appropriate participation and decision-making authority for different types of governance modifications. The governance vote module 1310 can include automated voting process management capabilities that handle voting timeline coordination, participant notification, and ballot distribution while implementing comprehensive audit trail generation that maintains detailed records of all voting activities for transparency and accountability purposes. The governance vote module 1310 can maintain vote weighting processes that account for stakeholder expertise levels, operational responsibility areas, and affected interest intensity while ensuring fair representation and appropriate influence distribution across different participant categories. The governance vote module 1310 can include real-time voting progress monitoring systems that track participation rates, provide voting status updates, and implement automated reminders to ensure adequate participation and timely voting completion. The governance vote module 1310 can implement comprehensive voting result analysis capabilities that evaluate voting patterns, identify consensus levels, and assess stakeholder agreement while providing detailed reporting for governance decision documentation and future reference. For example, the governance vote module 1310 can coordinate voting processes for healthcare data governance rule changes where medical researchers, privacy officers, institutional review board members, and patient representatives participate in weighted voting procedures that account for their respective expertise areas and affected interests while ensuring that proposed modifications to data sharing policies, privacy protection mechanisms, and research collaboration procedures receive appropriate stakeholder input and democratic approval before implementation. In another example, the governance vote module 1310 can manage voting procedures for supply chain governance rule modifications where manufacturers, suppliers, logistics providers, and quality control specialists participate in expertise-weighted voting processes that evaluate proposed changes to supplier qualification criteria, quality verification procedures, and delivery performance standards while ensuring that governance rule modifications receive comprehensive stakeholder review and democratic authorization. Additionally, the governance vote module 1310 can facilitate voting processes for financial services governance rule updates where compliance officers, risk managers, auditors, and regulatory liaisons participate in authority-weighted voting procedures that assess proposed modifications to regulatory compliance procedures, risk assessment criteria, and audit trail requirements while ensuring that governance rule changes receive appropriate expert evaluation and democratic validation before deployment.

In some implementations, a smart contract update module 1312 can implement approved governance rule changes through automated smart contract modifications while ensuring integration with existing system infrastructure and maintaining operational continuity throughout the rule change deployment process. The smart contract update module 1312 can be implemented as a contract management system that includes automated code generation engines for rule implementation (e.g., smart contract compilation, parameter configuration, logic integration, and/or the like), deployment coordination mechanisms for system-wide rule activation (e.g., synchronized deployment, rollback capabilities, version management, and/or the like), and integration validation systems for compatibility verification (e.g., interface testing, dependency checking, performance validation, and/or the like). The smart contract update module 1312 can include comprehensive version control capabilities that maintain detailed records of all smart contract modifications while implementing rollback mechanisms that enable rapid restoration of previous rule versions when deployment issues or operational problems are detected. The smart contract update module 1312 can implement automated testing protocols that verify smart contract functionality, performance characteristics, and integration compatibility before deployment while ensuring that rule changes operate correctly within the existing system environment and maintain expected operational behaviors. The smart contract update module 1312 can maintain deployment orchestration capabilities that coordinate rule change implementation across multiple system components while implementing staged deployment procedures that enable gradual rule activation and impact monitoring throughout the deployment process. The smart contract update module 1312 can include comprehensive monitoring systems that track smart contract performance after deployment while implementing automated alerting mechanisms that notify system administrators when rule changes cause unexpected behaviors or operational issues. The smart contract update module 1312 can implement security validation mechanisms that verify the cryptographic integrity and access control properties of updated smart contracts while ensuring that rule changes maintain system security and prevent unauthorized access or manipulation. For example, the smart contract update module 1312 can implement governance rule changes for autonomous vehicle coordination systems where approved modifications to traffic priority processes, emergency response procedures, and intersection management protocols are automatically translated into smart contract code updates that are deployed across the vehicle network infrastructure while maintaining synchronized activation and comprehensive monitoring to ensure that rule changes improve traffic safety and coordination effectiveness without disrupting ongoing transportation operations. In another example, the smart contract update module 1312 can deploy governance rule modifications for distributed energy management systems where approved changes to load balancing processes, demand response mechanisms, and grid stability procedures are automatically implemented through smart contract updates that coordinate deployment across multiple grid management nodes while ensuring integration and continuous monitoring to verify that rule changes enhance energy distribution efficiency and grid reliability. Additionally, the smart contract update module 1312 can execute governance rule updates for collaborative research networks where approved modifications to data access policies, privacy protection mechanisms, and collaboration facilitation procedures are automatically implemented through smart contract code changes that are deployed across participating research institutions while maintaining coordinated activation and comprehensive validation to ensure that rule changes improve research collaboration effectiveness while preserving data privacy and security requirements.

In some implementations, a testing verification module 1314 can validate the effectiveness and operational impact of implemented governance rule changes while implementing comprehensive evaluation protocols that assess rule performance, system stability, and stakeholder satisfaction to ensure successful governance improvements and identify any necessary adjustments or refinements. The testing verification module 1314 can be constructed as a comprehensive validation system that includes automated performance testing engines for rule effectiveness measurement (e.g., operational metric tracking, efficiency assessment, compliance verification, and/or the like), system stability monitoring mechanisms for infrastructure impact evaluation (e.g., resource utilization tracking, error rate monitoring, performance degradation detection, and/or the like), and stakeholder feedback collection systems for user satisfaction assessment (e.g., survey distribution, feedback analysis, satisfaction scoring, and/or the like). The testing verification module 1314 can implement comparison processes that evaluate rule change outcomes against baseline performance metrics while identifying improvements, degradations, and unexpected consequences that require attention or further modification. The testing verification module 1314 can include comprehensive test scenario generation capabilities that create diverse evaluation conditions for rule change validation while implementing automated test execution systems that systematically evaluate rule performance across multiple operational contexts and usage patterns. The testing verification module 1314 can maintain detailed validation reporting systems that document test results, performance comparisons, and stakeholder feedback while providing comprehensive analysis reports for governance review and decision-making processes. The testing verification module 1314 can include continuous monitoring capabilities that track rule change performance over extended periods while implementing trend analysis processes that identify long-term impacts and evolutionary patterns that inform future governance optimization initiatives. The testing verification module 1314 can implement automated validation criteria evaluation systems that determine whether implemented rule changes meet success thresholds and performance objectives while triggering additional modification processes when validation results indicate insufficient improvement or unexpected negative consequences. For example, the testing verification module 1314 can validate governance rule changes in pharmaceutical supply chain systems where modifications to quality control procedures, supplier verification requirements, and distribution tracking mechanisms are systematically tested through comprehensive evaluation protocols that measure compliance improvement rates, processing efficiency gains, and stakeholder satisfaction levels while identifying any operational disruptions or unexpected consequences that require rule refinement or additional modifications to ensure optimal supply chain governance effectiveness. In another example, the testing verification module 1314 can verify governance rule modifications in financial trading systems where changes to risk assessment criteria, transaction approval procedures, and compliance verification mechanisms are thoroughly evaluated through automated testing protocols that assess trading performance improvements, regulatory compliance enhancement, and system stability maintenance while detecting any negative impacts or unintended consequences that necessitate rule adjustments or implementation refinements. Additionally, the testing verification module 1314 can validate governance rule updates in healthcare data sharing networks where modifications to privacy protection policies, access control mechanisms, and collaboration facilitation procedures are comprehensively tested through systematic evaluation processes that measure data security improvement, research collaboration enhancement, and user satisfaction levels while identifying any privacy risks or operational inefficiencies that require rule modifications or implementation adjustments to ensure optimal healthcare data governance performance.

Figure 14:
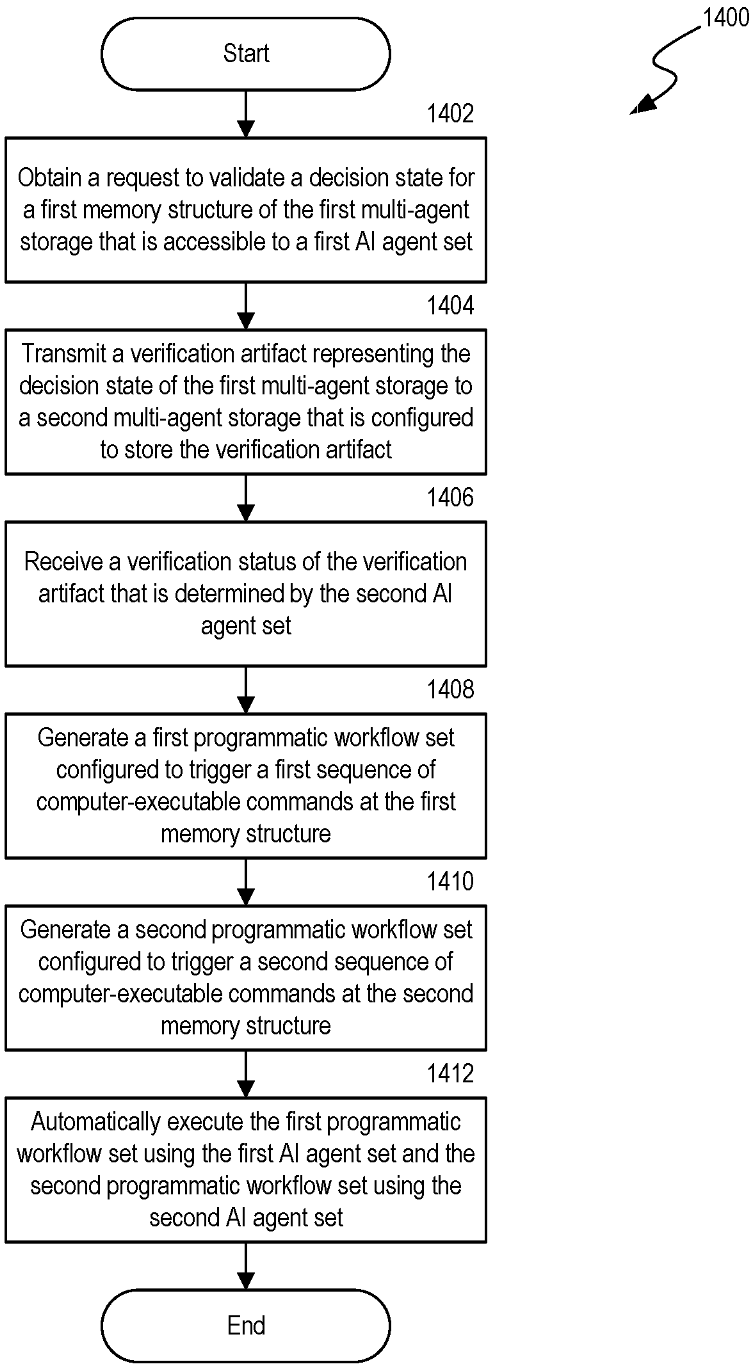
FIG. 14 is a flow diagram that illustrates an example process for privacy-preserving cross-verification of memory storage states, in accordance with some implementations of the disclosed technology.

FIG. 14 is a flow diagram that illustrates an example process 1400 for privacy-preserving cross-verification of memory storage states in accordance with some implementations of the disclosed technology. The process 1400 can be performed by a system (e.g., agent management platform) configured to enable secure validation of decision states across multiple AI agent sets while maintaining operational data privacy and cryptographic verification integrity throughout distributed multi-agent environments. In one example, the system includes at least one hardware processor and at least one non-transitory memory storing instructions, which, when executed by the at least one hardware processor, cause the system to perform the process 1400. In another example, the system includes a non-transitory, computer-readable storage medium comprising instructions recorded thereon, which, when executed by at least one data processor, cause the system to perform the process 1400.

At block 1402, the system can obtain a request to validate a decision state for a first memory structure of a first multi-agent storage that is accessible to a first AI agent set. For example, the system can obtain via the first multi-agent storage the request to validate a decision state that indicates a recorded artifact generated from executing a prior programmatic workflow set via the first AI agent set. In some implementations, the first multi-agent storage can be a first distributed ledger and the second multi-agent storage is a second distributed ledger.

At block 1404, the system can transmit a verification artifact representing the decision state of the first multi-agent storage to a second multi-agent storage that is configured to store the verification artifact. In some implementations, the verification artifact can be generated by applying a transformation operation set on the recorded artifact of the decision state. In some implementations, the second multi-agent storage can comprise a second memory structure accessible to a second AI agent set. In some implementations, the verification artifact can include a zero-knowledge proof generated by the first AI agent set. In some implementations, the zero-knowledge proof can indicate that the decision state for the first memory structure of the first multi-agent storage satisfies an internal operational dataset of the second AI agent set. In some implementations, the verification status can be determined using the zero-knowledge proof. In some implementations, the first AI agent set can comprise a first AI agent subset and a second AI agent subset. In some implementations, the first AI agent subset can comprise AI agents that generate the recorded artifact via executing the prior programmatic workflow set. In some implementations, the second AI agent subset can comprise AI agents that generate the first programmatic workflow set. In some implementations, the transformation operation set can comprise a cryptographic hash function, a keyed hash function, and/or a deterministic encoding function.

At block 1406, the system can receive a verification status of the verification artifact that is determined by the second AI agent set. For example, the system can receive the verification status via the second multi-agent storage. In some implementations, the system can automatically generate a verification record that includes a representation of the verification status for the verification artifact. In some implementations, the system can transmit the verification record to the first multi-agent storage and the second multi-agent storage. In some implementations, the verification record can be stored in associated with respective identifier strings identifying the first AI agent set and the second AI agent set. In some implementations, the verification status can indicate invalidation of the decision state for the first multi-agent storage. In some implementations, the system can transmit a notification message to a predetermined network address indicating the verification status for the verification artifact.

At block 1408, the system can generate a first programmatic workflow set that is configured to trigger a first sequence of computer-executable commands at the first memory structure of the first multi-agent storage. For example, in response to detecting a verification status that indicates validation of the decision state for the first multi-agent storage, the system can use the first AI agent set to generate the first programmatic workflow set. At block 1410, the system can generate a second programmatic workflow set that is configured to trigger a second sequence of computer-executable commands at the second memory structure of the second multi-agent storage. For example, in response to detecting a verification status that indicates validation of the decision state, the system can use the second AI agent set to generate the second programmatic workflow set.

In some implementations, the system can assign a first restriction status on the first memory structure of the first multi-agent storage and a second restriction status on the second memory structure of the second multi-agent storage. For example, prior to execution the first programmatic workflow set and the second programmatic workflow set, the system can assign the first restriction status on the first memory structure and the second restriction status (e.g., separate from the first restriction status) on the second memory structure. In some implementations, the first restriction status can prevent modification to the first memory structure until completion of the first sequence of computer-executable commands. In some implementations, the second restriction status can prevent modification to the second memory structure until completion of the second sequence of computer-executable commands.

At block 1412, the system can automatically execute, or cause execution of, the first programmatic workflow set via the first AI agent set and the second programmatic workflow set via the second AI agent set. In some implementations, the first AI agent set and the second AI agent set can be configured to execute the first programmatic workflow set and the second programmatic workflow set contemporaneously. In some implementations, the first sequence of computer-executable commands of the first programmatic workflow set can comprise at least one first command for transferring machine-readable data from the first multi-agent storage to the second multi-agent storage. In some implementations, the second sequence of computer-executable commands can comprise at least one second command to process the machine-readable data received from the first multi-agent storage. In some implementations, the system can be configured to transmit execution signals to memory structures of external multi-agent storages (e.g., unaffiliated or external blockchains) that cause execution of a specific programmatic workflow using AI agents associated with the external multi-agent storages.

Figure 15:
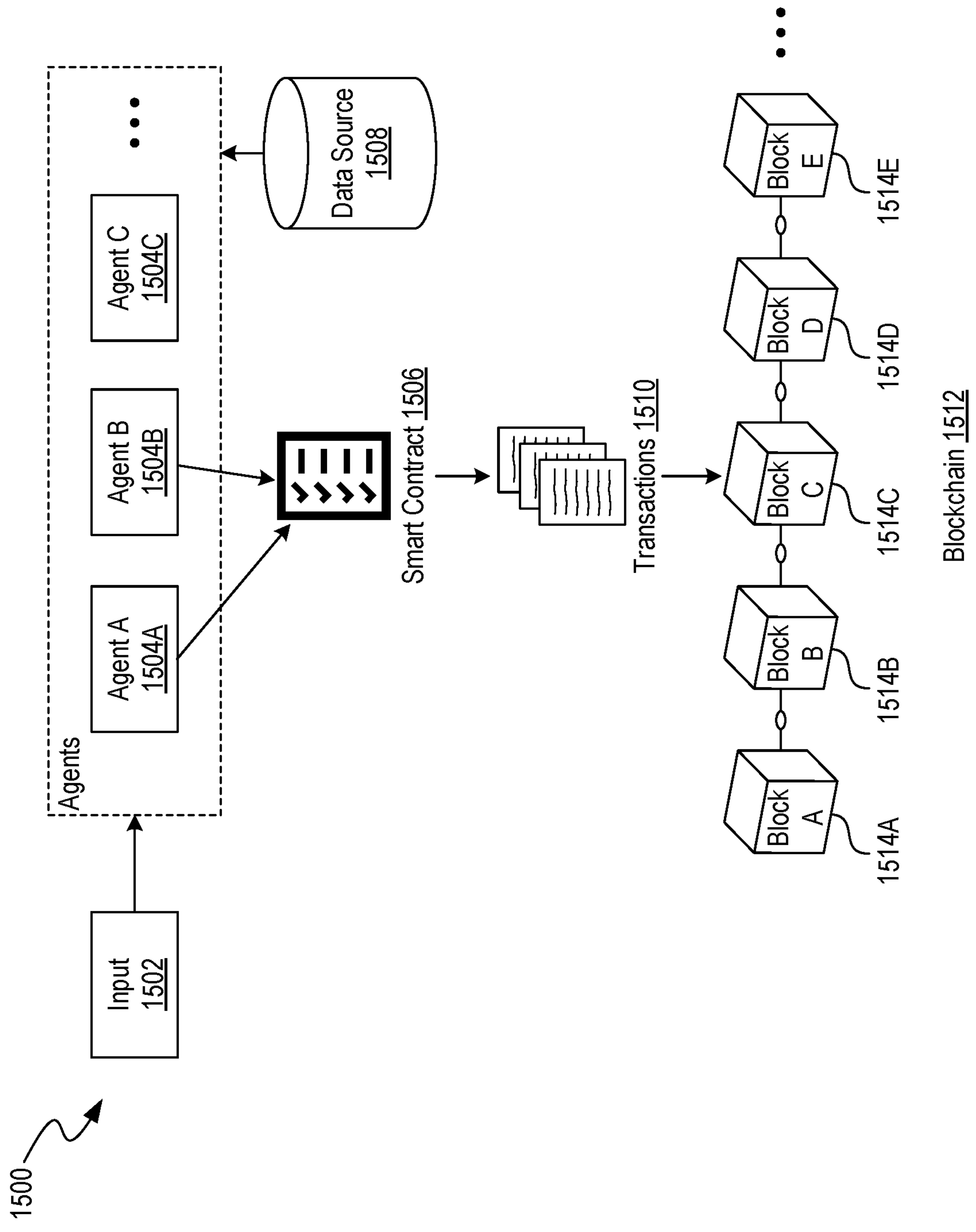
FIG. 15 illustrates an example environment of an agent management platform for automatically generating and executing computer programs using artificial intelligence (AI) models, in accordance with some implementations of the present technology.

Example Implementations of Generating and Executing Computer Programs Between Verified AI Agents FIG. 15 illustrates an example environment 1500 of an agent management platform for automatically generating and executing computer programs using artificial intelligence (AI) models in accordance with some implementations of the present technology. Environment 1500 includes input 1502 to be input into the agents 1504 (e.g., a first agent 1504A, a second agent 1504B, a third agent 1504C), a smart contract 1506 generated by the agents 1504 using a data source 1508, and transactions 1510 to be stored on a blockchain 1512 that includes blocks 1514 (e.g., a first block 1514A, a second block 1514B, a third block 1514C, a fourth block 1514D, a fifth block 1514E). The agents 1504 are the same as or similar to the AI system 2500 illustrated and described in more detail with reference to FIG. 25. The environment 1500 can be implemented using components of example computer system 2600 illustrated and described in more detail with reference to FIG. 26. Likewise, implementations of example environment 1500 can include different and/or additional components or can be connected in different ways.

The input 1502 refers to user inputs, sensory data, structured data, unstructured data, and so forth, and can include a set of instructions to generate an output using the agents 1504. For instance, the input 1502 can include textual data, image data, audio data, video data, multi-modal data, and so forth. For instance, textual data can include documents, emails, chat messages, and/or logs. Image data can include photographs, diagrams, scanned documents, and/or other visual representations. In some implementations, multi-modal data combines two or more data types, such as annotated images, which might include both visual data and text data in the annotations, or videos with corresponding subtitles. In some implementations, the input 1502 includes a link (e.g., a URL) pointing to a knowledge base and/or a website.

The agents 1504 are autonomous (or semiautonomous) software and/or hardware entity that processes the input 1502 and generates a set of actions to fulfill the user's request. For example, a first agent 1504A can perform data cleaning, a second agent 1504B can perform feature extraction, and so forth. In some implementations, the agents 1504 are AI-based and use outputs from AI models (e.g., LLMs) and predefined objectives to autonomously generate and execute actions. The actions can be intended to fulfill specific tasks or requests made by the user, as well as other tasks or requests that are related to or associated with requests made by the user. In some implementations, actions can include tasks such as data retrieval, transaction processing, or system configuration changes. The predefined objectives of the agents 1504 are the specific goals or targets that the agents 1504 aim to achieve when generating the actions. The objectives can be set when constructing the agents 1504 or defined by the user through input parameters. In some implementations, predefined objectives are encoded within the architecture of the agents 1504. For example, when the agents 1504 adopt a neural network architecture, these objectives can weigh the activations of neurons within the network to influence the decision-making process. Certain neurons can be activated to prioritize actions that ensure compliance with specific guidelines or align with specific user preferences.

The agents 1504 can include a series of modules such as a natural language processing (NLP) module to interpret user inputs, a decision-making engine to determine the appropriate actions, and/or an execution module to carry out the actions on hardware or software assets. The agents 1504 can have access to various databases (e.g., knowledge bases) and APIs to retrieve particular information (e.g., domain-specific information, historical data, user preferences, and so forth). Additionally, the agents 1504 can operate in different modes, such as fully autonomous, semiautonomous with human oversight, or in collaboration with other agents. In fully autonomous mode, the agents 1504 can make decisions and execute actions without human intervention, relying entirely on the agents' 1504 programming and/or learned behaviors. Semiautonomous mode incorporates human oversight, allowing for manual review or approval of certain actions (e.g., in high-stakes or sensitive scenarios). The collaborative mode enables the agents 1504 to work in conjunction with other agents (i.e., different agents specializing in different tasks or domains to achieve more complex objectives). For example, the agents 1504 can be a specialized AI model designed for specific tasks, such as a virtual assistant, a chatbot, or an automation bot.

The agents 1504 can automatically generate and/or execute the smart contract 1506 based on the input 1502. The smart contract 1506 refers to a computational workflow (e.g., a series of computer-executable commands, a computer program, or a transaction protocol) that include rules, conditions, and/or execution logic governing the transformation of data within the agent management platform. A smart contract automatically executes, controls or documents events and actions according to the terms of the conditions. The smart contract 1506 can translate variable inputs 1502 into predetermined, executable commands that can subsequently be audited. The computational workflow includes instructions that dictate the operations to be performed, the order in which they should be executed, and the conditions under which certain actions should be triggered. For instance, the rules can specify that if a certain variable meets a particular threshold, a specific computational task will be initiated.

In some implementations, the data source 1508 injects additional context and parameters, in addition to the input 1502, used to generate the smart contract. The data source 1508 can include one or more database systems, external APIs, or real-time/near real-time data feeds to ensure that the smart contracts are according to the up-to-date data. The databases can be structured (e.g., SQL databases) or unstructured (e.g., NoSQL databases). For example, a database can store historical loan repayment data, which can be retrieved to assess a risk profile of a new loan application. External APIs can be used to fetch data from third-party services. These APIs can interface with various external systems to supply real-time or near-real-time data used for the operations of smart contracts. For example, real-time or near real-time data can be used if the conditions of a smart contract 1506 depend on live data. In some implementations, the data source 1508 can be managed by an agent. The agent can selectively transmit data to the agents 1504 to, for example, prevent the dissemination of personal data to certain agents 1504.

The transactions 1510 delineate one or more operations recorded as the smart contract 1506 executes its computational workflow. The transactions 1510 can indicate the occurrence of specific operations, such as data transformations, decision points, or events triggered within the smart contract 1506, that are determined, validated, and/or stored within the blockchain 1512. Each transaction can be associated with metadata that is stored along with the transaction on an immutable ledger such as the blockchain 1512. The metadata can include the timestamp of the transaction, which records the date and/or time the operation occurred, the parties involved in the transaction 1510, the nature of the operation (e.g., specific actions taken or conditions met), parameters or conditions that were applied during the operation, and so forth.

The blockchain 1512 can include a series of blocks 1514. Each block within blockchain 1512 can refer to a repository for one or more transactions 1510. Each block can be cryptographically linked to its predecessor to create a chain of transaction logs. Thus, any attempt to change the data within a block would require altering all subsequent blocks, making tampering computationally infeasible. Each block 1514 can include a block header and a block body. The block header includes metadata about the block 1514 itself, such as a unique identifier (hash) of the block 1514, the hash of the previous block 1514 in the chain, a timestamp providing the creation time of the block 1514, and/or a nonce (e.g., a number that increases sequentially in every attempt to generate a hash). The block body can include the transactions 1510 that have been validated and included in the block 1514. For example, users generate transactions broadcasted to the network. Network nodes (miners or validators) can verify transactions based on set rules and criteria, the validated transactions can be bundled into a new block by a miner or validator. The miner or validator can solve a cryptographic puzzle (proof of work) and/or demonstrate ownership (proof of stake) to add the block. Once verified, the new block can be added to the blockchain 1512, updating the chain across all nodes in the network.

Figure 16A:
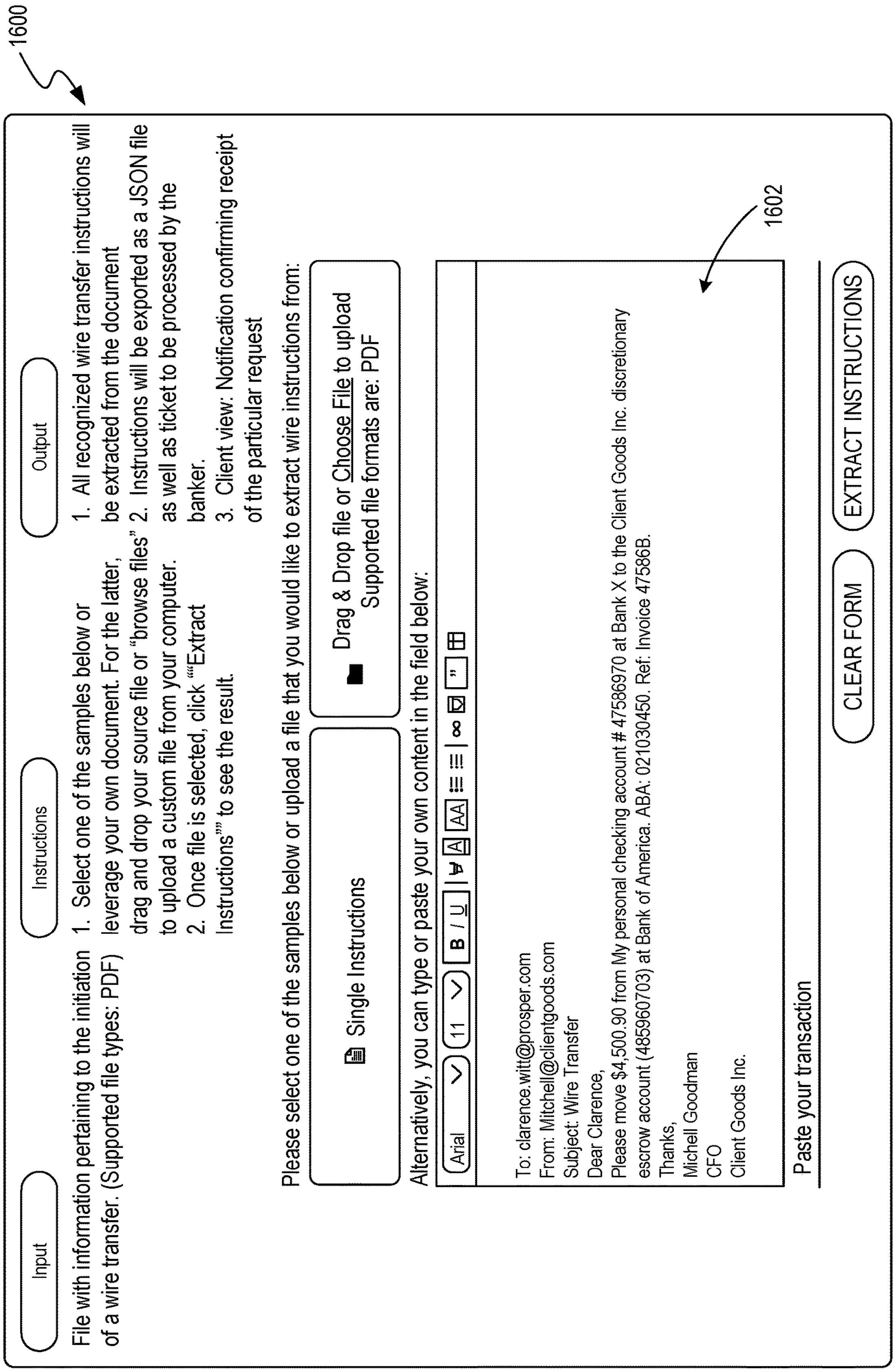
FIG. 16A is a screenshot of a user interface illustrating uploading unstructured data to an agent management platform, in accordance with some implementations of the present technology.

FIGS. 16A-16E illustrate screenshots of a user interface 1600 of the agent management platform. The user interface 1600 can be implemented using components of example computer system 2600 illustrated and described in more detail with reference to FIG. 26. Likewise, implementations of user interface 1600 can include different and/or additional components or can be connected in different ways. FIG. 16A is a screenshot of the user interface 1600 illustrating uploading unstructured data 1602 to an agent management platform in accordance with some implementations of the present technology. The user interface 1600 enables the user to interact with the agent management platform. In the depicted user interface 1600, unstructured data 1602 refers to any data that lacks a predefined data model or organization, such as plain text documents, images, emails, and PDFs. For example, the user can select or upload a file, which can be in formats such as PDF, Word documents, or other formats that do not follow a structured schema. Upon selection, the interface 1600 displays the chosen file to enable the user to review their input before proceeding. The sample wire transfer instruction email provided in FIG. 16A includes a request such as: "Please move $4,2500.90 from My personal savings account at ABCD Bank to my checking account at XYZ Bank, account number 0987654321, routing number 123457890."

Figure 16B:
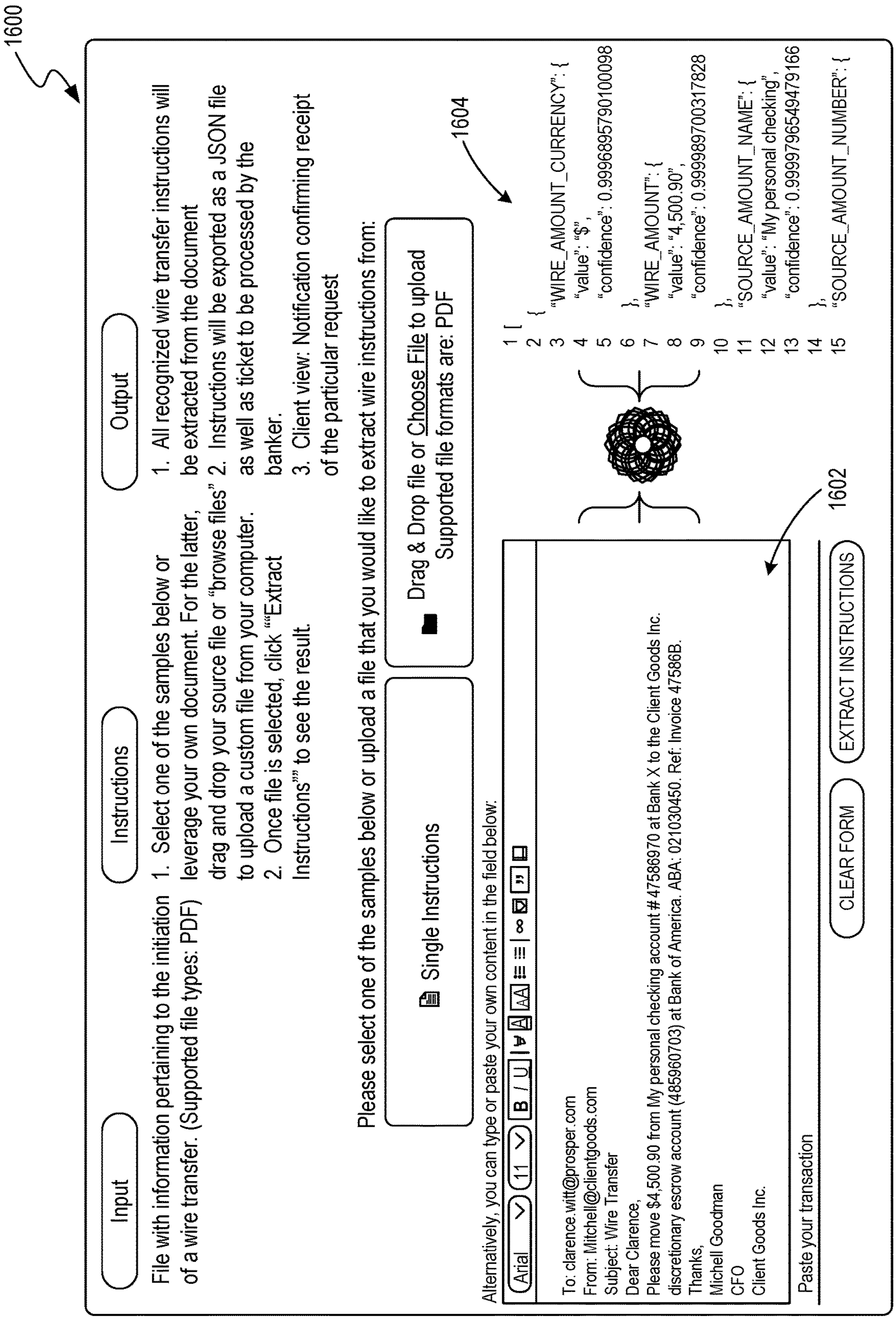
FIG. 16B is a screenshot of the user interface displaying confidence scores of features extracted from the unstructured data that is generated using an agent management platform, in accordance with to some implementations of the present technology.

Upon receiving a user interaction (e.g., clicking the "Extract Instructions" button in FIG. 16A), the agent management platform identifies and extracts features such as wire transfer instructions, text segments, or other information in a structured format. FIG. 16B is a screenshot of the user interface 1600 displaying confidence scores 1604 of features extracted from the unstructured data 1602 that is generated using an agent management platform according to some implementations of the present technology. For example, the user interface 1600 in FIG. 16B illustrates several extracted features such as "WIRE_AMOUNT_CURRENCY," "WIRE_AMOUNT," and "SOURCE_AMOUNT_NAME," along with their corresponding values and confidence scores 1604. The agent management platform generates confidence scores 1604 to indicate a level of certainty regarding the accuracy of the extracted data. The confidence scores 1604 can be numerical values that represent the likelihood that a particular extracted feature is accurate. For example, in FIG. 16B, the "WIRE_AMOUNT_CURRENCY" feature extracted from the unstructured data has a value of "$" with a confidence score of approximately 0.9997, and the "WIRE_AMOUNT" feature has a value of "4,2500.90" with a confidence score close to 0.99999. High confidence scores 1604 (e.g., confidence scores above a predefined threshold) can indicate that there is a high likelihood of the accuracy of the extracted values. Methods of generating the confidence scores 1604 are discussed in further detail with reference to FIG. 27. In some implementations, the user interface 1600 displays the scores alongside the extracted data.

Figure 16C:
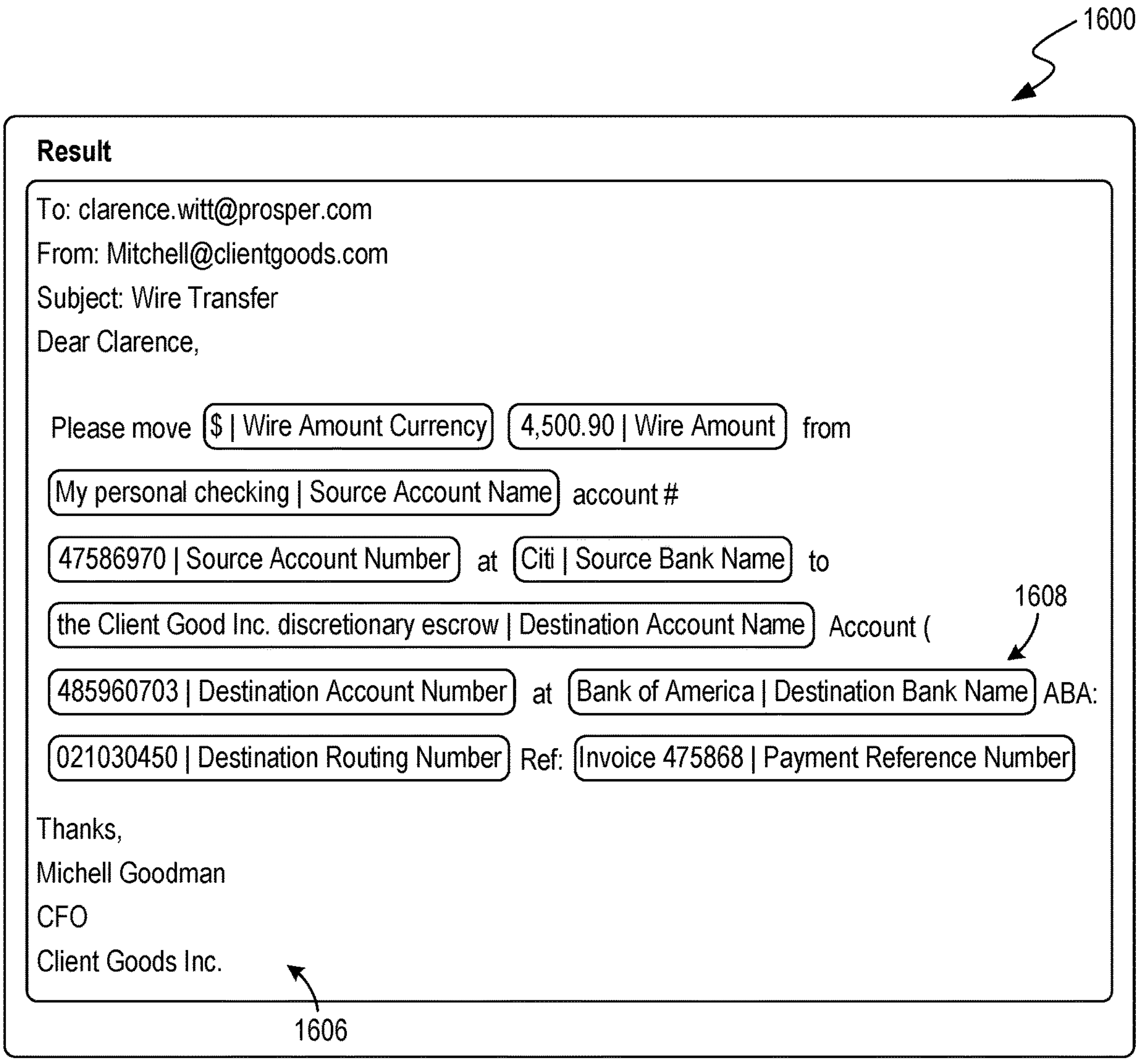
FIG. 16C is a screenshot of the user interface displaying the extracted features, in accordance with some implementations of the present technology.

FIG. 16C is a screenshot of the user interface 1600 displaying a result 1606 including the extracted features 1608 according to some implementations of the present technology. The user interface 1600 in FIG. 16C can display a structured output of the artifact (e.g., wire transfer request) generated by the agent management platform. In FIG. 16C, the extracted features 1608 can include portions of the instructions within the unstructured data 1602, such as "WIRE_AMOUNT_CURRENCY," "WIRE_AMOUNT," "SOURCE_ACCOUNT_NAME," "SOURCE_ACCOUNT_NUMBER," and so forth. The extracted features 1608 can include variables and corresponding values. For example, the extracted currency "$" indicates that the transaction involves United States Dollars. Similarly, "WIRE_AMOUNT" represents the specific amount to be transferred—in the case of FIG. 16C, "4,2500.90." The result 1606 provides the extracted features 1608 in a structured manner.

Figure 16D:
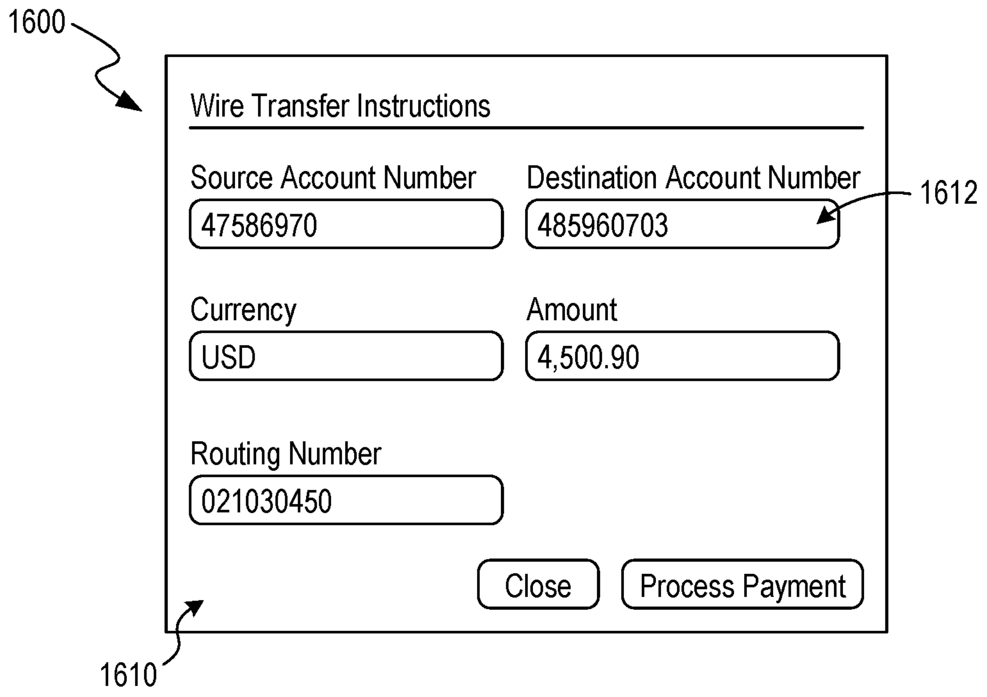
FIG. 16D is a screenshot of a first artifact generated by the agent management platform using complete unstructured data, in accordance with some implementations of the present technology.

FIG. 16D is a screenshot of an artifact 1610 generated by the agent management platform using complete unstructured data 1612 according to some implementations of the present technology. In FIG. 16D, the agent management platform has generated detailed wire transfer instructions, including the source account number, destination account number, currency type, amount to be transferred, and the routing number. In some implementations, the artifact 1610 can be generated by an AI-based agent that is different from the AI-based agent that extracted the features from the unstructured data 1602. The artifact 1610 refers to the structured output generated by the agent management platform from the complete unstructured data 1612. For example, the artifact 1610 displays wire transfer details extracted from the unstructured data, which includes: the source account number (47586970), the destination account number (485960703), the currency (USD), the amount (4,2500.90), and the routing number (021030450). The user interface 1600 can display the artifact 1610 and enable users to modify the artifact 1610 before executing the computational workflow indicated by the artifact (e.g., before submitting the wire transfer request). In some implementations, the agent management platform can use one or more AI models (e.g., an AI-based agent) to automatically execute the computer-executable commands associated with the artifact 1610 (e.g., automatically processing the wire transfer request).

Figure 16E:
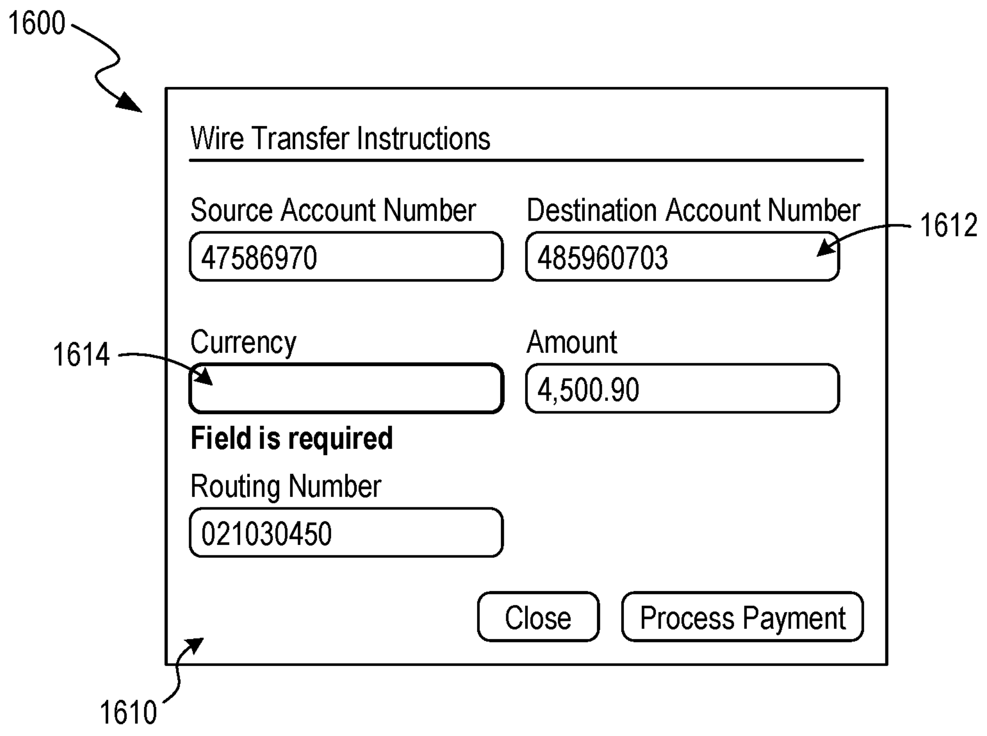
FIG. 16E is a screenshot of a second artifact generated by the agent management platform using incomplete unstructured data, in accordance with some implementations of the present technology.

Before automatically executing the computer-executable commands, the AI-based agent can first validate that the artifact 1610 created by, for example, a different AI-based agent, includes complete information (e.g., validating that the unstructured data 1602 is complete). In some implementations, when the unstructured data 1602 is incomplete, the agent management platform flags and/or alerts the user of the incomplete data. FIG. 16E is a screenshot of the artifact 1610 generated by the agent management platform using incomplete unstructured data 1614 according to some implementations of the present technology. The artifact 1610 displays wire transfer instructions including the source account number (47586970), destination account number (485960703), transfer amount (4,2500.90), and routing number (021030450). However, the currency type field is blank due to the incomplete unstructured data 1614.

Figure 17:
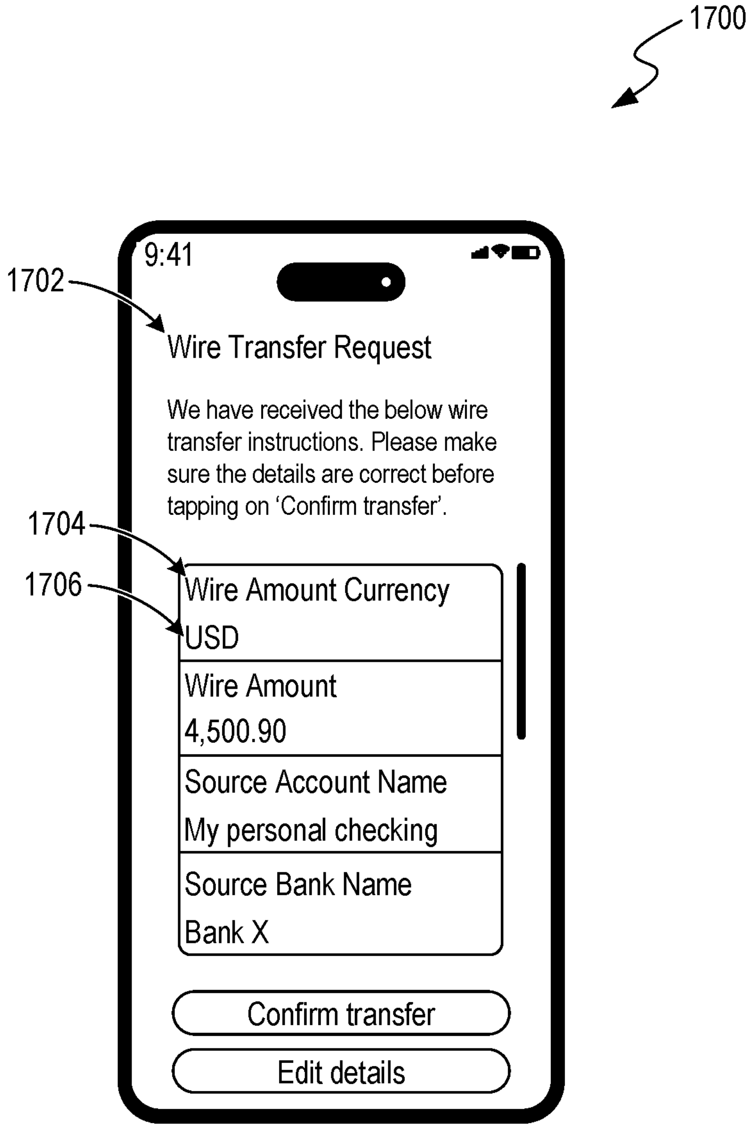
FIG. 17 is a screenshot displaying the artifact generated by the agent management platform on a user interface, in accordance with some implementations of the present technology.

FIG. 17 is a screenshot 1700 displaying the artifact 1702 generated by the agent management platform on a user interface according to some implementations of the present technology. The artifact 1702 can include one or more variables 1704 and corresponding values 1706 extracted from the unstructured data. The screenshot 1700 can be implemented using components of example computer system 2600 illustrated and described in more detail with reference to FIG. 26. Likewise, implementations of the screenshot 1700 can include different and/or additional components or can be connected in different ways.

The screenshot 1700 displays the generated artifact 1702. The artifact 1702 can include the set of variables 1704. Variables 1704 represent the data fields extracted from the unstructured dataset. In the screenshot 1700, the variables 1704 include the currency, amount, source account name, source account number, destination account name, destination account number, and routing number. Each variable can correspond to information used to process the wire transfer. For instance, the variable indicating the currency is denoted as "USD," specifies the currency in which the transfer is to be executed.

Corresponding values 1706 denote the specific data points associated with each variable 1704. Corresponding values 1706 can be extracted from the unstructured dataset and populated into their respective fields within the artifact 1702. For example, the currency variable holds the value "USD," the transfer amount variable holds the value "4,2500.90," the source account name holds the value "My personal checking," and so forth. In some implementations, the agent management platform can display additional metadata such as the confidence reliability or historical usage patterns associated with the extracted variables 1704. Interactive buttons within the interface, such as "Close" and "Process Payment," can enable users to trigger or modify the computational workflow. In some implementations, the agent management platform automatically triggers the computational workflow.

Figure 18:
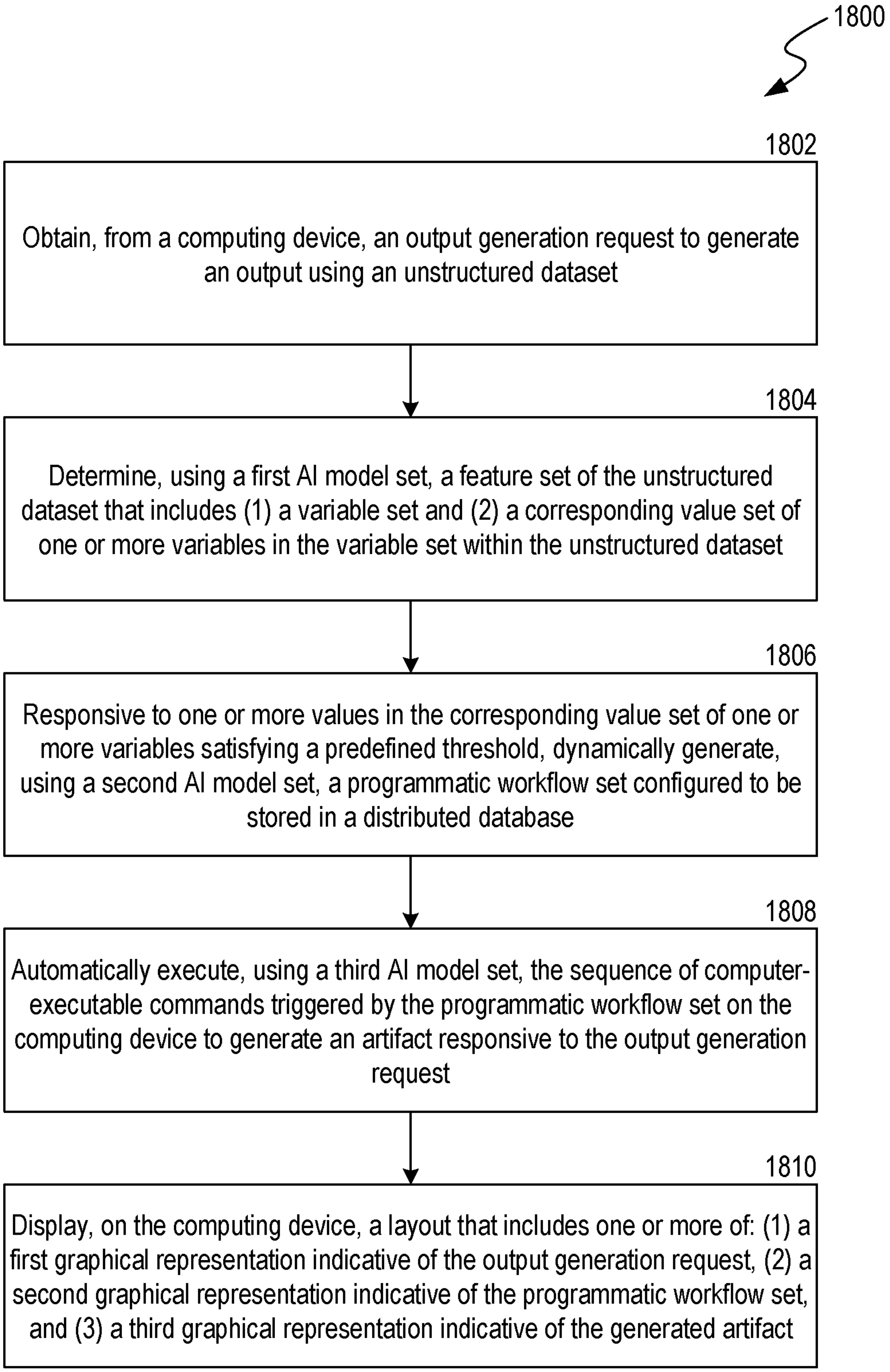
FIG. 18 is a flow diagram illustrating an example process of generating and executing computer programs using an agent management platform, in accordance with some implementations of the present technology.

FIG. 18 is a flow diagram illustrating an example process 1800 of generating and executing computer programs using an agent management platform according to some implementations of the present technology. In some implementations, the process 1800 is performed by a computer system, e.g., example computer system 2600 illustrated and described in more detail with reference to FIG. 26. Implementations can include different and/or additional operations or can perform the operations in different orders.

In operation 1802, the agent management platform obtains (e.g., receives from a graphical user interface (GUI) of a computing device) an output generation request (e.g., a wire request) to generate an output using an unstructured dataset. The requested output can satisfy a guideline set defining an operative boundary set of the output generation request. In some implementations, the agent management platform establishes a communication channel with the GUI of the computing device. For example, the GUI can transmit a request to the agent management platform's server endpoint. The request can include metadata defining the output generation request, such as the type of output required, specific parameters, and/or the dataset to be used.

In operation 1804, the agent management platform determines, using a first AI model set, a feature set of the unstructured dataset that includes a variable set and/or a corresponding value set of each variable in the variable set within the unstructured dataset. For text data, the agent management platform can tokenize the text into words or subwords, and convert these tokens into numerical representations using methods such as word embeddings (e.g., Word2Vec, GloVe) or contextual embeddings (e.g., BERT embeddings). The first AI model set can identify variables such as named entities, parts of speech, and/or syntactic dependencies, and assign corresponding values to the variables based on the context within the text. For example, the agent management platform can identify features (e.g., variables) such as named entities (e.g., people, organizations, locations), parts of speech (e.g., nouns, verbs, adjectives), and syntactic dependencies (e.g., subject, object relationships). For instance, in the sentence "The quick brown fox jumps over the lazy dog," the model identifies "fox" and "dog" as nouns, "jumps" as a verb, and "quick" and "lazy" as adjectives.

For image data, the AI model set can use a model such as a CNN to identify features including edges, textures, shapes, and/or higher-level patterns. The model can identify variables and assign corresponding values to these variables based on the detected features within the images. For instance, in an image of a cat, the model can first detect edges that form the outline of the cat, and then identify textures such as fur, and subsequently identify the overall shape and specific features such as eyes and ears. The model can assign variables such as object classes (e.g., cat, dog), bounding box coordinates (e.g., the position of the cat in the image), and pixel intensities (e.g., color values).

For audio data, the AI model set can convert the raw audio signals into spectrograms or other time-frequency representations. The model can extract features such as pitch (frequency of the sound), timbre (quality of the sound), and/or rhythm (timing patterns). For example, in a piece of music, the model can identify the pitch of each note, the sound characteristics of different instruments, and so forth. Variables such as frequency bands (e.g., low, mid, high frequencies), amplitude levels (e.g., loudness), and temporal patterns (e.g., beats per minute) can be identified and assigned corresponding values.

The agent management platform can generate confidence scores for each feature of the feature set and compare the confidence score to a particular threshold. Each feature included in the feature set can satisfy the particular threshold. In some implementations, confidence scores can be generated (e.g., agents 1504) based on a chatter index, or an indication of the amount of time agent spent communicating with another system. For text data, the agent management platform can use NLP models to assign confidence scores to features such as named entities, parts of speech, and/or syntactic dependencies. For example, if the model identifies "New York" as a location in a sentence, the model generates a confidence score indicating how certain it is that "New York" is a location. The confidence score can be based on the context in which the term appears and calculated by converting the model's raw output into a probabilities that sum to one. The resulting probability for each term indicates the model's confidence in its prediction, with higher probabilities reflecting greater confidence.

For image data, CNNs can be used to assign confidence scores to features such as object classes, bounding box coordinates, and/or pixel intensities. For instance, if the model detects a cat in an image, the model generates a confidence score reflecting the likelihood that the detected object is a cat. The confidence score can be derived from the activation levels of the neurons in the final layers of the CNN, which indicate the model's certainty about the classification. The confidence score can be typically a value between 0 and 1, where higher values indicate greater confidence. For audio data, the agent management platform can use spectrograms to assign confidence scores to features such as pitch, timbre, and/pr rhythm. For example, if the model identifies a specific musical note, the model generates a confidence score indicating how certain it is about the note's pitch. The confidence score can be calculated based on the probability of the feature given the observed data.

Once the confidence scores are generated, the agent management platform can compare each score to a predefined threshold. This threshold can be set based on the desired level of certainty for the features to be considered valid. The agent management platform can iterate through each feature and its corresponding confidence score, checking if the score meets or exceeds the threshold.

Responsive to one or more values in the corresponding value set of each variable satisfying a predefined threshold, in operation 1806, the agent management platform dynamically generates, using a second AI model set (same as or different from the first AI model set), a programmatic workflow set (e.g., a smart contract) configured to be stored in a distributed database (e.g., a blockchain network) by mapping a vector representation of each feature of the feature set to an antecedent set (e.g., conditional statements) representative of the feature, a corresponding programmatic workflow of the programmatic workflow set satisfying the operative boundary set of the guideline set, and/or one or more nodes of the distributed database (e.g., blocks on a blockchain network). For example, the agent management platform can determine that if a loanable value within the output generation request is greater than $10 million, the agent management platform automatically generates additional smart contract code to be executed on the computing device.

The antecedent set can include conditional statements that represent the logical conditions and rules associated with each feature. For example, if the feature is a loanable value, the antecedent set can include conditions such as "if loanable value >$10 million." The agent management platform can use these conditional statements to construct the programmatic workflow. The programmatic workflow can be a sequence of programmatic instructions or code that defines the actions to be taken based on the conditions specified in the antecedent set. In the case of a smart contract, the programmatic workflow can include the logic and rules that govern the execution of the contract. For example, the programmatic workflow can specify that if the loanable value exceeds $10 million, additional clauses or conditions are added to the smart contract.

To ensure that the generated programmatic workflow satisfies the operative boundary set of the guideline set, the agent management platform can cross-reference the workflow with the predefined guidelines. Once the programmatic workflow is generated and validated, the agent management platform can store the programmatic workflow in a distributed database, such as a blockchain network. In some implementations, the corresponding programmatic workflow triggers a sequence of computer-executable commands responsive to satisfying the antecedent set. For example, if the agent management platform determines that a loanable value within the output generation request is greater than $10 million, the agent management platform automatically generates additional smart contract code to handle this condition. This code is stored on the blockchain, where it can be executed by the computing device when the specified conditions are met.

Each node of the one or more nodes can be assigned a unique cryptographic hash by applying a particular hash function on the node. The one or more nodes can each be linked to a corresponding unique cryptographic hash of a different node in the distributed database. The hash function uses the data contained within the node as input to generate a fixed-size string of characters, which is the cryptographic hash. This hash uniquely represents the data in the node, ensuring that changes in the node's data results in a different hash. The agent management platform applies the hash function to the data of each node. The agent management platform links each node to a corresponding unique cryptographic hash of a different node in the distributed database. For example, the agent management platform can link the hash of the previous node in the data of the current node before applying the hash function. For instance, if Node A is followed by Node B, the data of Node B can include the hash of Node A. When the hash function is applied to Node B, it generates a hash that includes the hash of Node A, creating a cryptographic link between the two nodes. Thus, if any data in a node is altered, the hash of that node will change, which will also affect the hashes of all subsequent nodes.

To generate the smart contract based on previous similar contracts, in some implementations, the agent management platform generates a similarity score between the feature set and a plurality of historical feature sets by determining a degree of similarity between vector representations of one or more features within the feature set with vector representations of one or more historical features of the historical feature set. Similarity measures can include cosine similarity, Euclidean distance, or other metrics that quantify how close the vectors are to each other in the high-dimensional space. For example, cosine similarity measures the cosine of the angle between two vectors, with values closer to 1 indicating higher similarity. The agent management platform can generate the programmatic workflow set using a historical programmatic workflow set associated with a historical feature set that has a highest similarity score with the feature set.

In operation 1808, the agent management platform automatically executes, using a third AI model set (same as or different from the first and second AI model sets), the sequence of computer-executable commands triggered by the programmatic workflow set on the computing device to generate an artifact (e.g., a wire transfer ticket) responsive to the output generation request. Each command can be processed in order. As the agent management platform executes each command, the agent management platform can dynamically update the state of the computing device and the data being used.

In operation 1810, the agent management platform displays, on the GUI of the computing device, a graphical layout that includes a first graphical representation indicative of the output generation request, a second graphical representation indicative of the programmatic workflow set, and/or a third graphical representation indicative of the generated artifact. The first, second, and/or third graphical representation can include a preview of the content, such as an embedded PDF viewer, a link, or an image viewer, or can include the entirety of the content.

To keep track of who accessed which data and/or executed which contracts, in some implementations, the agent management platform, responsive to the execution of the sequence of the computer-executable commands, stores an indication of the execution in the distributed database. The indication can be linked to the one or more nodes of the distributed database. The agent management platform can capture information associated with execution (e.g., execution metadata) of the computer-executable commands, such as the identity of the user or system that initiated the execution, the specific commands that were executed, the time and date of execution, data used by the commands, and so forth. Once the execution metadata is collected, the agent management platform can format the metadata into a structured record such as one that includes fields for the information, such as user ID, command details, timestamp, and so forth. The agent management platform can generate a unique identifier for the execution record. The identifier can be a cryptographic hash to ensure the immutability of the execution record, as changes to the metadata would result in a different hash.

The agent management platform can create a new node in the distributed database to store the execution record. The node can include the execution metadata and the generated hash value. The node can be linked to the relevant nodes in the distributed database, such as the nodes representing the data accessed or the contracts executed, by including references to the unique cryptographic hashes of the related nodes within the new node. To store the new node in the distributed database, the agent management platform can initiate a transaction on the blockchain network.

To maintain auditability, in some implementations, each programmatic workflow of the programmatic workflow set is associated with an explanation associated with the antecedent set and/or the sequence of computer-executable commands, a timestamp, and/or a version identifier. The explanation associated with the antecedent set and the sequence of computer-executable commands can be a human-readable description of the logic and conditions associated with the programmatic workflow. For example, if the workflow includes a conditional statement such as "if loanable value >$10 million," the explanation can describe the condition and/or its corresponding consequent. The explanations can be stored as text strings and can be included in the metadata for each workflow.

The agent management platform can record a timestamp for each workflow using the system clock and include the timestamp in the metadata to provide a chronological record of the workflow's history. The agent management platform can assign, in some implementations, a version identifier to each workflow. This identifier can be a unique string or number that distinguishes different versions of the workflow. Each time the workflow is updated or modified, the agent management platform can increment or otherwise modify the version identifier to reflect the changes. The version identifier enables users and auditors to track the evolution of the workflow over time and to reference specific versions when needed. Once the metadata is generated, the agent management platform can associate it with the corresponding programmatic workflow in the structured record. The agent management platform can store the metadata record alongside the workflow in the distributed database.

Figure 19:
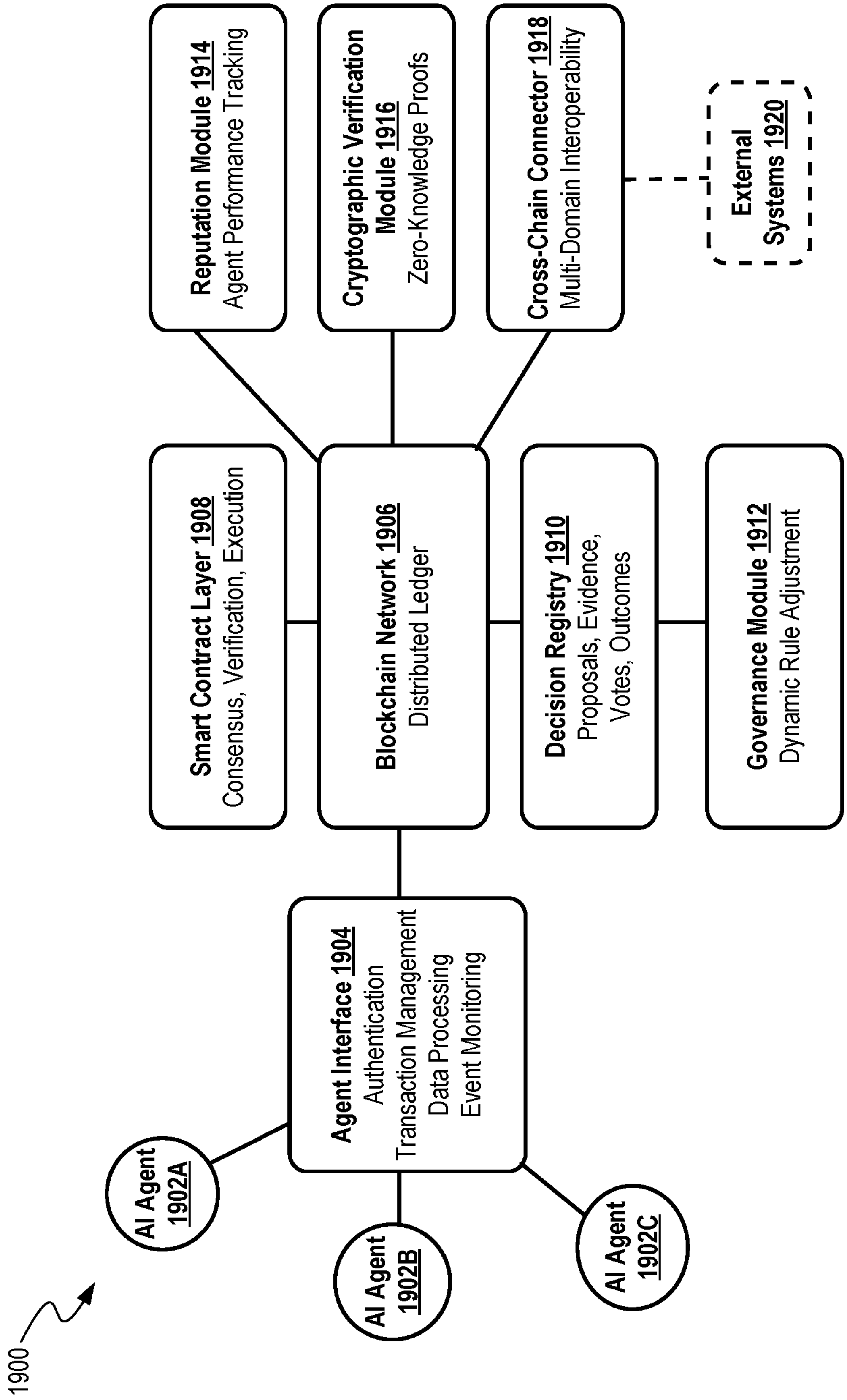
FIG. 19 illustrates an example environment of blockchain-based decision making for AI agent(s) using the agent management platform, in accordance with some implementations of the present technology.

FIG. 19 illustrates an example environment 1900 of blockchain-based decision making for AI agent(s) using the agent management platform in accordance with some implementations of the present technology. Environment 1900 includes AI agents 1902, an agent interface 1904, a blockchain network 1906, a smart contract layer 1908, a decision registry 1910, a governance module 1912, a reputation module 1914, a cryptographic verification module 1916, a cross-chain connector 1918, and external systems 1920. The AI agents 1902 are the same as or similar to the AI system 2500 illustrated and described in more detail with reference to FIG. 25. The environment 1900 can be implemented using components of example computer system 2600 illustrated and described in more detail with reference to FIG. 26. Likewise, implementations of example environment 1900 can include different and/or additional components or can be connected in different ways.

The environment 1900 includes multiple AI agents 1902, such as a first AI agent 1902A, a second AI agent 1902B, a third AI agent 1902C, and so forth. These AI agents 1902 can be specialized for different tasks or domains (i.e., trained on domain-specific data). The AI agents 1902 interact with the system through an agent interface 1904, which provides a standardized communication protocol to manage the agents' interactions with other components of the agent management platform. The agent interface 1904 can include modules to perform, for example, authentication, transaction formatting, data encryption/decryption, and/or communication with other system components. Examples and methods of operating the agent interface 1904 are further discussed with reference to FIG. 20 below.

The blockchain network 1906 refers to a distributed and immutable ledger for recording transactions and decisions. The blockchain network 1906 can use consensus mechanisms such as multiple rounds of communication between nodes to validate transactions, propose new blocks, and/or reach agreement on the state of the ledger. By ensuring that all participating nodes agree on the state of the blockchain, the agent management platform can provide a reliable and tamper-resistant foundation for recording and executing decisions made by the AI agents. In some implementations, the blockchain network 1906 can be implemented as a private, permissioned network to control access and refine the management of AI agent interactions. The smart contract layer 1908 is communicatively connected to the blockchain network 1906 and can include pre-programmed rules and conditions that govern the execution of transactions. The smart contract layer 1908 can include consensus protocols that define voting mechanisms and/or thresholds for different decision types, verification contracts that validate agent credentials and/or contributions, execution contracts that trigger actions based on decision outcomes, and so forth.

Records of decisions made by the AI agents, including proposals, evidence, votes, and/or outcomes can be stored and/or managed by the decision registry 1910. The decision registry 1910, for example, can be structured as a structured database within the blockchain. The governance module 1912 can be used to enforce rules and policies within the agent management platform. In some implementations the governance module 1912 is enabled to dynamically adjust parameters of one or more rules (e.g., smart contracts) based on predefined criteria or collective decisions by the AI agents 1902. To provide reliability and effectiveness of the AI agents, the reputation module 1914 is enabled to track and evaluate the performance and/or assign a degree of reliability to individual AI agents 1902 based on, for example, previous actions and decisions. The reputation scores maintained by the reputation module 1914 can influence the weight given to each agent's input in collective decision-making processes.

To ensure the security of the agent management platform, the cryptographic verification module 1916 can perform one or more cryptographic techniques such as zero-knowledge proofs to verify transactions, agent reasoning, and/or decisions without revealing sensitive information. To facilitate interoperability with other blockchain networks or external systems, the cross-chain connector 1918 enables the exchange of data and execution of transactions across different blockchain networks to expand the capabilities of the agent management platform. The cross-chain connector 1918 can enable interoperability with other blockchain networks for decisions that span multiple domains. The cross-chain connector 1918 can interface with external systems 1920 to enable the integration of external data sources, services, or applications into the decision-making process.

Figure 20:
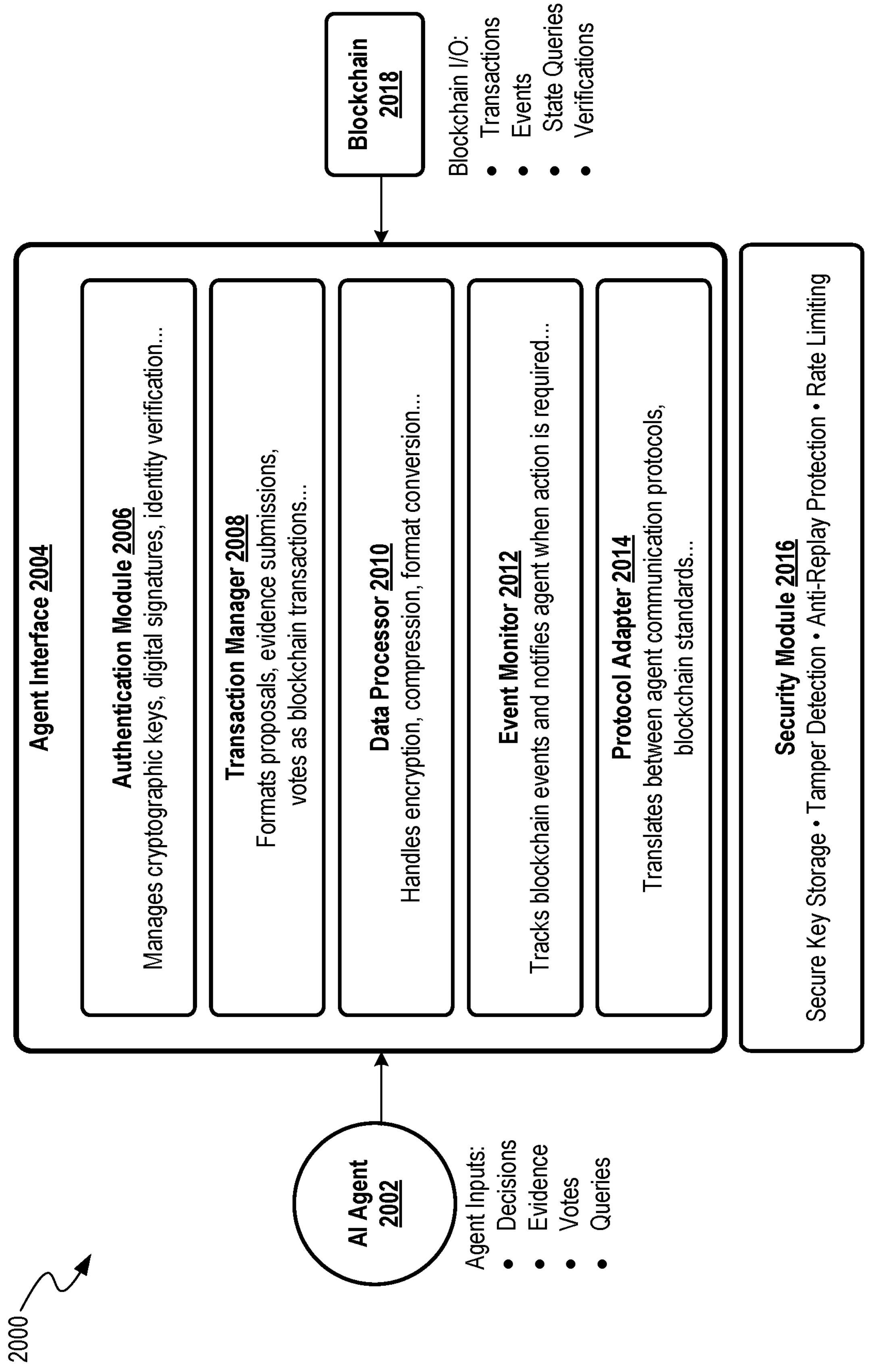
FIG. 20 illustrates an example environment of an interface of an AI agent used within an agent management platform, in accordance with some implementations of the present technology.

FIG. 20 illustrates an example environment 2000 of an interface of an AI agent used within an agent management platform in accordance with some implementations of the present technology. Environment 2000 includes an AI agent 2002 (e.g., the AI agents 1902 in FIG. 19) and an agent interface 2004 (e.g., the agent interface 1904 in FIG. 19) that includes an authentication module 2006, a transaction manager 2008, a data processor 2010, an event monitor 2012, and a protocol adapter 2014. The environment 2000 further includes a security module 2016 and a blockchain 2018. The AI agent 2002 are the same as or similar to the AI system 2500 illustrated and described in more detail with reference to FIG. 25. The environment 2000 can be implemented using components of example computer system 2600 illustrated and described in more detail with reference to FIG. 26. Likewise, implementations of example environment 2000 can include different and/or additional components or can be connected in different ways.

The AI agent 2002 interacts with the blockchain network through the agent interface 2004. When the AI agent 2002 generates a decision, evidence, action, vote, query, and so forth (e.g., based on the agent's internal algorithms, which can include machine learning models, rule-based systems, or other decision-making mechanisms), it can trigger a series of processes within the agent interface 2004 to interact with the blockchain 2018 (e.g., transactions, events, state queries, verifications, and so forth). Within the agent interface 2004, the authentication module 2006 can verify the AI agent's identity and permissions within the agent management platform. The authentication module 2006 can use one or more cryptographic techniques such as digital signatures or multi-factor authentication to ensure that only authorized agents are enabled to participate in the decision-making process. For example, the agent management platform can generate a digital signature using the agent's private key, which can be verified by other participants in the network. In another example, the agent management platform can validate the agent's current status and permissions against a predefined set of criteria implemented on the blockchain.

Once authenticated, the transaction manager 2008 formats the decision or action into a blockchain transaction. The transaction manager 2008 can structure the data according to the specific criteria of the blockchain protocol, such as including metadata, timestamps, and transaction identifiers. In some implementations, the transaction manager 2008 can sequence and prioritize transactions within the blockchain 2018. The data processor 2010 can be used to encrypt, compress, and/or otherwise format the conversion of data exchanged between the AI agent 2002 and the blockchain 2018. In some implementations, the data processor 2010 can use techniques such as zero-knowledge proofs to enable verification of certain properties of the data without revealing the data itself. Throughout the operation of the agent management platform, the event monitor 2012 can track events occurring on the blockchain 2018. The event monitor 2012 can filter blockchain 2018 events and notify the AI agent when action is required or when relevant information becomes available.

The protocol adapter 2014 can be used as a translation layer between the communication protocols used by the AI agent and those used by the blockchain network. The protocol adapter 2014 enables interoperability between different AI systems and blockchain platforms. For example, the protocol adapter 2014 can translate between different data serialization formats, adjust byte orders, or implement any blockchain-specific cryptographic operations used for transaction submission. Before the transaction is submitted to the blockchain 2018, the security module 2016 can apply one or more security measures such as performing an encryption of the transaction payload, implementing anti-replay protection by including nonces or timestamps, applying rate limiting to prevent potential denial-of-service attacks on the blockchain network, and so forth.

Example Implementations of Verifying AI Agents Based on Resource Availability

Figure 21A:
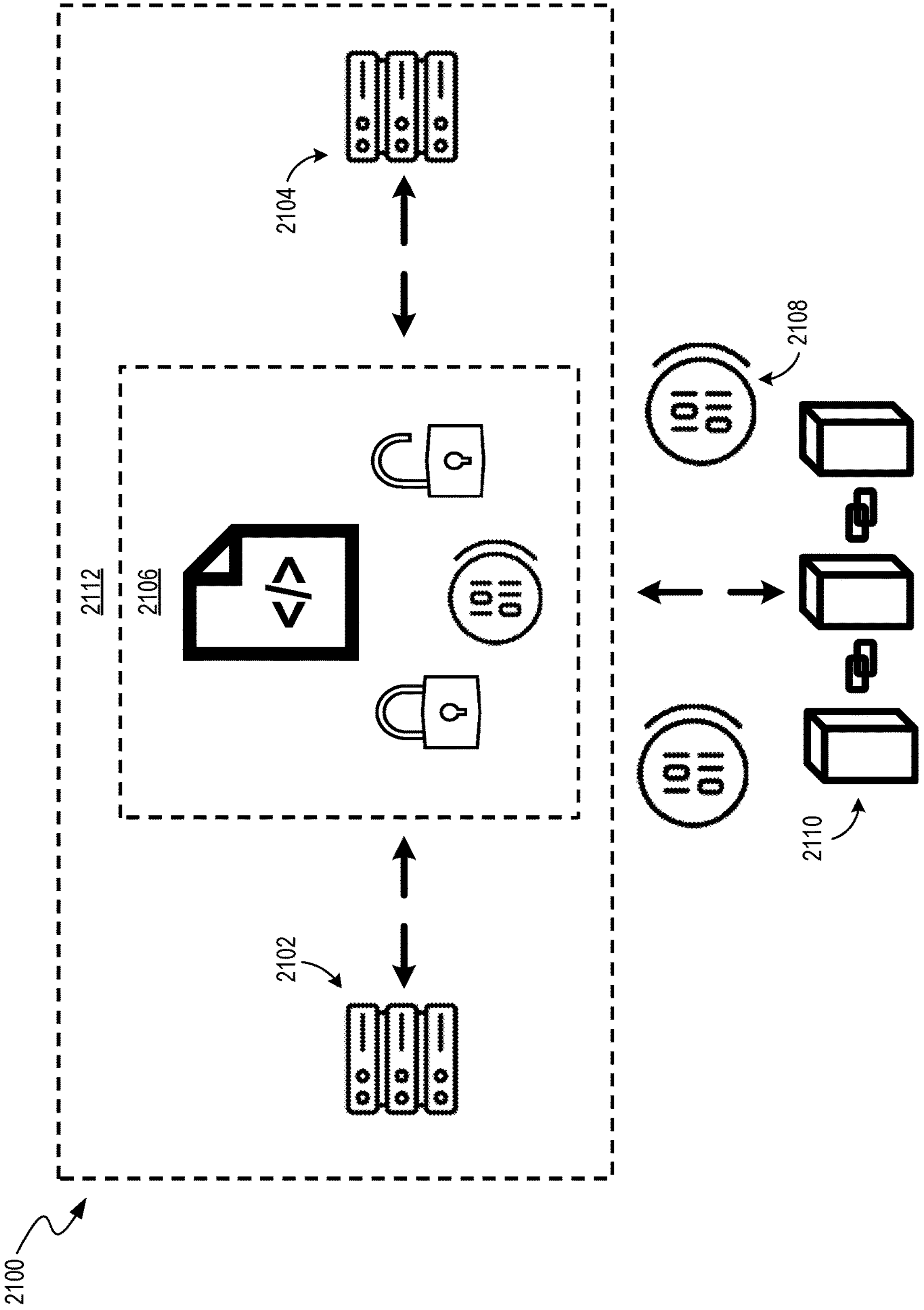
FIGS. 21A-21C show an illustrative diagram for managing resources, in accordance with one or more implementations.
Figure 21B:
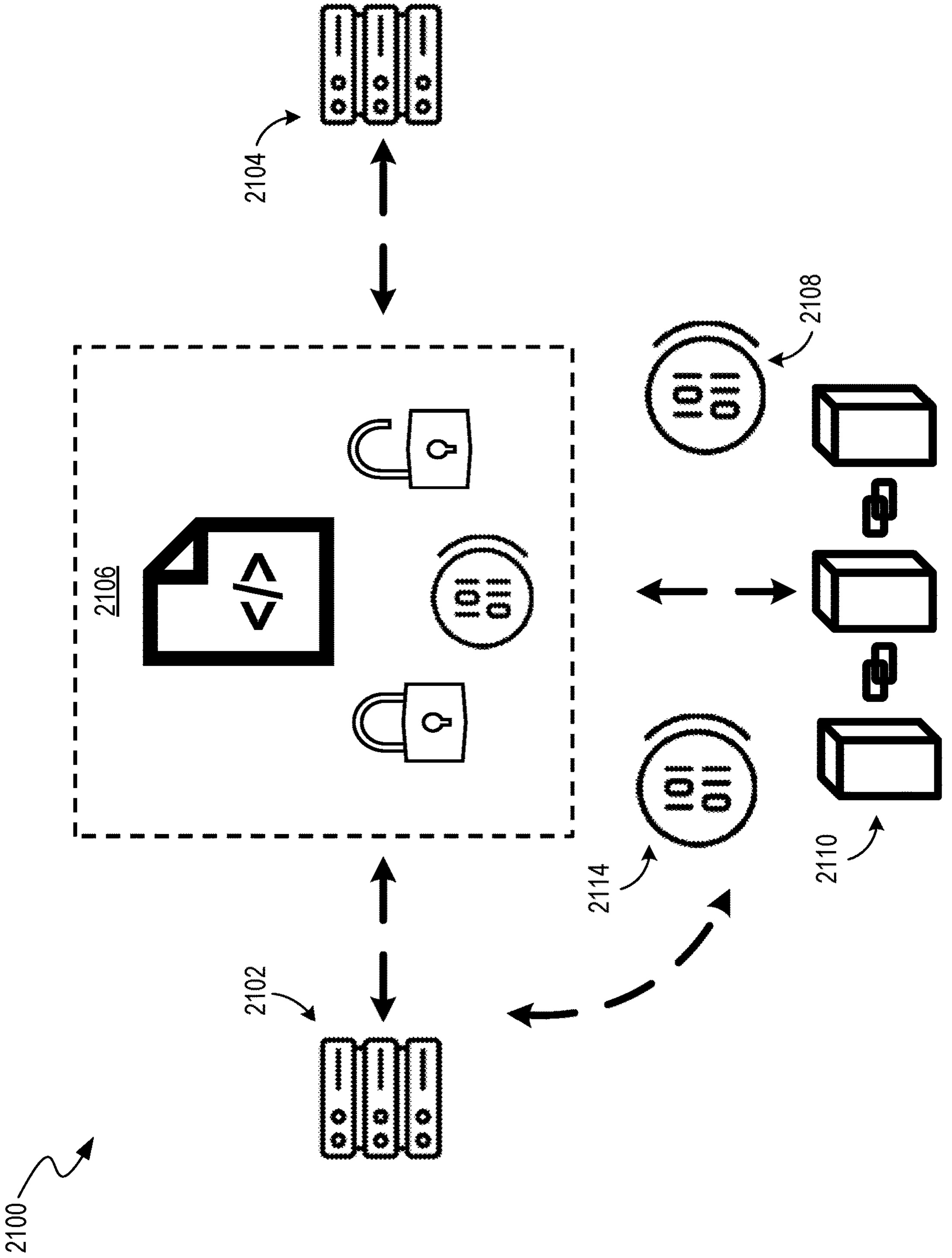
Figure 21C:
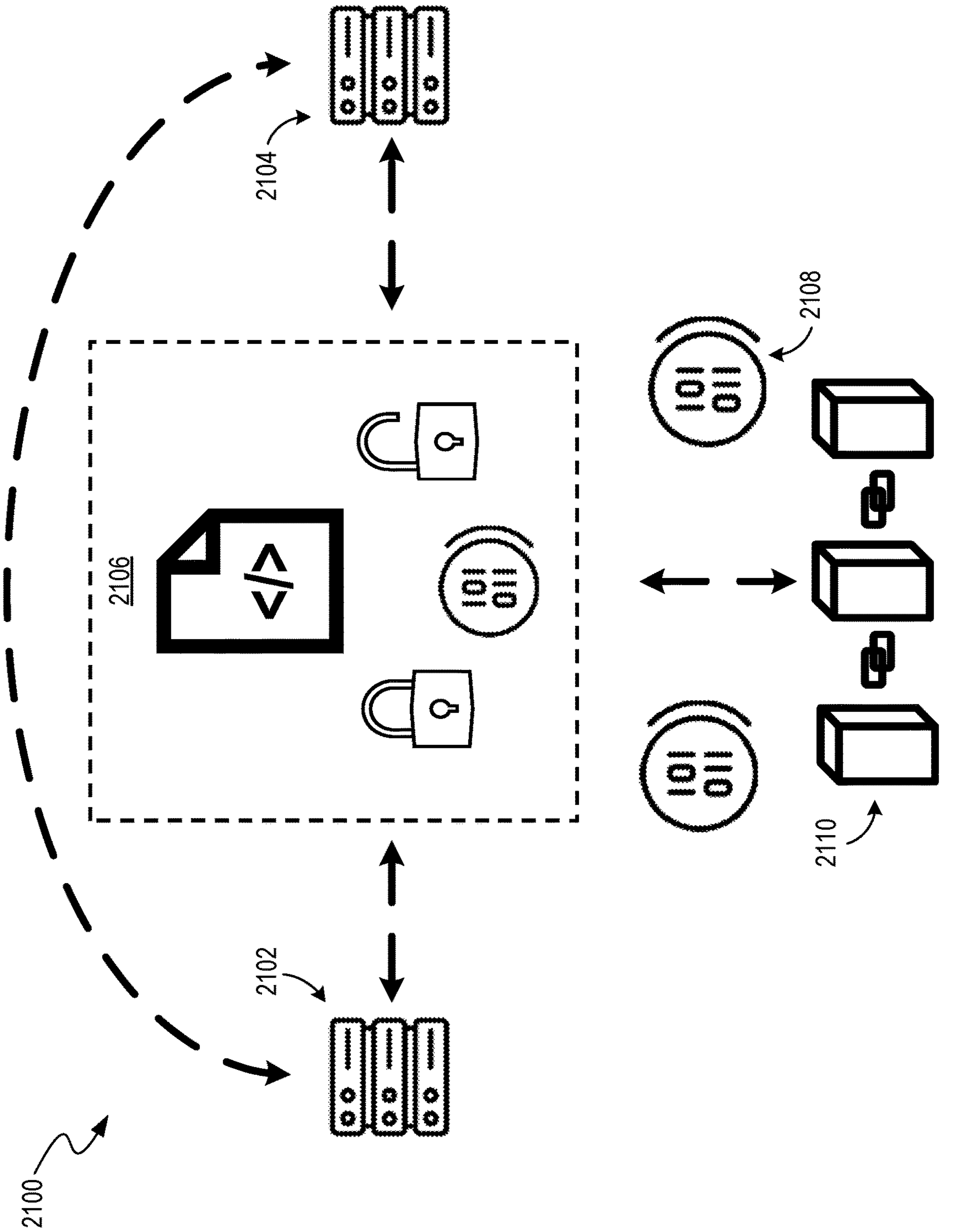

FIGS. 21A-21C show an illustrative diagram for managing resources, in accordance with one or more implementations. FIG. 21A shows an illustrative architecture for managing resources across global or cloud networks, in accordance with one or more implementations. For example, system 2100 includes a network between two resources (e.g., resource 2102 and resource 2104). As described herein, a resource may refer to any entity or component within the network that is made available and accessible for use by network users, applications, or devices. These resources can be hardware devices, software applications, or data that are shared across the network for various purposes. Hardware devices may include physical devices connected to the network that can be shared among multiple users or applications. Examples of hardware resources in a network include printers, scanners, servers, routers, switches, storage devices (like NAS—Network Attached Storage), and other peripheral devices. Software resources may be software applications, programs, or services made available for access and utilization over the network. This could include shared databases, file servers, web servers, email servers, application servers, and any other software-based services accessible to network users. Data resources refer to information or data stored and shared within the network. This could include shared files, documents, databases, multimedia content, and any other data that can be accessed and utilized by authorized users or applications within the network. Network resources are typically made accessible through a process called resource sharing or resource sharing protocols, which allow authorized users or devices to access, use, or modify these resources based on permissions and security configurations set by the network administrators. For instance, in a client-server network model, a server could host resources such as files or applications, and client devices can request access to these resources over the network. Access control mechanisms, such as user authentication and permissions, regulate who can access specific resources and what actions they can perform on those resources.

In some implementations, resources may encompass a wide array of assets, tools, and components that are essential for conducting operations, delivering services, managing finances, and supporting a financial service firm's overall functioning. For example, a resource may comprise financial assets. Financial assets include cash reserves, investments, securities, loans, and other financial instruments held by the firm or managed on behalf of clients. For example, a resource corresponding to a user may comprise a bank account for that user.

In some implementations, a resource may comprise a bank branch or other subdivision of the firm and/or an amount of liquidity for the bank branch or subdivision. For example, when a resource is a bank branch or other subdivision, the resource may go on and/or off-line based on the operating hours (or regulated trading hours) for the bank branch or subdivision. For example, banks and financial institutions often have specific business hours during which their systems and staff are available to process transactions. Outside these hours, certain banking functions, including fund transfers, may not be processed immediately. Some financial regulations or rules may limit or dictate the processing of certain types of transactions or transfers after regular business hours for security, compliance, or fraud prevention purposes. Banks may also risk management measures in place to detect and prevent fraudulent activities. Transactions initiated after hours may be flagged for additional scrutiny to ensure they are legitimate, which could cause delays.

In some implementations, system 2100 may illustrate one or more communications between resource 2102 and resource 2104 as managed by a platform application. For example, a platform application may be used to facilitate one or more blockchain actions (e.g., via self-executing program 2106) to conduct the communications across computer network 2112. In some implementations, blockchain actions may also comprise actions related to a self-executing program (e.g., a smart contract). As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code. In some implementations, the self-executing program may be a program in which rules for execution are written into lines of code that is executed in response to a trigger.

As referred to herein, a computer network may refer to a collection of interconnected computers and other devices that are linked together to share resources, information, and services. These networks can be established using various technologies and configurations, allowing devices to communicate and exchange data with each other. In some implementations, the computer network may comprise a network for a financial services firm.

In some implementations, a computer network (or simply network) may refer to the interconnected system of computers, devices, and infrastructure specifically designed and configured to support the operations and services provided by a financial service firm and/or the financial industry. The network infrastructure may enable the firm to process transactions efficiently and securely. This includes services like online banking, wire transfers, trading platforms for stocks and securities, electronic fund transfers, and other financial transactions. For example, financial firms often require connectivity to various financial markets, exchanges, and data providers. The network infrastructure allows access to real-time market data, trade execution platforms, and connections to external financial systems.

In some implementations, the computer network may comprise a global payment network that facilitate credit and debit card transactions. The network may connect issuing banks, acquiring banks, merchants, and cardholders, enabling electronic payments at point-of-sale terminals and online. In some implementations, the computer network may comprise an ACH (Automated Clearing House). An ACH is a network used for electronic fund transfers and direct deposits in the United States. It enables the processing of large volumes of credit and debit transactions, including payroll deposits, bill payments, and person-to-person transfers. In some implementations, the computer network may comprise a SWIFT (Society for Worldwide Interbank Financial Telecommunication) network. SWIFT is a global messaging network used by financial institutions for secure communication and the transfer of financial messages, particularly for international transactions and cross-border payments. In some implementations, the computer network may comprise a blockchain network.

As described herein, a "platform application" may refer to software or an application that serves as a foundation or infrastructure for developing and deploying other software applications or services. It provides a set of tools, frameworks, and functionalities upon which developers can build, integrate, and run applications. These platforms form the basis for running other software applications. Examples include Windows, macOS, Linux, iOS, and Android. They provide the necessary environment and services for software to execute on devices like computers, smartphones, and tablets.

In some implementations, the platform application may be used to manage the availability of devices in a computer network (e.g., a "platform management application"). This type of platform application is designed to monitor, control, and manage various devices and components within a network to ensure their availability, performance, and security. The platform application may automatically identify and map devices present on the network, including computers, routers, switches, servers, printers, and other network-connected devices. The platform application may constantly monitor the status and performance metrics (such as bandwidth usage, CPU usage, memory, etc.) of network devices to identify any abnormalities or performance bottlenecks. The platform application may generate alerts or notifications when certain predefined thresholds are breached or when anomalies in network behavior are detected. This helps in proactive issue resolution and prevents network downtime. The platform application may allow administrators to centrally manage and update device configurations, ensuring consistency and compliance with network policies and standards. The platform application may monitor the network for security threats, unauthorized access attempts, malware, and other vulnerabilities, providing insights into potential security breaches.

In some implementations, the platform application may comprise a platform application for a financial services firm. A platform application, in the context of a financial services firm or a global bank, typically refers to a software application or system that serves as a foundation or framework for delivering various financial services, managing transactions, facilitating communication, and supporting interactions between different entities within the firm or with external stakeholders such as clients, partners, or regulatory bodies. These platform applications may be designed to integrate multiple functionalities and services within a unified infrastructure. These functionalities and services may encompass various aspects such as banking operations (e.g., day-to-day banking operations including customer onboarding, account management, transaction processing, and compliance), trading (e.g., trading functionalities for various financial instruments like stocks, bonds, derivatives, and currencies), risk management (e.g., risk assessment and management tools to monitor and mitigate risks across different financial activities), Customer Relationship Management (CRM) (e.g., functionalities that manage client interactions, track customer preferences, and personalize services), data analytics and reporting (e.g., capabilities that derive insights from large volumes of financial data), compliance and regulatory requirements (e.g., features to ensure compliance with various financial regulations and standards), mobile and online banking (e.g., mobile applications and online banking portals).

In some implementations, the system receives the first request may comprise receiving, at a platform management application, a user request to perform a first off-chain action. The system may then determine that the first blockchain action corresponds to first off-chain action. For example, a user may initiate a request for a specific action that needs to be performed off-chain. This request could come through a user interface, API call, or any other user interaction method supported by the platform. The user request is received by the system and routed to a platform management application that serves as the central control or coordination point for managing various actions within the system. The platform management application analyzes the received user request and identifies the nature of the action requested. It parses and understands the details of the requested off-chain action, such as its purpose, parameters, and requirements. The system, through its logic or predefined mapping rules, identifies that the requested off-chain action has a corresponding action or operation that needs to be executed on the blockchain. This mapping could be based on predetermined correlations between off-chain and on-chain actions within the system's architecture or business logic.

The platform management application may validate the user request, ensuring it meets necessary criteria, security checks, and any required authorizations before proceeding further. Upon recognizing the corresponding blockchain action linked to the off-chain request, the system prepares the necessary data, parameters, or transaction details (e.g., other resources involved in the blockchain action) required to execute the corresponding action on the blockchain. For example, the system may receive a first user request to perform a first off-chain action determining that the first blockchain action corresponds to a second resource (e.g., a transaction from a first resource to a second resource).

Using appropriate mechanisms or interfaces (e.g., one or more self-executing programs, APIs, etc.), the platform management application triggers the execution of the determined blockchain action that aligns with the requested off-chain action. The prepared blockchain action is broadcasted to the blockchain network, initiating the process of validating, processing, and confirming the action by network nodes or validators. Validators in the blockchain network process the transaction, execute the action according to the defined logic, and include the validated transaction in a block. Once confirmed and added to the blockchain, the action is considered completed on-chain. The platform management application updates the status of the user request, providing feedback or notifications to the user about the successful execution of the requested action, whether it is off-chain or on-chain.

System 2100 (e.g., using a platform application) may facilitate the performance of an off-chain action. As described herein, an "off-chain action" may refer to any activity or transaction that occurs outside the underlying blockchain network or protocol. Off-chain actions can take various forms, including off-chain transactions. These are transactions that occur outside the main blockchain network. They are conducted through secondary layers or channels and are settled or reconciled on-chain later. This helps in reducing congestion on the main chain and lowering transaction fees. Off-chain actions may also comprise off-chain computations. For example, complex computations or operations that are computationally expensive can be performed off-chain. For instance, certain computations or processes needed to support a decentralized application (DApp) might be handled off-chain to improve performance and reduce latency, with only the final outcome or necessary data being recorded on the blockchain.

For example, in the context of blockchain technology, on-chain data and assets are those that are recorded and stored directly on the blockchain. In contrast, off-chain data or assets are not directly stored on the blockchain but are instead managed off the blockchain. For example, off-chain data may be information that is not stored on the blockchain but is referenced or linked to it. This could include data stored in traditional databases, external files, or other systems. Off-chain assets may be assets that are represented or exist in the physical world or in other systems, but their ownership or status is tracked and managed on the blockchain. This could include real-world assets like real estate, commodities, or even digital assets that are not stored directly on the blockchain.

In some implementations, off-chain actions may also comprise state channels, rollups, and/or sidechains. For example, these are off-chain scaling solutions that enable parties to conduct transactions or execute self-executing programs off the main chain. State channels allow participants to interact directly with each other off-chain, updating the state between them, while sidechains are separate blockchains that can be connected to the main blockchain, facilitating faster and more scalable transactions. In the context of blockchain and cryptocurrency, a "rollup" may be a layer 2 scaling solution. It is designed to improve the efficiency and scalability of blockchain networks. Rollups work by processing and bundling multiple transactions off-chain, and then submitting a single transaction to the main blockchain. This helps reduce congestion and lower transaction costs.

In some implementations, off-chain actions may also comprise usage of off-chain data storage. For example, storing large amounts of data directly on a blockchain can be inefficient and costly. Off-chain data storage solutions, such as decentralized storage networks (e.g., IPFS, Filecoin), enable the storage of data off-chain while maintaining references or proofs of the data's existence or integrity on the blockchain.

In some implementations, an off-chain action (or result thereof) may refer to any data, information, or transactional details that are stored, processed, or maintained outside of the primary blockchain network. In blockchain technology, off-chain records exist separately from the main distributed ledger or blockchain itself. For example, an off-chain record may comprise a user bank account and/or other account linked to a user and/or other entity.

To facilitate the off-chain action, system 2100 may use one or more on-chain actions related to network 2110. Network 2110 may comprise a blockchain. As described herein, a blockchain is a decentralized ledger of transactions built upon a combination of cryptography techniques (e.g., secret-keys, hash functions, etc.), consensus mechanisms (e.g., Proof of Work, Proof of Stake, etc.), and computer networks (e.g., peer-to-peer ("P2P") networks, the Internet, etc.). The blockchain stores information electronically, grouped together into a series of subsets of the information, called "blocks." The information may be maintained by a network of computers using cryptography and consensus mechanisms, which make the practically impossible to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the immutability of the records, the public availability of the information in the blockchain, and the reliance on consensus mechanisms for adding new blocks, the blockchain does not require a central authority to monitor transactions, maintain records, and/or enforce rules. As such, blockchains and blockchain technology has become a foundation of many decentralized applications.

For example, network 2110 may comprise a digital log. A digital log may comprise a record or file that captures and stores a chronological sequence of events, actions, or transactions in a digital format. These logs serve various purposes across different domains, including information technology, cybersecurity, finance, and more. Digital logs may maintain a time-sequenced record of activities, events, or changes. Each entry in the log file typically includes a timestamp indicating when the event occurred. The digital log may contain specific details about the events or actions being logged. This information could include user activities, system events, errors, security-related events, transactions, or changes in configurations. Digital logs can be stored in various formats, including text files, structured databases, JSON, XML, or other formats that suit the specific requirements of the system or application generating the logs. The digital logs may be used for diagnosing issues, troubleshooting problems, monitoring system performance, conducting forensic analysis, and auditing activities. They serve as a historical record for understanding past actions or incidents.

In some implementations, the digital log may comprise a distributed ledger (e.g., for a blockchain) and/or other index of blockchain data. For example, the distributed ledger may be a type of database or digital ledger that exists across multiple locations or nodes within a decentralized network. It records transactions, contracts, or any form of data in a secure, transparent, and tamper-evident manner without the need for a central authority or intermediary. Unlike traditional centralized ledgers, distributed ledgers are not controlled by a single entity. Instead, they are distributed among multiple participants or nodes in a network, each maintaining an identical copy of the ledger. This decentralization increases transparency and resiliency by eliminating a single point of control or failure. Distributed Ledgers use consensus mechanisms among network participants to validate and agree upon the state of the ledger. Consensus protocols ensure that all copies of the ledger across the network are in sync and agree on the validity of transactions, maintaining a consistent record of data. Once information is added to the ledger, it becomes virtually immutable, meaning it cannot be altered or deleted retroactively without consensus from the network. The use of cryptographic techniques ensures the security and integrity of the data stored on the ledger.

Network 2110 may be used by system 2100 to manage and/or facilitate one or more cryptographically secure digital assets (e.g., asset 2108). A cryptographically secure digital asset may comprise a tokenization of a value or asset (e.g., a tokenized bank deposit). For example, a cryptographically secure digital asset refers to a digital representation of value, ownership, and/or rights that is secured by cryptographic techniques, ensuring its integrity, authenticity, and/or protection against unauthorized access or modification. These assets exist in digital form and rely on cryptographic protocols and technologies for their security and verification. For example, the asset's security may be based on cryptographic algorithms and techniques that provide strong encryption, hashing, digital signatures, and other cryptographic mechanisms to protect its data and transactions. The cryptographically secure digital assets may operate on blockchain networks. Blockchains use decentralized and distributed ledger technology, ensuring tamper-proof records of transactions and asset ownership. Transactions involving these assets are recorded on a blockchain, creating an immutable and transparent history of ownership and transactional history. Once recorded, data on the blockchain cannot be altered retroactively without consensus from the network. Cryptographically secure digital assets allow ownership and transfer of value or rights in a decentralized manner. Users can securely transfer ownership or conduct transactions directly without relying on intermediaries. Users may access and manage these assets using cryptographic keys. Public and private keys allow users to securely interact with the assets, sign transactions, and prove ownership without revealing sensitive information.

Network 2110 may be used to facilitate communications (e.g., blockchain actions) irrespective of whether a resource is on-line. For example, a resource in a network may be "online," whether it is a device, service, and/or application, when it is currently connected and available for communication and interaction within the network. In contrast, a resource may be off-line when it is not on-line. For example, the term "online" signifies that the resource is active, operational, and accessible to other devices or users in the network. Being online implies that the resource is powered on, connected to the network infrastructure (such as the internet or a local network), and ready to send, receive, or process data, requests, or commands.

For example, a computer, server, printer, or any network-connected device is considered online when it is powered up, connected to the network (via Ethernet or Wi-Fi), and ready to send and receive data. In another example, applications, websites, or cloud-based services may be online when their servers are operational, connected to the internet, and available for users to access or utilize their functionalities. In yet another example, being online indicates that the resource is reachable and responsive to requests or communication attempts from other devices or users on the network. For example, in implementations, in which the resource is a bank account, bank branch, etc. the resource may be on-line when the resource (or assets held by the resource) are reachable and responsive to requests or communication attempts from other devices or users on the network.

In some implementations, system 2100 may be used to manage resources across network 2110. For example, system 2100 may manage resources based on the availability of resources in network 2110. In some implementations, availability may comprise resource availability. Resource availability in a computer network may refer to the accessibility and readiness of various network resources, devices, services, or applications for use by authorized users or other components within the network. It signifies the ability of these resources to fulfill requests, process data, or perform tasks effectively and efficiently when required. For example, availability may correspond to device accessibility (e.g., the ability of devices (such as computers, servers, routers, switches, printers, etc.) to be reachable and responsive on the network), service uptime (e.g., time services remain operational and responsive to user requests), bandwidth and performance (e.g., resources promptly accessing and/or delivering data or services efficiently without delays or bottlenecks), data and information access (e.g., availability of data resources, databases, files, and information required by users or applications within the network).

In some implementations, availability may correspond to liquidity. Liquidity refers to the ability of a bank or financial institution to meet its short-term obligations and fund its day-to-day operations efficiently. It represents the availability of liquid assets that can be quickly converted into cash to cover liabilities, withdrawals, or unexpected demands for funds. Banks maintain liquidity primarily through liquid assets such as cash, reserves held at central banks, short-term government securities, highly marketable securities, and other instruments that can be easily sold or converted into cash without significant loss of value. Banks may engage in asset-liability management to balance their assets and liabilities, ensuring that they have sufficient liquid assets to cover liabilities and maintain a healthy liquidity position. For example, a tokenized availability of a resource may correspond to assets available at a given resource (e.g., a digital account). The transfer of this may correspond to the assets being transferred from one resource to another.

In some implementations, the system may determine one or more characteristics of availability in one or more resources. The system may then select a cryptographically secure digital asset, from a plurality of cryptographically secure digital assets, based on the characteristics. For example, the system (or self-executing program) may determine a condition for performing the first blockchain action and select a first cryptographically secure digital asset, from a plurality of cryptographically secure digital assets, based on the condition. For example, the condition may indicate a requirement for a cryptographically secure digital asset as recorded in a predetermined digital log corresponding to the first resource. For example, the self-executing program condition may determine a requirement for a first cryptographically secure digital asset, as recorded in a predetermined digital log corresponding to a resource, involves encoding specific criteria or rules within the self-executing program's code to validate the possession or existence of the digital asset before executing certain actions or operations. For example, developers encode conditions within the self-executing program's code using a programming language suitable for self-executing programs (e.g., Solidity for Ethereum). These conditions define the rules or requirements that need to be met regarding the possession or existence of the cryptographically secure digital asset. The self-executing program may interact with a predetermined digital log or ledger that records information related to resources. The condition within the program may check this log to verify the presence or ownership of the specific digital asset corresponding to the resource. The condition may specify requirements such as verifying the ownership of the digital asset through cryptographic keys, checking the asset's unique identifier or token ID, validating a specific transaction or event recorded in the digital log related to the asset, or confirming its existence in a specific state. When a user initiates an action or transaction involving the resource within the self-executing program, the condition is evaluated. If the condition verifies the possession or existence of the required cryptographically secure digital asset in the predetermined digital log, the self-executing program proceeds with the intended operation or execution.

As described herein, a characteristic of availability may comprise any attribute that distinguishes the availability (or availability on a resource) from other availability (or availability on another resource). In some implementations, characteristics of availability in resources within a computer network may refer to attributes or factors that define the accessibility, reliability, and continuity of these resources. For example, in implementations describing the transfer of availability, the availability may be transferred by a change (or transfer) of a characteristic of the availability being transferred.

For example, a characteristic may refer to uptime and reliability as availability is associated with the ability of resources to remain operational and accessible over time without unexpected interruptions. High availability implies minimal downtime and consistent reliability. In another example, a characteristic may refer to accessibility. Available resources should be easily accessible and reachable by users or systems when needed. This includes factors such as network connectivity, response time, and the absence of barriers preventing access. In another example, a characteristic may refer to redundancy and fault tolerance. Systems designed with redundancy have backup mechanisms or duplicate resources to ensure continuous operation even if one component fails. Fault-tolerant systems can detect and recover from failures without significant impact on availability. In another example, a characteristic may refer to resilience to failures. Availability may be linked to a system's resilience against failures caused by hardware malfunctions, software errors, network issues, or other disruptions. Systems designed for high availability can withstand failures and maintain functionality. In another example, a characteristic may refer to scalability and capacity planning. Availability considerations involve the ability to scale resources to meet increasing demand without compromising performance or accessibility. Proper capacity planning ensures resources are available as needed. In another example, a characteristic may refer to monitoring and maintenance. Continuous monitoring, proactive maintenance, and timely interventions play a crucial role in ensuring resource availability. Monitoring tools help detect issues early, allowing for prompt resolution and minimizing downtime. In another example, a characteristic may refer to recovery and disaster preparedness. Availability includes having recovery strategies and disaster preparedness plans in place. These plans help restore services quickly after unexpected events, such as natural disasters or cyber-attacks. In another example, a characteristic may refer to service level agreements (SLAs) characteristics. Defining and adhering to SLAs regarding availability metrics, such as uptime percentage, response time, and maintenance windows, is essential in ensuring commitments to users or customers.

In another example, a characteristic may refer to geographical distribution and load balancing. Distribution of resources across multiple geographical locations and load balancing techniques contribute to availability by ensuring even distribution of workload and minimizing the impact of localized disruptions. In another example, a characteristic may refer to security measures. Availability is linked to security practices that protect resources from unauthorized access, cyber threats, or malicious attacks. Security measures prevent service disruptions caused by security breaches. In another example, a characteristic may refer to documentation and recovery procedures. Maintaining comprehensive documentation and well-defined recovery procedures helps restore services efficiently in case of outages or failures, minimizing the impact on availability.

In some implementations, a characteristic of availability may refer to a characteristic of a good, service, and/or medium of exchange (e.g., money). The characteristics of currency, which is issued by governments and central banks. For example, a characteristic may refer to an issuing authority (e.g., a recognized government or central monetary authority within a country), legal tender (e.g., whether it is authorized by the government for settling debts, transactions, and payments within the country's borders), denomination and/or amount, physical form (e.g., banknotes and coins), type (e.g., fiat, commodity-backed), security features, exchange rate, stability, regulation, etc.

Selecting a cryptographically secure digital asset from a plurality of such assets based on characteristics involves a process that considers various attributes or features associated with these assets. The system may identify the specific characteristics or attributes that are essential for the system's purpose or requirements. These criteria could include factors such as security features, transaction speed, scalability, decentralization, consensus mechanism, token standard (e.g., ERC-20, ERC-721), utility, or network adoption. The system may obtain information and data about the plurality of cryptographically secure digital assets under consideration. This information may include technical specifications, whitepapers, historical performance, market data, developer community, security audits, and use case relevance. The system may evaluate and compare the characteristics of each digital asset against the predefined selection criteria. Assess how well each asset aligns with the system's requirements, considering factors like security, functionality, transaction costs, liquidity, governance, or regulatory compliance. The system may apply a weighted scoring system or ranking mechanism to assign importance or priority to different characteristics based on their relevance to the system's goals. For example, security might have higher weightage compared to transaction speed. The system may conduct both quantitative analysis (e.g., metrics, performance data) and qualitative analysis (e.g., community support, development activity) to comprehensively assess the assets' characteristics. In some implementations, the system may employ decision models or algorithms that factor in the weighted criteria and analysis to generate a scoring system or rank the assets based on their suitability for the system's requirements.

FIG. 21B shows an illustrative architecture for managing resources across global or cloud networks, in accordance with one or more implementations. For example, in FIG. 21B, system 2100 may receive, at a platform application, a first user request to perform a first off-chain action. For example, the off-chain action may represent resource 2102 (e.g., a buyer) creating a self-executing program (e.g., self-executing program 2106). The system may determine a first blockchain action that corresponds to first off-chain action. As referred to herein, a self-executing program (or smart contract) may comprise a program with predefined terms (e.g., terms of an agreement between buyer and seller) written into the code of the program. The self-executing program may be implemented on blockchain platforms, such as Ethereum, which allows for decentralized and automated execution of terms without the need for intermediaries. The self-executing program may be programmed to automatically enforce, verify, and/or facilitate the negotiation or performance of a predefined term (e.g., contract), eliminating the need for a trusted third party. These programs may run on a blockchain, which is a distributed and immutable ledger that records all transactions across a network of computers.

System 2100 may receive a first request, at a first action specific self-executing program, to perform a first blockchain action using a first resource, wherein the first blockchain action is encoded in the first action specific self-executing program. The request (e.g., a computer request) may refer to a communication or a query made by a computer or a software application to another computer, server, and/or device on a network. This request is typically initiated by a client computer seeking specific information, data, resources, or services from a server or another computing device. As described herein, an action-specific self-executing program may refer to a type of self-executing program designed to execute or facilitate a specific action, task, or set of predefined operations within a blockchain network. Unlike general-purpose self-executing programs that can handle various functions, an action-specific self-executing program is tailored to perform a particular action or a limited range of actions based on predefined conditions.

The system may also receive a transfer of cash or other assets that are tokenized on blockchain network 2110 as cryptographically secure digital asset 2114. For example, the system may determine, at the first action specific self-executing program (e.g., self-executing program 2106), a first condition for performing the first blockchain action, wherein the first condition is encoded in the first action specific self-executing program. For example, the first condition may comprise a required amount of available digital assets (or cash or other assets) at a given resource.

In a self-executing program, a condition may refer to a predefined rule, criteria, or set of instructions written into the program's code that determines how the program operates or executes. Conditions establish the logic and parameters that must be met for the self-executing program to perform specific actions or trigger certain outcomes. Conditions define the logic or decision-making process within the self-executing program. They specify the circumstances under which the program will perform certain functions, make decisions, or execute predefined actions.

Conditions are often associated with trigger events or specific states within the blockchain network. When these trigger events occur, the conditions embedded in the self-executing program are evaluated, and corresponding actions are executed if the conditions are met. Conditions can depend on various input parameters, such as timestamps, user input, external data feeds, or the state of other programs or variables within the blockchain network. Based on the fulfillment or non-fulfillment of conditions, a self-executing program may execute specific actions, proceed with a transaction, release funds, transfer tokens, update states, or terminate its execution.

In some implementations, the condition may be a time-based conditions (e.g., a self-executing program might have conditions that execute a particular action only after a specific date, time, or a defined duration has elapsed), threshold conditions (e.g., conditions might specify that a certain number of participants need to approve an action or that a certain amount of tokens needs to be accumulated before an action is executed), external data conditions (e.g., self-executing programs can incorporate external data sources, and conditions may rely on data retrieved from these sources to trigger actions).

Conditions in a self-executing program are encoded using programming languages and specific syntax within the code of the self-executing program. Self-executing programs are typically written in specialized programming languages, such as Solidity for Ethereum or Chaincode for Hyperledger Fabric, and these languages have their syntax and structures to encode conditions. In response to a user request, the system may write self-executing programs using programming languages specifically designed for blockchain platforms. They use the language's syntax and logic to encode conditions within the contract's code. Programming languages used for self-executing programs offer conditional statements (if, else if, else) that allow developers to specify conditions and define the actions or behaviors to be executed based on the evaluation of these conditions. The user request may define the logic, rules, and parameters for conditions within the contract's code. This includes specifying trigger events, input variables, comparison operations, and logical operators to create the conditions. Some self-executing program languages allow the creation of event handlers that can detect external triggers or changes in the blockchain state. These event handlers can be associated with specific conditions to execute actions when triggered.

Self-executing program 2106 may then monitor for the tokenized availability (e.g., cryptographically secure digital assets corresponding to a sale price in self-executing program 2106). For example, the system may receive, by the first action specific self-executing program, a first tokenized availability of the first resource from a first blockchain network. Tokenized availability may refer to the representation or conversion of the availability of assets, resources, or services into digital tokens or cryptographic tokens on a blockchain or digital ledger. It involves using tokens as a representation or proof of ownership, access rights, or availability of certain resources within a decentralized network.

FIG. 21C shows an illustrative architecture for managing resources across global or cloud networks, in accordance with one or more implementations. For example, system 2100 may determine, by the first action specific self-executing program, whether to perform the first blockchain action based on comparing the first condition to the first tokenized availability. For example, the system may determine whether or not to execute the self-executing program. The system may make this determination based on one or more criteria.

As shown in FIG. 21C, the system may determine whether conditions of the self-executing program have been completed. In some implementations, in response to determining to perform the first blockchain action, the system may transmit a second user request to complete the first off-chain action. For example, the system may determine whether a seller delivers services or goods to buyer in accordance with the self-executing program terms and conditions. In such cases, the system may query a buyer and/or seller or request other information of an off-chain action.

The system may execute the first blockchain action, by the first action specific self-executing program, based on determining that the first off-chain action is completed, wherein executing the first blockchain action causes the first tokenized availability of the first resource to be transferred to a second resource.

The system may receive, at the platform application, a confirmation of the first blockchain action being executed. A confirmation of a blockchain action being executed may refer to the acknowledgment or verification that a specific transaction or operation has been successfully processed and added to the blockchain.

Figure 22:
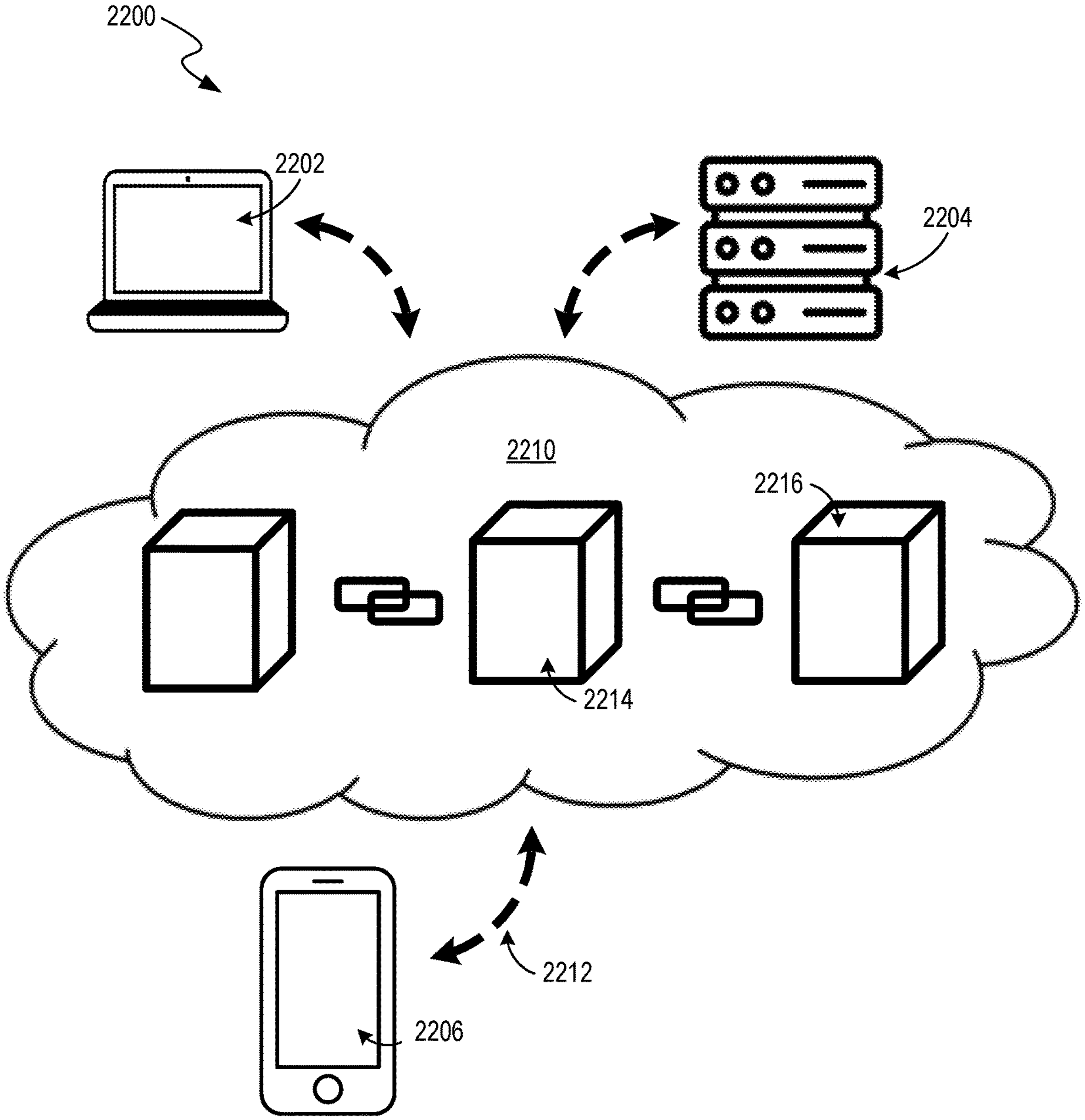
FIG. 22 shows an illustrative diagram of an implementation featuring a blockchain network, in accordance with some implementations of the present technology.

FIG. 22 shows an illustrative diagram of an implementation featuring a blockchain network, in accordance with one or more implementations. For example, system 2200 may comprise a distributed state machine, in which each of the components in FIG. 22 acts as a client of system 2200. For example, system 2200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more client, which behaves like an actual computer) for the system. The data structure may comprise one or more devices and/or components, which may act in concert to facilitate blockchain 2210.

As referred to herein, blockchain 2210 may comprise a type of distributed ledger technology that consists of growing list of records, called blocks (e.g., block 2214 and block 2216), that are securely linked together using cryptography. Each block may contain a cryptographic hash of the previous block (e.g., block 2216 may contain a cryptographic hash of block 2214), and that cryptographic hash may itself be based on a state of a preceding block (e.g., the cryptographic hash of block 2216 is based not only on the state of block 2214). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. Although, in some implementations, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 22, system 2200 comprises user device 2202, user device 2204, and user device 2206. It should be noted that, while shown as a smartphone, a personal computer, and a server in FIG. 22, the user devices may be any type of computing device, including, but not limited to, a laptop computer, a tablet computer, a hand-held computer, and/or other computing equipment (e.g., a server), including "smart," wireless, wearable, and/or mobile devices. It should be noted that implementations describing system 2200 performing a blockchain action may equally be applied to, and correspond to, an individual user device (e.g., user device 2202, user device 2204, and/or user device 2206) performing the blockchain action. That is, system 2200 may correspond to the user devices (e.g., user device 2202, user device 2204, and/or user device 2206) collectively or individually.

For example, system 2200 may comprise a plurality of nodes for blockchain 2210. Each node may correspond to a user device (e.g., user device 2202, user device 2204, and/or user device 2206). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some implementations, the user devices of system 2200 may comprise one or more cloud components. For example, cloud components may be implemented as a cloud computing system and may feature one or more component devices. It should also be noted that system 2200 is not limited to three devices. Users may, for instance, utilize one or more devices to interact with one another, one or more servers, or other components of system 2200. It should be further noted that while one or more actions (e.g., blockchain actions) are described herein as being performed by a particular component (e.g., user device 2202) of system 2200, those actions may, in some implementations, be performed by other components of system 2200. As an example, while one or more actions are described herein as being performed by components of user device 2202, those actions may, in some implementations, be performed by one or more cloud components. In some implementations, the various computers and systems described herein may include one or more computing devices that are programmed to perform the described functions. Additionally, or alternatively, multiple users may interact with system 2200 and/or one or more components of system 2200. For example, in one implementation, a first user and a second user may interact with system 2200 using two different components (e.g., user device 2204 and user device 2206, respectively). Additionally, or alternatively, a single user (and/or a user account linked to a single user) may interact with system 2200 and/or one or more components of system 2200 using two different components (e.g., user device 2202 and user device 2206, respectively).

With respect to the components of system 2200, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or 1/O circuitry. Each of these devices may also include a user input interface and/or user output interface (e.g., a display) for use in receiving and displaying data. For example, as shown in FIG. 22, both user device 2202 and user device 2206 include a display upon which to display data (e.g., content related to one or more blockchain actions).

Additionally, the devices in system 2200 may run an application (or another suitable program). The application may cause the processors and/or control circuitry to perform operations related to determining resource availability within a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 22 also includes network 2212, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 23:
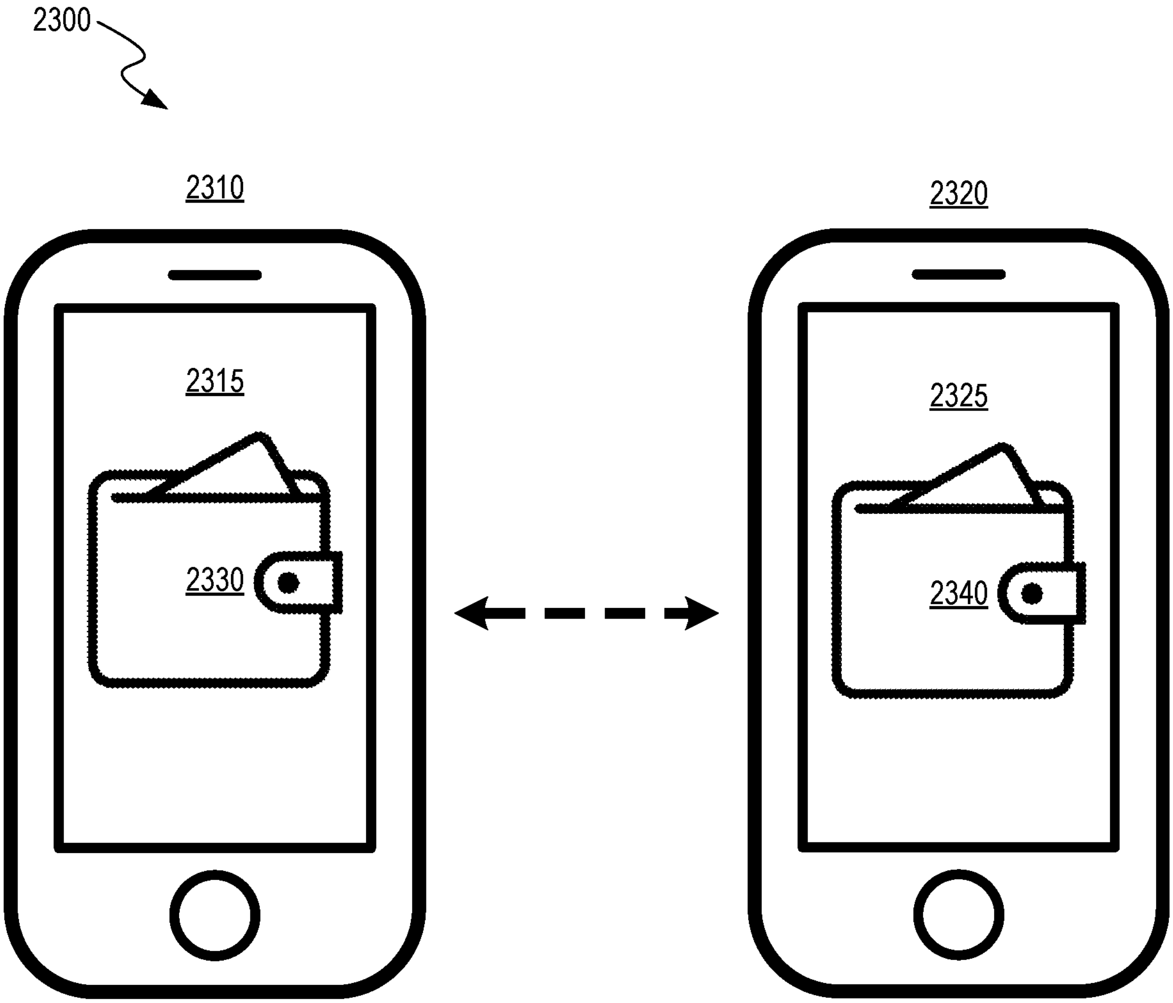
FIG. 23 shows an illustrative diagram for performing a blockchain action, in accordance with some implementations of the present technology.

FIG. 23 shows an illustrative diagram for conducting blockchain actions, in accordance with one or more implementations. For example, the diagram presents various components that may be used to determining resource availability in some implementations.

As referred to herein, a "blockchain action" may comprise any action including and/or related to blockchains and blockchain technology. For example, blockchain actions may include conducting transactions, querying a distributed ledger, generating additional blocks fora blockchain, transmitting communications-related nonfungible tokens, performing encryption/decryption, exchanging public/private keys, and/or other actions related to blockchains and blockchain technology. In some implementations, a blockchain action may comprise the creation, modification, detection, and/or execution of a smart contract or program stored on a blockchain. For example, a self-executing program may comprise a program stored on a blockchain that is executed (e.g., automatically and/or without any intermediary's involvement or time loss following a trigger) when one or more predetermined conditions are met. In some implementations, a blockchain action may comprise the creation, modification, exchange, and/or review of a token (e.g., a digital blockchain-specific asset), including a nonfungible token. A nonfungible token may comprise a token that is associated with a good, a service, a self-executing program, and/or other content that may be verified by, and stored using, blockchain technology. In some implementations, blockchain actions may also comprise actions related to mechanisms that facilitate other blockchain actions (e.g., actions related to metering activities for blockchain actions on a given blockchain network).

FIG. 23 includes system 2300, which includes user device 2310 and user device 2320, although other devices and/or components may also be featured in system 2300 (e.g., one or more of devices and/or components shown in FIG. 22). User device 2310 includes user interface 2315. User device 2320 includes user interface 2325. As referred to herein, a "user interface" may comprise a mechanism for human-computer interaction and communication in a device and may include display screens, keyboards, a mouse, and the appearance of a desktop. For example, a user interface may comprise a way for a user interact with and/or access an application, website, and/or other program in order to determining resource availability. A user interface may display content related to resources. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

In some implementations, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some implementations, gas that is earmarked for a blockchain action may be refunded back to the originator of the blockchain action if, after the computation is executed, an amount remains unused.

As shown in FIG. 23, one or more user devices may include a cryptography-based, storage application (e.g., cryptography-based, storage application 2330 and cryptography-based, storage application 2340) used to perform blockchain actions. The cryptography-based, storage application may be used to perform a plurality of blockchain actions across a computer network. For example, the cryptography-based, storage application may comprise a decentralized application that functions to perform one or more blockchain actions.

In some implementations, the cryptography-based, storage application may comprise and/or be compatible with one or more application program interfaces (e.g., APIs). For example, an API may be implemented on user device 2310 and/or communicate with an API implemented on user device 2320. Alternatively or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to facilitate resource management. For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to ten minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some implementations, the API may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol ("SOAP") web services have traditionally been adopted in the enterprise for publishing internal services as well as for exchanging information with partners in business-to-business ("B2B") transactions.

The API may use various architectural arrangements. For example, system 2300 may be partially based on the API, such that there is strong adoption of SOAP and RESTful web services, using resources such as Service Repository and Developer Portal, but with low governance, standardization, and separation of concerns. Alternatively, system 2300 may be fully based on the API, such that separation of concerns between layers such as an API layer, services, and applications are in place.

In some implementations, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some implementations, the system architecture may use an open API approach. In such cases, the API may use commercial or open-source API platforms and their modules. The API may use a developer portal. The API may use strong security constraints applying a web application firewall that protects the decentralized applications and/or the API against common web exploits, bots, and denial-of-service (DDoS) attacks. The API may use RESTful APIs as standard for external integration.

In some implementations, the system may also use one or more Application Binary Interfaces (ABIs) and an alternative to and/or in addition to an API. An ABI is an interface between two program modules, often between operating systems and user programs. ABIs may be specific to a blockchain protocol. For example, ABI defines the methods and structures used to interact with the binary contract similar to an API, but on a lower-level. The ABI indicates the caller of the function to encode (e.g., ABI encoding) the needed information like function signatures and variable declarations in a format that a virtual machine can understand to call that function in bytecode. ABI encoding may be automated by the system using compilers or wallets interacting with the blockchain.

The cryptography-based, storage application may, in some implementations, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some implementations, the system may use various types of digital wallets such as hot wallets and cold wallets. Hot wallets are connected to the internet while cold wallets are not. Digital wallet holders may hold both a hot wallet and a cold wallet. Hot wallets are most often used to perform blockchain actions, while a cold wallet is generally used for managing a user account and may have no connection to the internet.

In some implementations, the cryptography-based, storage application may correspond to a key-based wallet or a smart contract wallet. For example, a key based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some implementation, a cryptography-based, storage application may include, or have access to, key-based wallet or a smart contract wallet. For example, the cryptography-based, storage application may comprise a digital or other construct (e.g., a reference, a pointer, a text on a blockchain, an address, etc.).

In some implementations, to conduct a blockchain action, user device 2310, user interface 2315, and/or cryptography-based, storage application 2330) may comprise, control, and/or have access to a private key and/or digital signature. For example, system 2300 may use cryptographic systems for conducting blockchain actions such as resource management. For example, system 2300 may use public-key cryptography, which features a pair of digital keys (e.g., which may comprise strings of data). In such cases, each pair comprises a public key (e.g., which may be public) and a private key (e.g., which may be kept private). System 2300 may generate the key pairs using cryptographic algorithms (e.g., featuring one-way functions). System 2300 may then encrypt a message (or other blockchain action) using an intended receiver's public key such that the encrypted message may be decrypted only with the receiver's corresponding private key. In some implementations, system 2300 may combine a message with a private key to create a digital signature on the message. For example, the digital signature may be used to verify the authenticity of blockchain actions. As an illustration, when conducting blockchain actions, system 2300 may use the digital signature to prove to every node in the system that it is authorized to conduct the blockchain actions.

For example, user device 2310 may request a blockchain action (e.g., conduct a transaction). The blockchain action may be authenticated by user device 2310 and/or another node (e.g., a user device in the community network of system 2300). For example, using cryptographic keys, system 2300 may identify users and give access to their respective user accounts (e.g., corresponding digital wallets) within system 2300. Using private keys (e.g., known only to the respective users) and public keys (e.g., known to the community network), system 2300 may create digital signatures to authenticate the users.

Following an authentication of the blockchain action, the blockchain action may be authorized. For example, after the blockchain action is authenticated between the users, system 2300 may authorize the blockchain action prior to adding it to the blockchain. System 2300 may add the blockchain action to a blockchain (e.g., blockchain 2210 (FIG. 22)) as part of a new block (e.g., block 2216 (FIG. 22)). System 2300 may perform this based on a consensus of the user devices within system 2300. For example, system 2300 may rely on a majority (or other metric) of the nodes in the community network to determine that the blockchain action is valid. In response to validation of the block, a node user device (e.g., user device 2320) in the community network (e.g., a miner) may receive a reward (e.g., in a given cryptocurrency) as an incentive for validating the block.

To validate the blockchain action, system 2300 may use one or more validation protocols and/or validation mechanisms. For example, system 2300 may use a proof-of-work mechanism in which a user device must provide evidence that it performed computational work to validate a blockchain action and thus this mechanism provides a manner for achieving consensus in a decentralized manner as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively or additionally, system 2300 may use a proof-of-stake mechanism in which a user account (e.g., corresponding to a node on the blockchain network) is required to have, or "stake," a predetermined amount of tokens in order for system 2300 to recognize it as a validator in the blockchain network.

In response to validation of the block, the block is added to a blockchain (e.g., blockchain 2210 (FIG. 22)), and the blockchain action is completed. For example, to add the blockchain action to blockchain, the successful node (e.g., the successful miner) encapsulates the blockchain action in a new block before transmitting the block throughout system 2300.

In some implementations, a cryptography-based, storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network such as a decentralized, open-source blockchain with smart contract functionality.

For example, the cryptography-based, storage application (e.g., cryptography-based, storage application 2330) may allow a user device (e.g., user device 2310) to share files, access, and/or perform a blockchain action with another user device (e.g., user device 2320) and/or cryptography-based, storage application (e.g., cryptography-based, storage application 2340). For example, the peer-to-peer architecture and decentralized nature allows blockchain actions to be conducted between the user devices, without the need of any intermediaries or central authorities.

Figure 24:
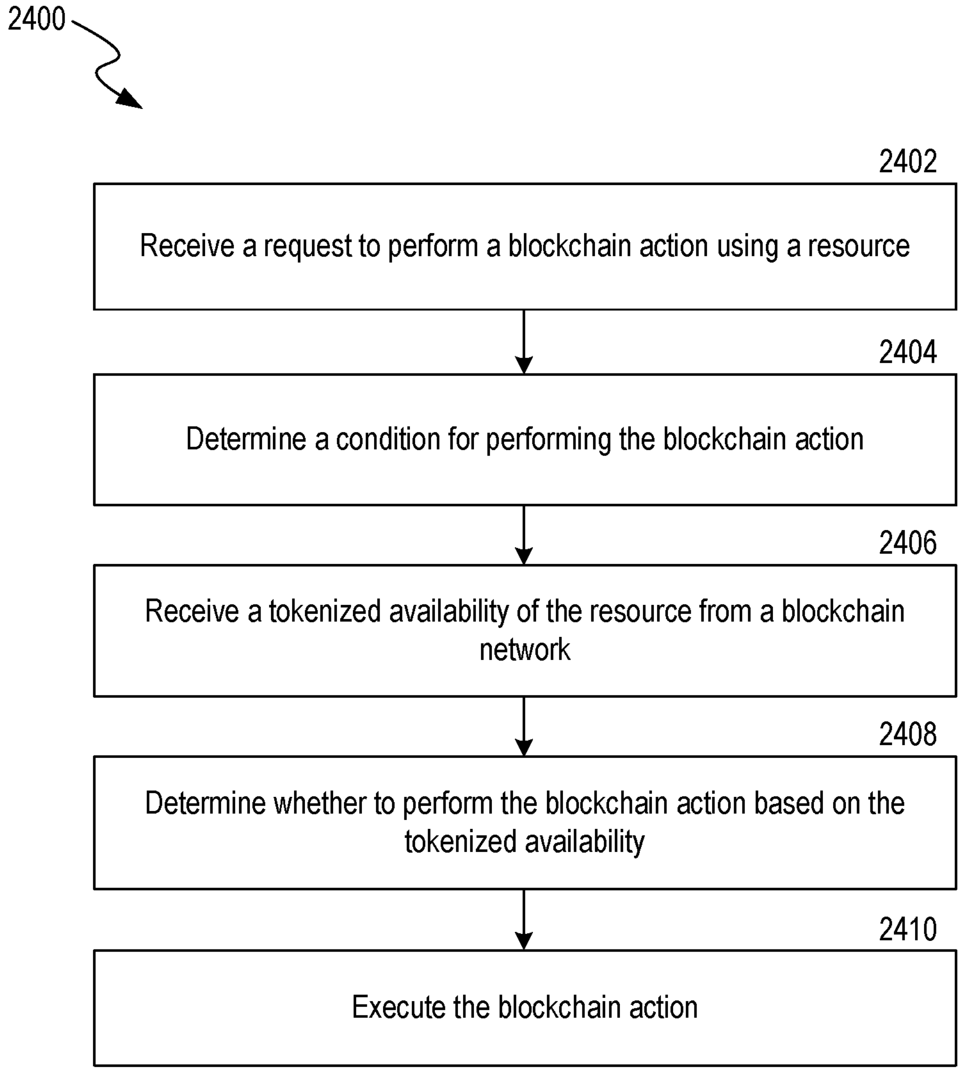
FIG. 24 shows a flowchart of the operations involved in determining availability of resources across global or cloud computer networks, in accordance with some implementations of the present technology.

FIG. 24 shows a flowchart of the operations involved in determining availability of resources across global or cloud computer networks, in accordance with one or more implementations. For example, the system may use process 2400 (e.g., as implemented on one or more system components described above) in order to determine availability of resources across global or cloud computer networks while mitigating issues related to providing services with unstable resources At operation 2402, process 2400 (e.g., using one or more components described above) receives a request to perform a blockchain action using a resource. For example, the system may receive a first request, at a first action specific self-executing program, to perform a first blockchain action using a first resource, wherein the first blockchain action is encoded in the first action specific self-executing program.

In some implementations, encoding the first blockchain action in the first action specific self-executing program may comprise the system (e.g., a self-executing program) receiving the first resource as a first statement in the first action specific self-executing program. A statement refers to a line or a set of instructions written in the code of the self-executing program. These statements represent specific actions, commands, or operations that the self-executing program is programmed to execute when certain conditions are met. Statements are fundamental building blocks of smart contract code. They are written using programming languages specific to the blockchain platform (e.g., Solidity for Ethereum, Chaincode for Hyperledger Fabric) and define the logic and operations of the self-executing program. Statements consist of commands, functions, or instructions that direct the smart contract on how to process data, interact with the blockchain network, manipulate variables, perform calculations, handle transactions, or execute conditional operations. Statements can include conditional structures (such as if-else statements), loops, variable assignments, function calls, event triggers, and other programming constructs that control the flow of execution within the self-executing program.

Additionally or alternatively, the system may receive a first logic in the first action specific self-executing program that determines the second resource upon execution of the first action specific self-executing program. Logic refers to the set of rules, conditions, and instructions encoded within the self-executing program's code that govern its behavior, decision-making process, and execution flow. It encompasses the logical operations, conditional statements, and procedural instructions that define how the self-executing program operates and responds to various inputs or conditions.

In some implementations, encoding the first blockchain action in the first action specific self-executing program may comprise the system receiving a first value for satisfying the first condition. For example, the first value for satisfying the first condition may can incorporate information from external data sources, and conditions may rely on data retrieved from these sources to trigger actions. For instance, a weather-based insurance smart contract may pay out based on weather data obtained from an oracle. As another example, conditions might specify that a certain number of participants (e.g., indicated by the value) need to approve an action or that a certain amount of tokens needs to be accumulated before an action is executed. Additionally or alternatively, the system may receive a first time for satisfying a second condition. For example, the second value may be a particular action that executes the self-executing program only after a specific date, time, or a defined duration has elapsed.

At operation 2404, process 2400 (e.g., using one or more components described above) determines a condition for performing the blockchain action. For example, the system may determine, at the first action specific self-executing program, a first condition for performing the first blockchain action, wherein the first condition is encoded in the first action specific self-executing program.

At operation 2406, process 2400 (e.g., using one or more components described above) receives a tokenized availability of the resource from a blockchain network. For example, the system may receive, by the first action specific self-executing program, a first tokenized availability of the first resource from a first blockchain network.

At operation 2408, process 2400 (e.g., using one or more components described above) determines whether to perform the blockchain action based on the tokenized availability. For example, the system may determine, by the first action specific self-executing program, whether to perform the first blockchain action based on comparing the first condition to the first tokenized availability.

In some implementations, the system may determine whether to perform the first blockchain action is based on comparing the first condition to the first tokenized availability, determining a first actual availability for a first resource in a first computer network based on the first tokenized availability, and determining that the first condition corresponds to the first actual availability. For example, the system may define a specific condition or set of criteria that need to be met for triggering a blockchain action. This condition can be related to resource availability, a specific value threshold, time-based parameters, or any other predefined rule. The system may maintain tokenized representations or digital tokens that signify the availability or capacity of resources within the computer network. These tokens could represent the available resources or their capacity in a digital form. The system may compare the condition set for the blockchain action with the tokenized availability. It checks if the condition aligns with the tokenized representation of resource availability in the network. The system may utilize the tokenized availability to derive or determine the corresponding actual availability of the resource within the computer network. This involves a process where tokenized availability is converted or mapped to reflect the real-time or current status of the resource. The system may then compare the condition specified for the blockchain action with the determined actual availability of the resource. It verifies whether the condition matches or corresponds to the verified real-time availability status of the resource within the network. Based on the comparison between the condition, tokenized availability, and actual availability, the system may make a decision regarding whether the condition aligns with the current state of the resource. If the condition matches the actual availability, the system proceeds to perform the blockchain action. If the comparison confirms that the condition corresponds to the verified actual availability, the system triggers the specified blockchain action, such as initiating a transaction, updating a smart contract, or executing a programmed function on the blockchain. The system may record the executed action on the blockchain and maintains a log or record of the process, documenting the correlation between the condition, tokenized availability, and actual resource availability for auditing or future reference.

In some implementations, determining whether to perform the first blockchain action may be based on transmitting a second user request to complete a first off-chain action and determining that the first off-chain action is completed. For example, oracles are entities or services that provide off-chain data or trigger off-chain actions in a blockchain network. They act as bridges between the blockchain and external data sources or systems, enabling self-executing programs to interact with real-world information or execute actions that occur outside the blockchain. The self-executing program sends a request or query to the oracle, specifying the necessary information or action to be performed off-chain. This request could involve retrieving data from APIs, accessing databases, executing external systems, or any other action outside the blockchain. The oracle receives the request from the self-executing program and performs the necessary operations or accesses external resources to fulfill the requested action off-chain. This could involve interacting with external APIs, databases, sensors, or other systems.

In some implementations, the system may select cryptographically secure digital assets (or amount thereof) based on actual availability. For example, the system may determine a first actual availability for the first resource in a first computer network. The system may determine a first cryptographically secure digital asset corresponding to the first actual availability. The system may record the first cryptographically secure digital asset in a digital log. The system may continuously monitor or periodically checks the status and availability of the resource within the computer network. This monitoring can involve network probes, status queries, or other monitoring tools to assess the resource's accessibility. Upon monitoring, the system may gather data or metrics to measure the resource's availability. It might include metrics like uptime, response time, network connectivity, or any other relevant parameters that define the resource's accessibility. Once the system determines the current availability status of the resource, it associates this verified status with a specific cryptographically secure digital asset. This asset serves as a representation or tokenization of the resource's availability. The system may employ cryptographic techniques such as hashing, encryption, digital signatures, or other secure methods to ensure the integrity, authenticity, and immutability of the digital asset associated with the resource's availability. This enhances the security and trustworthiness of the recorded information. The system may record the association between the cryptographically secure digital asset and the verified actual availability of the resource in a digital log or ledger. This log acts as a tamper-proof record of the resource's availability status over time. Each entry in the digital log is timestamped to indicate the time of recording. This helps in tracking changes, auditing the history of resource availability, and providing a chronological record of events for analysis or compliance purposes.

At operation 2410, process 2400 (e.g., using one or more components described above) executes the blockchain action. For example, the system may execute the first blockchain action, by the first action specific self-executing program, based on determining to perform the first blockchain action, wherein executing the first blockchain action causes the first tokenized availability of the first resource to be transferred to a second resource.

In some implementations, the system may determine the first actual availability for the first resource in the first computer network by the system receiving a first verification that the first resource has the first actual availability and recording the first cryptographically secure digital asset as corresponding to the first resource based on the first verification. For example, the system may initiate a verification process to determine the actual availability of a specific resource (e.g., a balance in a bank account, liquidity in a bank branch, etc.) within the computer network. This verification can involve various methods, such as network monitoring, pinging the resource, querying its status, or using specific protocols to confirm its accessibility. Upon verification, the system receives a confirmation or verification signal indicating the current status or availability level of the resource. This signal signifies that the resource is accessible and operational at that particular moment, confirming its actual availability. Following the verification and confirmation of the resource's availability, the system records or associates this verified status with a cryptographically secure digital asset. This association establishes a link or correlation between the verified actual availability of the resource and a unique digital asset stored or represented on the network. The system ensures that the digital asset linked to the resource's availability is cryptographically secure. This involves employing encryption, hashing, or other cryptographic techniques to safeguard the asset's integrity and authenticity within the system. The system maintains a record or ledger where the association between the verified actual availability and the corresponding cryptographically secure digital asset is stored securely. This record serves as a reference point for the resource's status and can be accessed for verification or auditing purposes. As the availability status of the resource changes over time (due to network conditions, maintenance, transactions, liquidity changes, etc.), the system may dynamically update or revise the association with the corresponding digital asset to reflect the most current and verified availability status accurately.

In some implementations, the first verification may be determined based on an amount for an off-chain record corresponding to the first resource, and the first verification may be received at a first blockchain network via a first oracle. For example, the system may interact with an oracle that has access to off-chain data, such as databases, APIs, or external systems, where the off-chain record corresponding to a specific resource is stored or updated. The system may define conditions or rules specifying that an on-chain action should occur based on certain parameters or data retrieved from the off-chain record. For instance, the condition could be a specific amount or value associated with the resource in the off-chain record. The system may use the oracle to query the off-chain data source and retrieve the relevant information or amount corresponding to the resource. The oracle fetches this data from the off-chain record. Upon receiving the data from the off-chain source, the system may validate and compare it against the predefined conditions or rules set for triggering the on-chain action. If the retrieved amount matches or meets the specified criteria, the validation process confirms that the condition is satisfied. Once the validation confirms that the condition based on the off-chain record's data is met (e.g., a party delivers a good at issue in a transaction, a party paid for a good, a network connection is created, appropriate availability/liquidity is found, etc.), the system triggers the corresponding on-chain action or smart contract function. This action could involve initiating a transaction, updating a smart contract state, executing a programmatic function, or performing any predefined action on the blockchain. The verified on-chain action is broadcasted to the blockchain network for execution and inclusion in a block. Miners or validators on the blockchain network process and validate the transaction, ensuring its inclusion in the distributed ledger. After the transaction is confirmed and added to the blockchain, the on-chain action corresponding to the validated off-chain data is executed, thereby reflecting the updated state or result on the blockchain.

In some implementations, executing the first blockchain action based on determining to perform the first blockchain action may comprise the system recording the first cryptographically secure digital asset in a digital log for the second resource. The system may determine a second actual availability for the second resource based on the first cryptographically secure digital asset. The system may transmit a second verification that the second resource has the second actual availability.

It is contemplated that the operations or descriptions of FIG. 24 may be used with any other implementation of this disclosure. In addition, the operations and descriptions described in relation to FIG. 24 may be done in alternative orders or in parallel to further the purposes of this disclosure. For example, each of these operations may be performed in any order, in parallel, or simultaneously to reduce lag or increase the speed of the system or method. Furthermore, it should be noted that any of the components, devices, or equipment discussed in relation to the figures above could be used to perform one or more of the operations in FIG. 24.

Example Implementation of the Models of the Agent Management Platform

Figure 25:
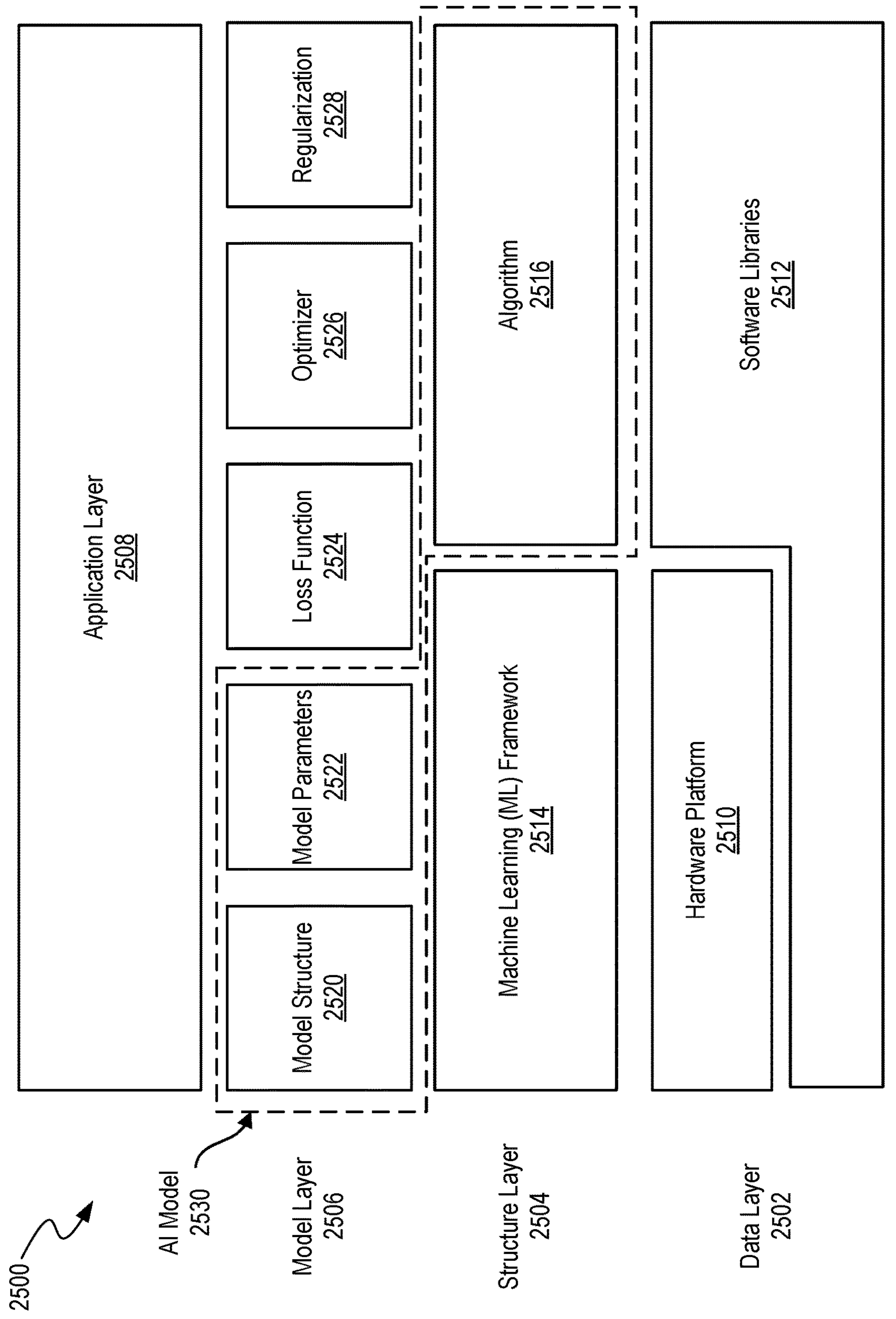
FIG. 25 illustrates a layered architecture of an AI system that can implement the machine learning models of an agent management platform, in accordance with some implementations of the present technology.

FIG. 25 illustrates a layered architecture of an AI system 2500 that can implement the ML models of the agent management platform of FIG. 15, in accordance with some implementations of the present technology. Example ML models can include the models executed by the agent management platform, such as agents 1504. Accordingly, the agents 1504 can include one or more components of the AI system 2500.

As shown, the AI system 2500 can include a set of layers, which conceptually organize elements within an example network topology for the AI system's architecture to implement a particular AI model 2530. Generally, an AI model is a computer-executable program implemented by the AI system 2500 that analyses data to make predictions. Information can pass through each layer of the AI system 2500 to generate outputs for the AI model. The layers can include a data layer 2502, a structure layer 2504, a model layer 2506, and an application layer 2508. The algorithm 2516 of the structure layer 2504 and the model structure 2520 and model parameters 2522 of the model layer 2506 together form an example AI model. The optimizer 2526, loss function engine 2524, and regularization engine 2528 work to refine and optimize the AI model, and the data layer 2502 provides resources and support for application of the AI model by the application layer 2508.

The data layer 2502 acts as the foundation of the AI system 2500 by preparing data for the AI model. As shown, the data layer 2502 can include two sub-layers: a hardware platform 2510 and one or more software libraries 2512. The hardware platform 2510 can be designed to perform operations for the AI model and include computing resources for storage, memory, logic and networking, such as the resources described in relation to FIGS. 20 and 21. The hardware platform 2510 can process amounts of data using one or more servers. The servers can perform backend operations such as matrix calculations, parallel calculations, machine learning (ML) training, and the like. Examples of servers used by the hardware platform 2510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 2510 can include computing resources, (e.g., servers, memory, etc.) offered by a cloud services provider. The hardware platform 2510 can also include computer memory for storing data about the AI model, application of the AI model, and training data for the AI model. The computer memory can be a form of random-access memory (RAM), such as dynamic RAM, static RAM, and non-volatile RAM.

The software libraries 2512 can be thought of suites of data and programming code, including executables, used to control the computing resources of the hardware platform 2510. The programming code can include low-level primitives (e.g., fundamental language elements) that form the foundation of one or more low-level programming languages, such that servers of the hardware platform 2510 can use the low-level primitives to carry out specific operations. The low-level programming languages do not require much, if any, abstraction from a computing resource's instruction set architecture, enabling them to run quickly with a small memory footprint. Examples of software libraries 2512 that can be included in the AI system 2500 include INTEL Math Kernel Library, NVIDIA cuDNN, EIGEN, and OpenBLAS.

The structure layer 2504 can include an ML framework 2514 and an algorithm 2516. The ML framework 2514 can be thought of as an interface, library, or tool that enables users to build and deploy the AI model. The ML framework 2514 can include an open-source library, an API, a gradient-boosting library, an ensemble method, and/or a deep learning toolkit that work with the layers of the AI system facilitate development of the AI model. For example, the ML framework 2514 can distribute processes for application or training of the AI model across multiple resources in the hardware platform 2510. The ML framework 2514 can also include a set of pre-built components that have the functionality to implement and train the AI model and enable users to use pre-built functions and classes to construct and train the AI model. Thus, the ML framework 2514 can be used to facilitate data engineering, development, hyperparameter tuning, testing, and training for the AI model. Examples of ML frameworks 2514 that can be used in the AI system 2500 include TENSORFLOW, PYTORCH, SCIKIT-LEARN, KERAS, LightGBM, RANDOM FOREST, and AMAZON WEB SERVICES.

The algorithm 2516 can be an organized set of computer-executable operations used to generate output data from a set of input data and can be described using pseudocode. The algorithm 2516 can include complex code that enables the computing resources to learn from new input data and create new/modified outputs based on what was learned. In some implementations, the algorithm 2516 can build the AI model through being trained while running computing resources of the hardware platform 2510. This training enables the algorithm 2516 to make predictions or decisions without being explicitly programmed to do so. Once trained, the algorithm 2516 can run at the computing resources as part of the AI model to make predictions or decisions, improve computing resource performance, or perform tasks. The algorithm 2516 can be trained using supervised learning, unsupervised learning, semi-supervised learning, and/or reinforcement learning.

Using supervised learning, the algorithm 2516 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of input 1502 in FIG. 15) from various source computing systems described in relation to FIG. 15. Furthermore, training data can include pre-processed data generated by various engines of the agent management platform described in relation to FIG. 15. The user may label the training data based on one or more classes and trains the AI model by inputting the training data to the algorithm 2516. The algorithm determines how to label the new data based on the labeled training data. The user can facilitate collection, labeling, and/or input via the ML framework 2514. In some instances, the user may convert the training data to a set of feature vectors for input to the algorithm 2516. Once trained, the user can test the algorithm 2516 on new data to determine if the algorithm 2516 is predicting accurate labels for the new data. For example, the user can use cross-validation methods to test the accuracy of the algorithm 2516 and retrain the algorithm 2516 on new training data if the results of the cross-validation are below an accuracy threshold.

Supervised learning can include classification and/or regression. Classification techniques include teaching the algorithm 2516 to identify a category of new observations based on training data and are used when input data for the algorithm 2516 is discrete. Said differently, when learning through classification techniques, the algorithm 2516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 2516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 2516 is continuous. Regression techniques can be used to train the algorithm 2516 to predict or forecast relationships between variables. To train the algorithm 2516 using regression techniques, a user can select a regression method for estimating the parameters of the model. The user collects and labels training data that is input to the algorithm 2516 such that the algorithm 2516 is trained to understand the relationship between data features and the dependent variable(s). Once trained, the algorithm 2516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 2516 learns patterns from unlabeled training data. In particular, the algorithm 2516 is trained to learn hidden patterns and insights of input data, which can be used for data exploration or for generating new data. Here, the algorithm 2516 does not have a predefined output, unlike the labels output when the algorithm 2516 is trained using supervised learning. Said another way, unsupervised learning is used to train the algorithm 2516 to find an underlying structure of a set of data, group the data according to similarities, and represent that set of data in a compressed format. The agent management platform can use unsupervised learning to identify patterns in claim history (e.g., to identify particular event sequences) and so forth. In some implementations, performance of the agent management platform that can use unsupervised learning is improved because the incoming input 1502 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 2516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 2516 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 2516 include factor analysis, item response theory, latent profile analysis, and latent class analysis.

The model layer 2506 implements the AI model using data from the data layer and the algorithm 2516 and ML framework 2514 from the structure layer 2504, thus enabling decision-making capabilities of the AI system 2500. The model layer 2506 includes a model structure 2520, model parameters 2522, a loss function engine 2524, an optimizer 2526, and a regularization engine 2528.

The model structure 2520 describes the architecture of the AI model of the AI system 2500. The model structure 2520 defines the complexity of the pattern/relationship that the AI model expresses. Examples of structures that can be used as the model structure 2520 include decision trees, support vector machines, regression analyses, Bayesian networks, Gaussian processes, genetic algorithms, and artificial neural networks (or, simply, neural networks). The model structure 2520 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 2520 may include one or more hidden layers of nodes between the input and output layers. The model structure 2520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 2522 represent the relationships learned during training and can be used to make predictions and decisions based on input data. The model parameters 2522 can weight and bias the nodes and connections of the model structure 2520. For instance, when the model structure 2520 is a neural network, the model parameters 2522 can weight and bias the nodes in each layer of the neural networks, such that the weights determine the strength of the nodes and the biases determine the thresholds for the activation functions of each node. The model parameters 2522, in conjunction with the activation functions of the nodes, determine how input data is transformed into desired outputs. The model parameters 2522 can be determined and/or altered during training of the algorithm 2516.

The loss function engine 2524 can determine a loss function, which is a metric used to evaluate the AI model's performance during training. For instance, the loss function engine 2524 can measure the difference between a predicted output of the AI model and the actual output of the AI model and is used to guide optimization of the AI model during training to minimize the loss function. The loss function may be presented via the ML framework 2514, such that a user can determine whether to retrain or otherwise alter the algorithm 2516 if the loss function is over a threshold. In some instances, the algorithm 2516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 2526 adjusts the model parameters 2522 to minimize the loss function during training of the algorithm 2516. In other words, the optimizer 2526 uses the loss function generated by the loss function engine 2524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 2526 used may be determined based on the type of model structure 2520 and the size of data and the computing resources available in the data layer 2502.

The regularization engine 2528 executes regularization operations. Regularization is a technique that prevents over- and under-fitting of the AI model. Overfitting occurs when the algorithm 2516 is overly complex and too adapted to the training data, which can result in poor performance of the AI model. Underfitting occurs when the algorithm 2516 is unable to recognize even basic patterns from the training data such that it cannot perform well on training data or on validation data. The optimizer 2526 can apply one or more regularization techniques to fit the algorithm 2516 to the training data properly, which helps constraint the resulting AI model and improves its ability for generalized application. Examples of regularization techniques include lasso (L1) regularization, ridge (L2) regularization, and elastic (L1 and L2 regularization).

The application layer 2508 describes how the AI system 2500 is used to solve problem or perform tasks. In an example implementation, the application layer 2508 can include a front-end user interface of the agent management platform.

Example Computing Environment of the Agent Management Platform

Figure 26:
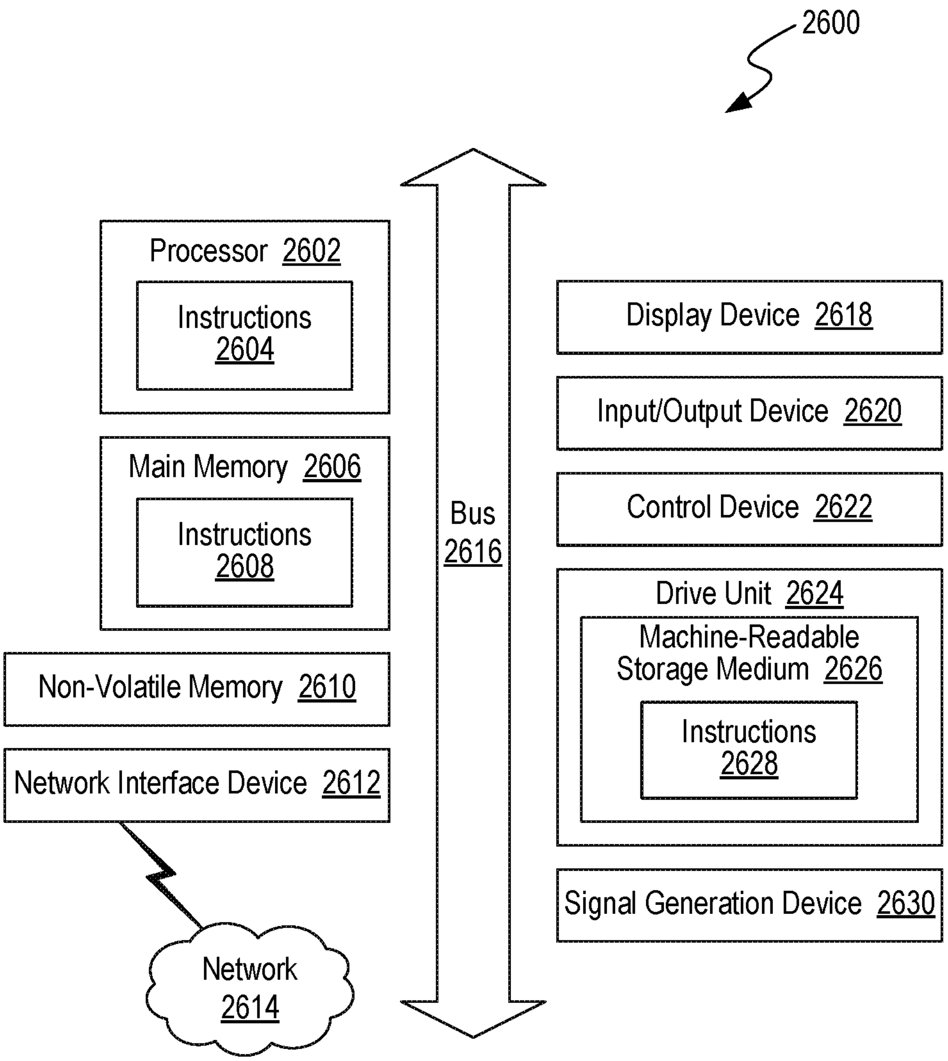
FIG. 26 is a block diagram showing some of the components typically incorporated in at least some of the computer systems and other devices on which the agent management platform operates, in accordance with some implementations of the present technology.

FIG. 26 is a block diagram showing some of the components typically incorporated in at least some of the computer systems 2600 and other devices on which the disclosed system operates in accordance with some implementations of the present technology. As shown, an example computer system 2600 can include: one or more processors 2602, main memory 2606, non-volatile memory 2610, a network interface device 2612, an input/output device 2620, a control device 2622 (e.g., keyboard and pointing device), a drive unit 2624 that includes a machine-readable medium 2626, and a signal generation device 2630 that are communicatively connected to a bus 2616. The bus 2616 represents one or more physical buses and/or point-to-point connections that are connected by appropriate bridges, adapters, or controllers. Various common components (e.g., cache memory) are omitted from FIG. 26 for brevity. Instead, the computer system 2600 is intended to illustrate a hardware device on which components illustrated or described relative to the examples of the figures and any other components described in this specification can be implemented.

The computer system 2600 can take any suitable physical form. For example, the computer system 2600 can share a similar architecture to that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computer system 2600. In some implementations, the computer system 2600 can be an embedded computer system, a system-on-chip (SOC), a single-board computer system (SBC) or a distributed system such as a mesh of computer systems or include one or more cloud components in one or more networks. Where appropriate, one or more computer systems 2600 can perform operations in real time, near real time, or in batch mode.

The network interface device 2612 enables the computer system 2600 to exchange data in a network 2614 with an entity that is external to the computing system 2600 through any communication protocol supported by the computer system 2600 and the external entity. Examples of the network interface device 2612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 2606, non-volatile memory 2610, machine-readable medium 2626) can be local, remote, or distributed. Although shown as a single medium, the machine-readable medium 2626 can include multiple media (e.g., a centralized/distributed database and/or associated caches and servers) that store one or more sets of instructions 2628. The machine-readable (storage) medium 2626 can include any medium that is capable of storing, encoding, or carrying a set of instructions for execution by the computer system 2600. The machine-readable medium 2626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2604, 2608, and 2628) set at various times in various memory and storage devices in computing device(s). When read and executed by the processor 2602, the instruction(s) cause the computer system 2600 to perform operations to execute elements involving the various aspects of the disclosure.

Figure 27:
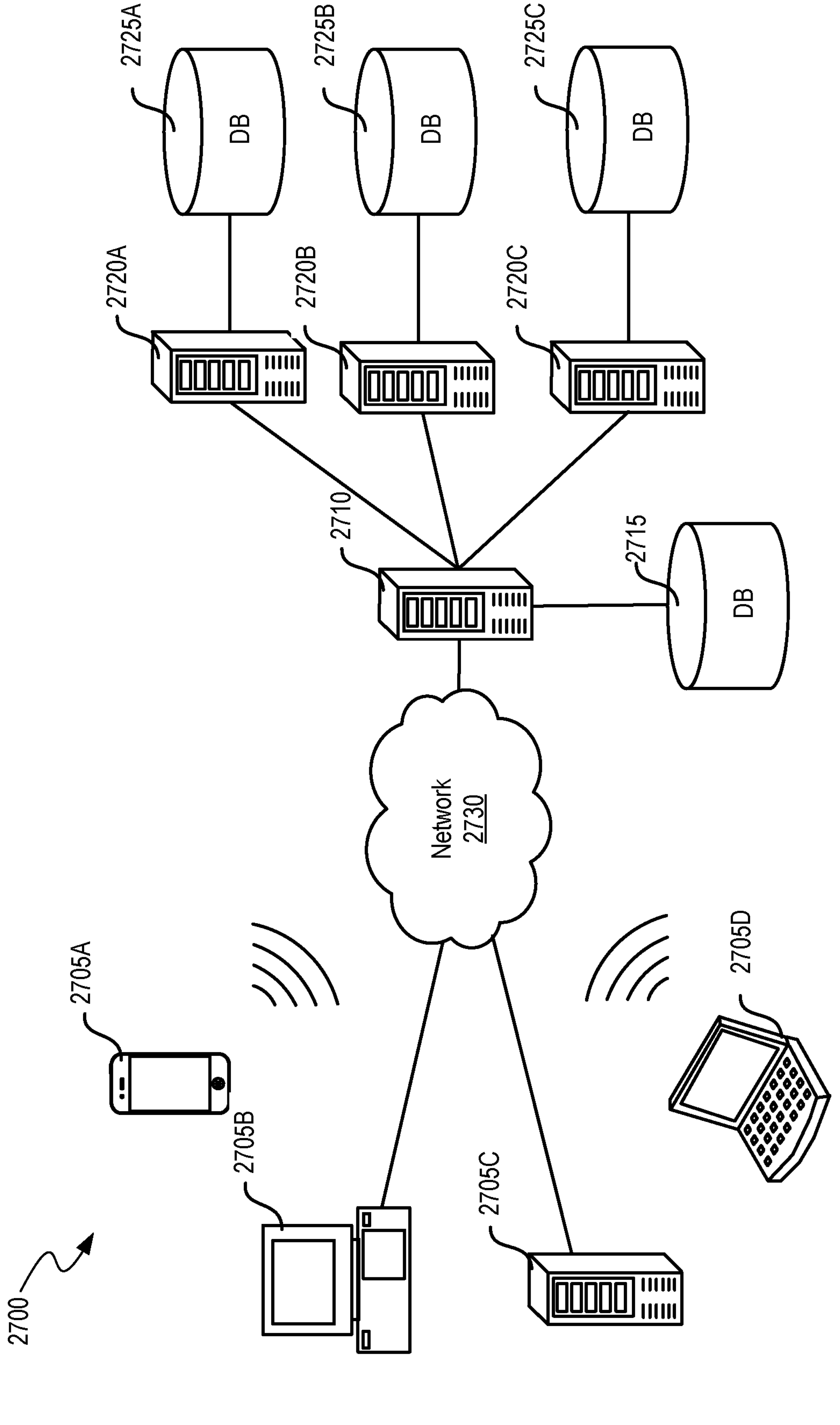
FIG. 27 is a system diagram illustrating an example of a computing environment in which the agent management platform operates in some implementations of the present technology.

FIG. 27 is a system diagram illustrating an example of a computing environment in which the disclosed system operates in some implementations. In some implementations, environment 2700 includes one or more client computing devices 605A-D, examples of which can host the agent management platform of FIG. 15. Client computing devices 2705 operate in a networked environment using logical connections through network 2730 to one or more remote computers, such as a server computing device.

In some implementations, server computing device 2710 is an edge server which receives client requests and coordinates fulfillment of those requests through other servers, such as servers 820A-C. In some implementations, server computing devices 2710 and 2720 comprise computing systems, such as the agent management platform of FIG. 15. Though each server computing device 2710 and 2720 is displayed logically as a single server, server computing devices can each be a distributed computing environment encompassing multiple computing devices located at the same or at geographically disparate physical locations. In some implementations, each server computing device 2720 corresponds to a group of servers.

Client computing devices 2705 and server computing devices 2710 and 2720 can each act as a server or client to other server or client devices. In some implementations, servers (2710, 820A-C) connect to a corresponding database (2715, 825A-C). As discussed above, each server computing device 2720 can correspond to a group of servers, and each of these servers can share a database or can have its own database. Databases 2715 and 2725 warehouse (e.g., store) information such as claims data, email data, call transcripts, call logs, policy data and so on. Though databases 2715 and 2725 are displayed logically as single units, databases 2715 and 2725 can each be a distributed computing environment encompassing multiple computing devices, can be located within their corresponding server, or can be located at the same or at geographically disparate physical locations.

Network 2730 can be a local area network (LAN) or a wide area network (WAN), but can also be other wired or wireless networks. In some implementations, network 2730 is the Internet or some other public or private network. Client computing devices 2705 are connected to network 2730 through a network interface, such as by wired or wireless communication. While the connections between server computing device 2710 and server computing devices 2720 are shown as separate connections, these connections can be any kind of local, wide area, wired, or wireless network, including network 2730 or a separate public or private network.

Remarks

The terms "example" and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied and/or implemented in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system for performing privacy-preserving cross-verification of memory storage states, the system comprising:

at least one hardware processor; and at least one non-transitory memory storing instructions, which, when executed by the at least one hardware processor, cause the system to:

obtain, via a first multi-agent storage, a request to validate a decision state for a first memory structure of the first multi-agent storage that is accessible to a first AI agent set, wherein the decision state indicates a recorded artifact generated from executing a prior programmatic workflow set via the first AI agent set;

transmit a verification artifact representing the decision state of the first multi-agent storage to a second multi-agent storage that is configured to store the verification artifact, wherein the verification artifact is generated by applying a transformation operation set on the recorded artifact of the decision state, and wherein the second multi-agent storage comprises a second memory structure accessible to a second AI agent set;

receive, via the second multi-agent storage, a verification status of the verification artifact that is determined by the second AI agent set; and responsive to the verification status indicating validation of the decision state for the first multi-agent storage:

generate, using the first AI agent set, a first programmatic workflow set configured to trigger a first sequence of computer-executable commands at the first memory structure of the first multi-agent storage;

generate, using the second AI agent set, a second programmatic workflow set configured to trigger a second sequence of computer-executable commands at the second memory structure of the second multi-agent storage; and automatically cause execution of the first programmatic workflow set via the first AI agent set and the second programmatic workflow set via the second AI agent set.

2. The system of claim 1 further caused to:

assign, prior to execution the first programmatic workflow set and the second programmatic workflow set, a first restriction status on the first memory structure of the first multi-agent storage and a second restriction status on the second memory structure of the second multi-agent storage, wherein the first restriction status prevents modification to the first memory structure until completion of the first sequence of computer-executable commands, wherein the second restriction status prevents modification to the second memory structure until completion of the second sequence of computer-executable commands.

3. The system of claim 1 further caused to:

automatically generate a verification record including a representation of the verification status for the verification artifact; and transmit the verification record to the first multi-agent storage and the second multi-agent storage, wherein the verification record is stored in associated with respective identifier strings identifying the first AI agent set and the second AI agent set.

4. The system of claim 1, wherein the verification status indicates invalidation of the decision state for the first multi-agent storage, and wherein the system is further caused to:

transmit a notification message to a predetermined network address indicating the verification status for the verification artifact.

5. The system of claim 1, wherein the verification artifact includes a zero-knowledge proof generated by the first AI agent set, wherein the zero-knowledge proof indicates that the decision state for the first memory structure of the first multi-agent storage satisfies an internal operational dataset of the second AI agent set, and wherein the verification status is determined using the zero-knowledge proof.

6. The system of claim 1, wherein the first AI agent set comprises a first AI agent subset and a second AI agent subset, wherein the first AI agent subset comprises AI agents that generate the recorded artifact via executing the prior programmatic workflow set, and wherein the second AI agent subset comprises AI agents that generate the first programmatic workflow set.

7. The system of claim 1, wherein the first AI agent set and the second AI agent set are configured to execute the first programmatic workflow set and the second programmatic workflow set contemporaneously.

8. The system of claim 1, wherein the first sequence of computer-executable commands of the first programmatic workflow set comprises at least one first command for transferring machine-readable data from the first multi-agent storage to the second multi-agent storage, and wherein the second sequence of computer-executable commands comprises at least one second command to process the machine-readable data received from the first multi-agent storage.

9. The system of claim 1, wherein the transformation operation set comprises at least one of: a cryptographic hash function, a keyed hash function, or a deterministic encoding function.

10. The system of claim 1, wherein the first multi-agent storage is a first distributed ledger and the second multi-agent storage is a second distributed ledger.

11. A non-transitory, computer-readable storage medium comprising instructions recorded thereon, wherein the instructions, when executed by at least one data processor of a system, cause the system to:

obtain, via a first multi-agent storage, a request to validate a decision state for a first memory structure of the first multi-agent storage that is accessible to a first AI agent set, wherein the decision state indicates a recorded artifact generated from executing a prior programmatic workflow set via the first AI agent set;

transmit a verification artifact representing the decision state of the first multi-agent storage to a second multi-agent storage that is configured to store the verification artifact, wherein the verification artifact is generated by applying a transformation operation set on the recorded artifact of the decision state, and wherein the second multi-agent storage comprises a second memory structure accessible to a second AI agent set;

receive, via the second multi-agent storage, a verification status of the verification artifact that is determined by the second AI agent set; and responsive to the verification status indicating validation of the decision state for the first multi-agent storage:

generate, using the first AI agent set, a first programmatic workflow set configured to trigger a first sequence of computer-executable commands at the first memory structure of the first multi-agent storage;

generate, using the second AI agent set, a second programmatic workflow set configured to trigger a second sequence of computer-executable commands at the second memory structure of the second multi-agent storage; and automatically cause execution of the first programmatic workflow set via the first AI agent set and the second programmatic workflow set via the second AI agent set.

12. The non-transitory, computer-readable storage medium of claim 11, wherein the instructions further cause the system to:

assign, prior to execution the first programmatic workflow set and the second programmatic workflow set, a first restriction status on the first memory structure of the first multi-agent storage and a second restriction status on the second memory structure of the second multi-agent storage, wherein the first restriction status prevents modification to the first memory structure until completion of the first sequence of computer-executable commands, wherein the second restriction status prevents modification to the second memory structure until completion of the second sequence of computer-executable commands.

13. The non-transitory, computer-readable storage medium of claim 11, wherein the instructions further cause the system to:

automatically generate a verification record including a representation of the verification status for the verification artifact; and transmit the verification record to the first multi-agent storage and the second multi-agent storage, wherein the verification record is stored in associated with respective identifier strings identifying the first AI agent set and the second AI agent set.

14. The non-transitory, computer-readable storage medium of claim 11, wherein the verification status indicates invalidation of the decision state for the first multi-agent storage, and wherein the instructions further cause the system to:

transmit a notification message to a predetermined network address indicating the verification status for the verification artifact.

15. The non-transitory, computer-readable storage medium of claim 11, wherein the verification artifact includes a zero-knowledge proof generated by the first AI agent set, wherein the zero-knowledge proof indicates that the decision state for the first memory structure of the first multi-agent storage satisfies an internal operational dataset of the second AI agent set, and wherein the verification status is determined using the zero-knowledge proof.

16. A computer-implemented method comprising:

obtaining, via a first multi-agent storage, a request to validate a decision state for a first memory structure of the first multi-agent storage that is accessible to a first AI agent set, wherein the decision state indicates a recorded artifact generated from executing a prior programmatic workflow set via the first AI agent set;

transmitting a verification artifact representing the decision state of the first multi-agent storage to a second multi-agent storage that is configured to store the verification artifact, wherein the verification artifact is generated by applying a transformation operation set on the recorded artifact of the decision state, and wherein the second multi-agent storage comprises a second memory structure accessible to a second AI agent set;

receiving, via the second multi-agent storage, a verification status of the verification artifact that is determined by the second AI agent set; and responsive to the verification status indicating validation of the decision state for the first multi-agent storage:

generating, using the first AI agent set, a first programmatic workflow set configured to trigger a first sequence of computer-executable commands at the first memory structure of the first multi-agent storage;

generating, using the second AI agent set, a second programmatic workflow set configured to trigger a second sequence of computer-executable commands at the second memory structure of the second multi-agent storage; and automatically causing execution of the first programmatic workflow set via the first AI agent set and the second programmatic workflow set via the second AI agent set.

17. The computer-implemented method of claim 16 further comprising:

assigning, prior to execution the first programmatic workflow set and the second programmatic workflow set, a first restriction status on the first memory structure of the first multi-agent storage and a second restriction status on the second memory structure of the second multi-agent storage, wherein the first restriction status prevents modification to the first memory structure until completion of the first sequence of computer-executable commands, wherein the second restriction status prevents modification to the second memory structure until completion of the second sequence of computer-executable commands.

18. The computer-implemented method of claim 16 further comprising:

automatically generating a verification record including a representation of the verification status for the verification artifact; and transmitting the verification record to the first multi-agent storage and the second multi-agent storage, wherein the verification record is stored in associated with respective identifier strings identifying the first AI agent set and the second AI agent set.

19. The computer-implemented method of claim 16, wherein the verification status indicates invalidation of the decision state for the first multi-agent storage, and wherein the method further comprises:

transmitting a notification message to a predetermined network address indicating the verification status for the verification artifact.

20. The computer-implemented method of claim 16, wherein the verification artifact includes a zero-knowledge proof generated by the first AI agent set, wherein the zero-knowledge proof indicates that the decision state for the first memory structure of the first multi-agent storage satisfies an internal operational dataset of the second AI agent set, and wherein the verification status is determined using the zero-knowledge proof.

* * * * *